United States Patent [19]

Hirata et al.

[11] 4,331,395
[45] May 25, 1982

[54] MOTION PICTURE CAMERA

[75] Inventors: Noritsugu Hirata, Yokohama; Hiroyuki Takimoto, Urawa, both of Japan

[73] Assignee: Canon Kabushiki Kaisha, Tokyo, Japan

[21] Appl. No.: 143,323

[22] Filed: Apr. 24, 1980

Related U.S. Application Data

[63] Continuation of Ser. No. 929,222, Jul. 31, 1978, abandoned.

[30] Foreign Application Priority Data

Aug. 12, 1977 [JP] Japan .................................. 52-97295
Aug. 23, 1977 [JP] Japan ................................ 52-101261

[51] Int. Cl.$^3$ ........................ G03B 1/18; G03B 17/46; G03B 19/18; G03B 31/02
[52] U.S. Cl. ..................................... 352/27; 352/141; 352/169; 352/170; 352/175; 352/177
[58] Field of Search ............... 352/5, 12, 22, 27, 91 R, 352/166, 169, 174–178, 72, 25, 29, 170, 171, 141, 121; 354/230, 238

[56] References Cited

U.S. PATENT DOCUMENTS

| | | | |
|---|---|---|---|
| T920,009 | 3/1974 | Kosarko | 352/72 |
| 3,842,587 | 10/1974 | Strauss et al. | 354/23 D X |
| 4,006,975 | 2/1977 | Wagensonner et al. | 354/23 D X |
| 4,009,959 | 3/1977 | Watson et al. | 352/91 R X |
| 4,047,210 | 9/1977 | Espig | 354/238 |
| 4,079,398 | 3/1978 | Ichiyangi et al. | 352/175 X |
| 4,084,891 | 4/1978 | Kiefer | 352/174 X |
| 4,096,500 | 6/1978 | Lermann et al. | 352/169 X |

Primary Examiner—Joseph W. Hartary
Assistant Examiner—William B. Perkey
Attorney, Agent, or Firm—Fitzpatrick, Cella, Harper & Scinto

[57] ABSTRACT

A motion picture camera having a start sequence digital circuit, by which various component elements in the camera related to photographic operations are sequentially and automatically operated with a predetermined relationship, when the trigger operating member of the camera is actuated, and a stop sequence digital circuit, by which the abovementioned various elements are sequentially and automatically stopped with a predetermined relationship, when the trigger operating member is released.

19 Claims, 38 Drawing Figures

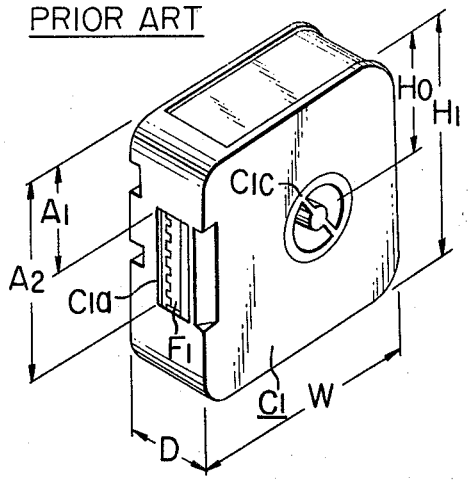
FIG. IA
PRIOR ART
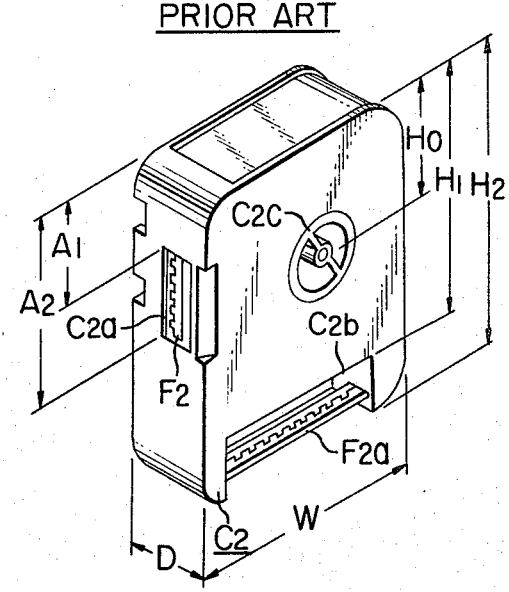
FIG. IB
PRIOR ART
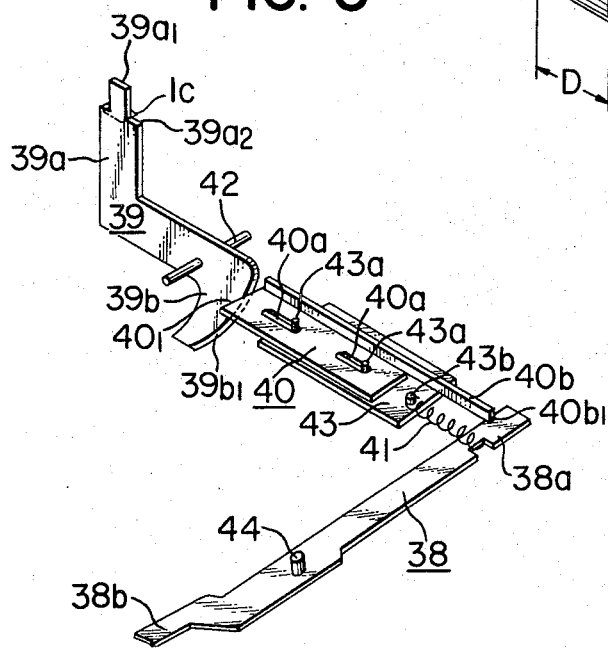
FIG. 5

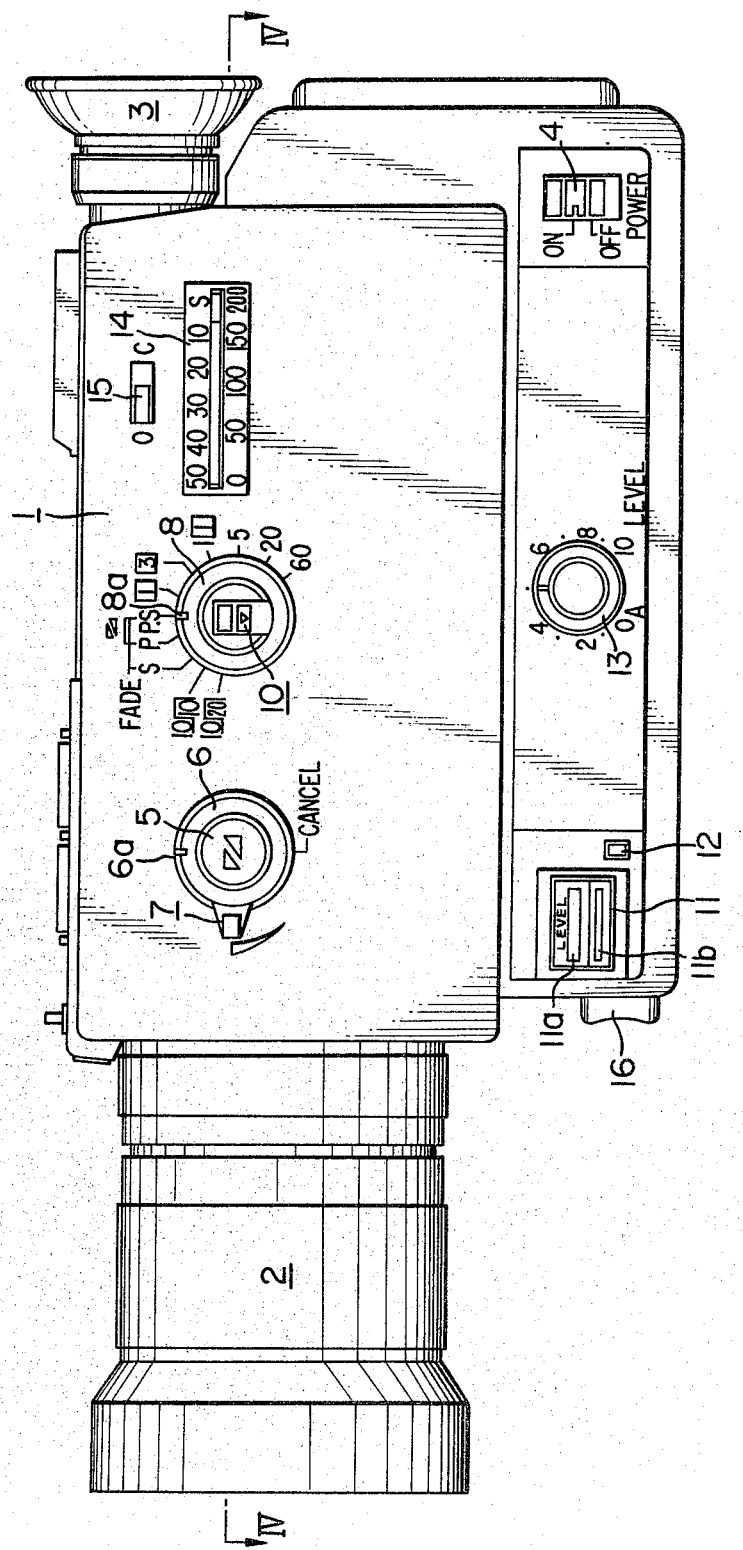

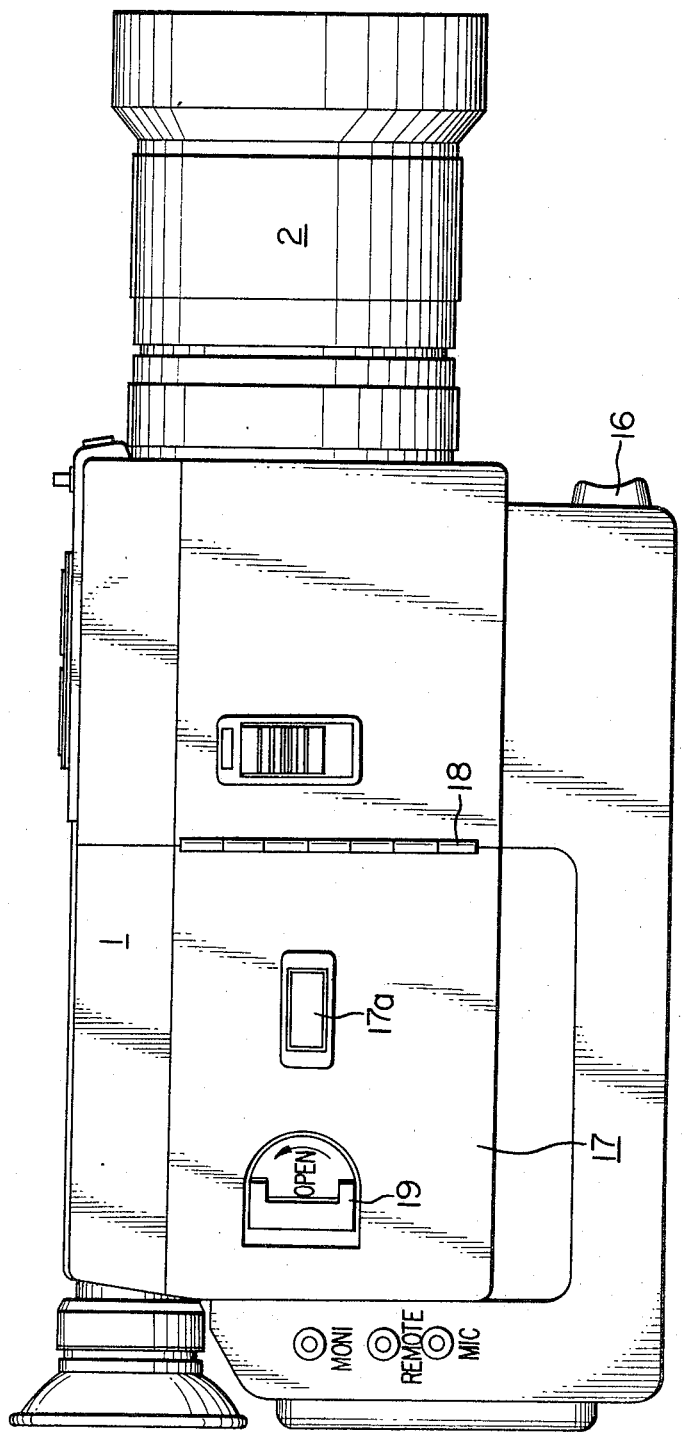

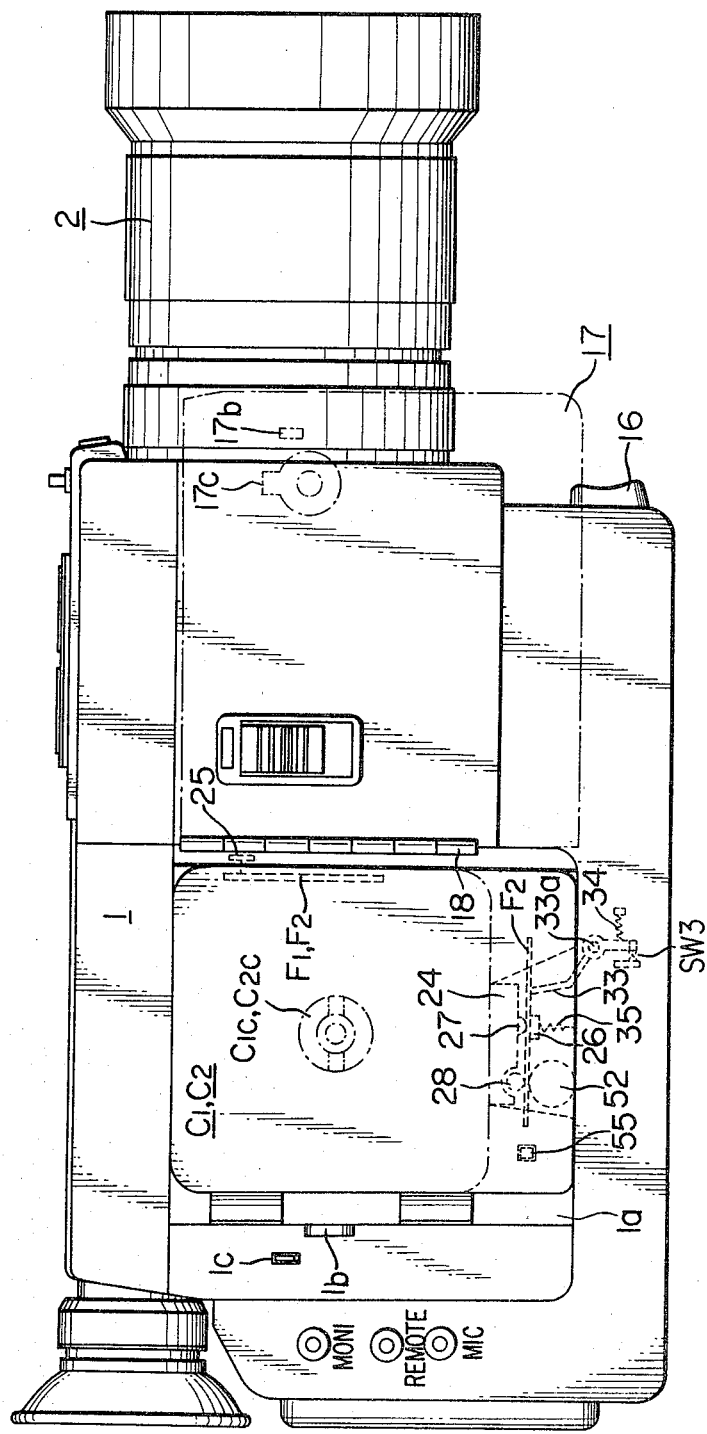

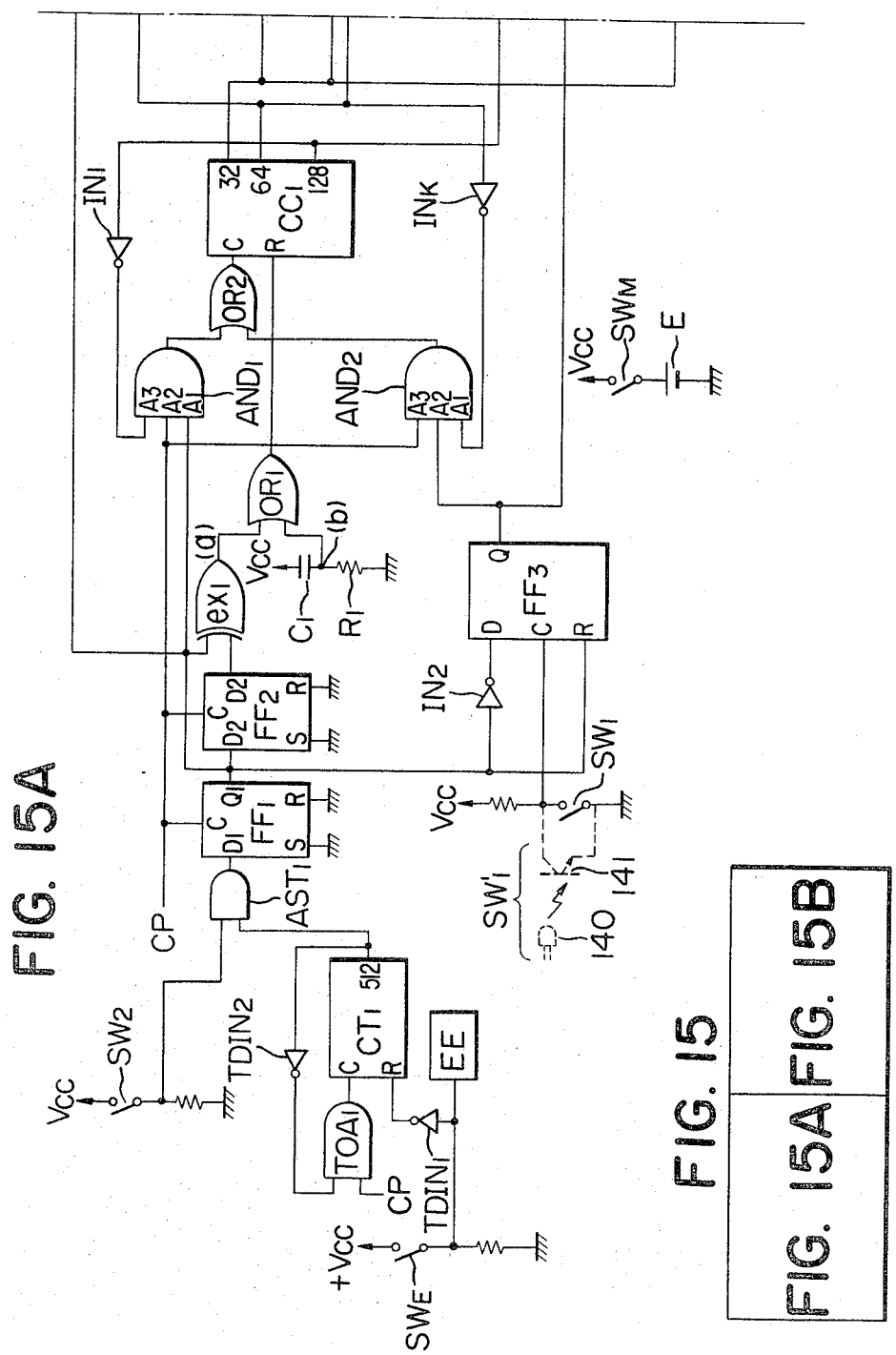

FIG. 16A
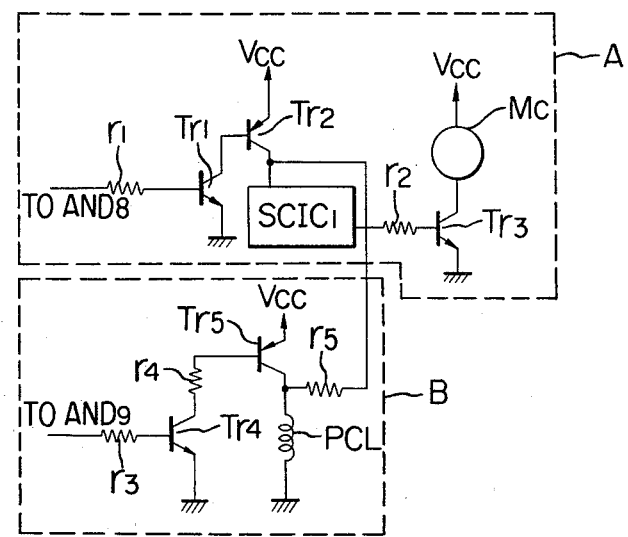
FIG. 16B
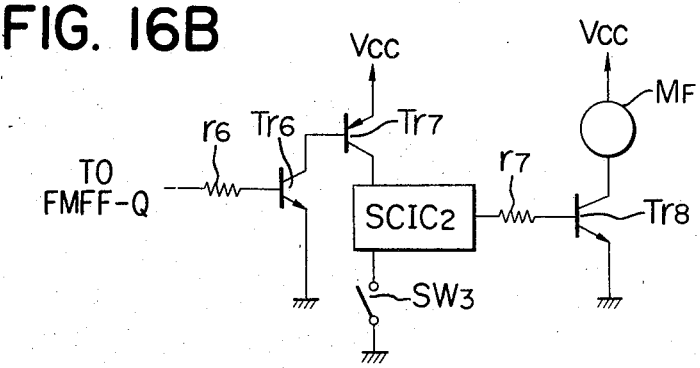
FIG. 16C
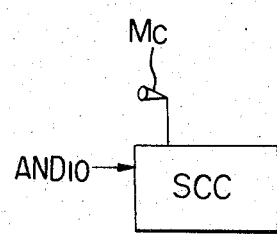
FIG. 16D

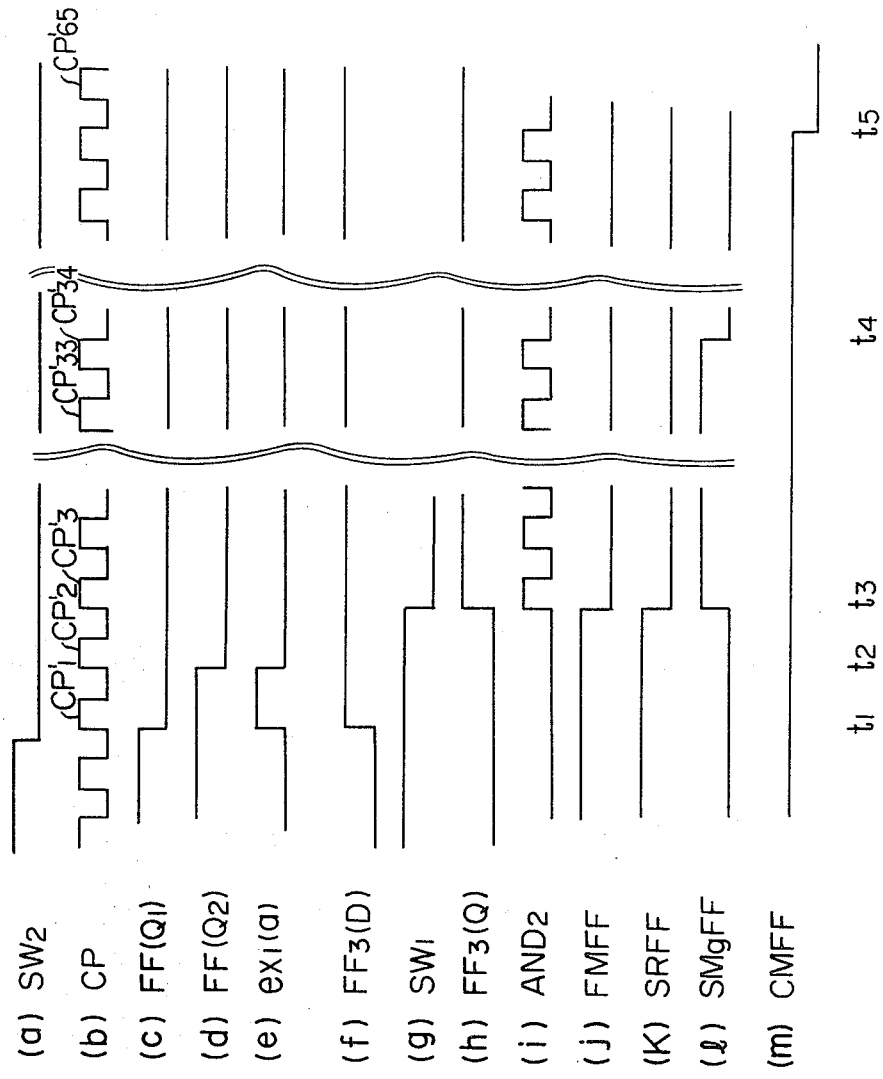

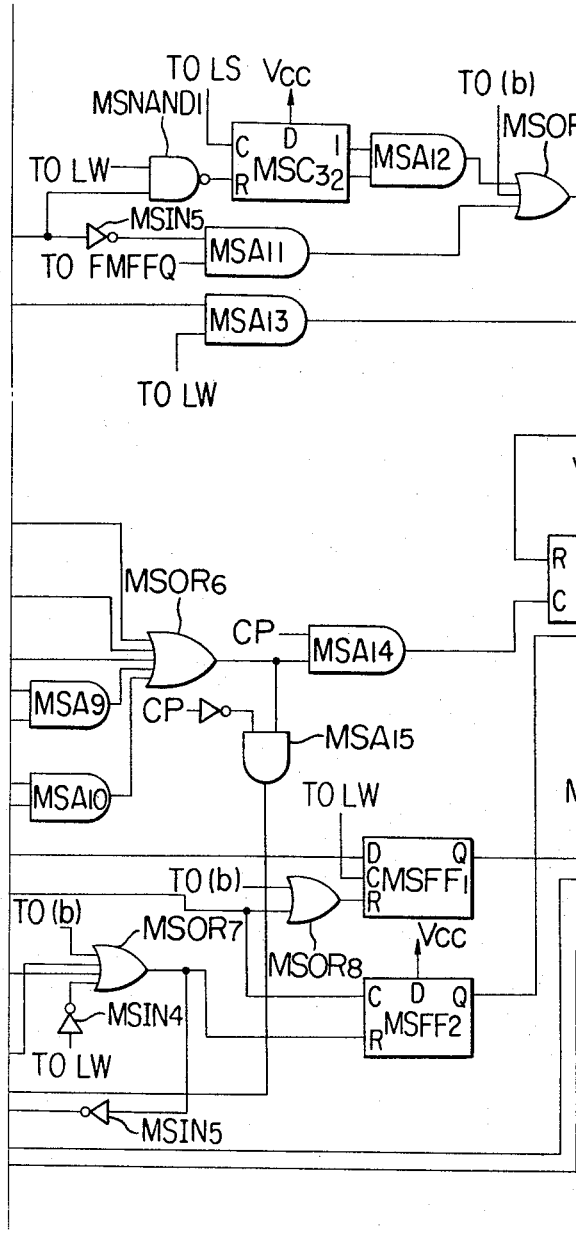
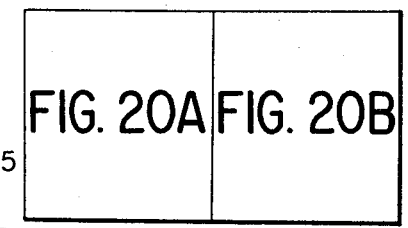
FIG. 20B
FIG. 20

(a) SHUTTER PHASE (b) SW₁

(c)

MOTION PICTURE CAMERA

This a continuation of application Ser. No. 929,222, filed July 31, 1978, now abandoned.

BACKGROUND OF THE INVENTION

1. Field of the Invention

This invention relates to a motion picture camera, and more particularly, it is concerned with control devices for such motion picture camera effecting various photographic modes depending on necessity.

2. Description of Prior Arts

The motion picture camera available at present is generally provided with an automatic exposure control device. In such motion picture camera having the automatic exposure control device, the operating conditions of the automatic exposure control device should be placed in a stable operating conditions in advance of film transport by a film feeding device. The reason for this is that, when the film feeding is started for photographic operation in a state of the exposure control device being still unstable, the exposure of the film is inappropriate until the exposure control device becomes stablized. In a camera of a type, wherein the exposure control device is operated simultaneously with actuation of the motion picture camera, such inappropriate photographic result is brought about at every actuation of the camera, which is not favorable. For this reason, there has so far been proposed a motion picture camera which is so constructed that electric current flows into the exposure control device simultaneously with closure of the main switch to actuate the camera, and subsequently, when the trigger operating member is actuated, electric conduction is effected to the film feeding device so as to carry out the film feeding operation. While this construction can avoid such problem that extremely inappropriate photographic operation is performed, since there unavoidably exists a delay due to sequence of operation between closure of the main switch and actuation of the trigger operating means, and, when the trigger operation starts, the exposure control device has been brought to its stable operating condition, it is still not free from another problem such that waste in power consumption occurs when the main switch is foregotten to be disconnected in case of no photographic operation being done, because the current constantly flows through the exposure control device. As a solution to this problem, the method adopted in the conventional motion picture camera is that the trigger operation is performed in two stages. That is to say, delay in the operating strokes in the trigger operation is utilized in such a manner that no current flows through the exposure control device when the main switch is merely closed, but it flows therethrough when the trigger operating means is slightly actuated and the operation of the exposure control device is commenced, and when the trigger operating means is further actuated, the current then flows through the film feeding device to cause it to commence the film feeding operation. When such construction is adopted, no electric conduction is effected to the exposure control device unless the trigger operating means is actuated, even when the main switch is merely closed, hence there is no possibility of waste in the power consumption even if the camera is left as it is without turning off the main switch. However, this method is still not free from the problem. That is, since this latter method takes the timings for the power supply to both exposure control device and film feeding device by the operating strokes of the trigger operating means, if the trigger operating means is actuated too abruptly, the photographic operation starts with the exposure control device still being unstable in its operation, on account of which the photographic operation under inadequate exposure is resulted. Accordingly, it is desirable to have a cine camera of a construction such that no electric conduction is effected to the exposure control device with mere closure of the main switch, but such electric condition can first be effected by actuating the trigger operating means, and that, when the trigger operating means is actuated, there is automatically produced a delay time between commencement of electric conduction to the exposure control device and commencement of electric conduction to the film feeding device to actuate both devices sequentially.

Moreover, in the motion picture camera existing at present, there is the so-called sound motion picture camera capable of using both "silent film" which can record picture alone and "sound film" which can record both picture and sound simultaneously. This sound motion picture camera includes an intermittent film feeding device to intermittently feed the film at a picture image recording location, where the film is exposed, a continuous film feeding device to continuously feed the film at a sound recording location a sound recording device having a magnetic head to record sound signals on the film at the sound recording location, a loop sensor device to detect a film length between the picture image recording location and the sound recording location, and others. In this type of motion picture camera, the operations should be carried out so regularly and sequentially that electric supply may first be supplied to the sound recording device, while care is taken not to apply an output from the sound recording device to the magnetic head, then the continuous film feeding device may be actuated with simultaneous supply of the output from the sound recording device to the magnetic head, and subsequently the intermittent film feeding device may be actuated. If this operating sequence becomes inversed, in particular, if the operating sequence of the continuous film feeding device and the intermittent film feeding device becomes reversed, the film length between the picture image recording location and the sound recording location increases abnormally at the start of the photographic operation with the consequent occurrence of a problem such as jamming of the film within the camera.

In the heretofore known sound motion picture cameras, however, the start of the continuous film feeding device and the intermittent film feeding device depends almost entirely on a switching device which is turned on and off by a mechanical displacement caused by depression of the trigger operating means, hence its operation is extremely uncertain and unstable. Besides the above, the sound motion picture camera requires the following series of operations.

(1) "on" and "off" controls of the switch to effect electric condition to the exposure control circuit;

(2) setting of the loop sensor to a predetermined position;

(3) setting of a film guide member to the magnetic head disposed at the sound recording location so as to prevent sidewise deflection of the film during its forwarding operation;

(4) setting of a head pad to press-contract the magnetic surface of the film to the magnetic head;

(5) setting of the pinch roller to be press-contacted to the capstan;

(6) "on" and "off" controls of the switch to effect electric conduction to the motor circuit for driving the capstan;

(7) "on" and "off" controls of the switch to effect electric conduction to the motor drive circuit to operate the intermittent film feeding device at the picture image recording location after a predetermined time of the switch operation for effecting the electric conduction to the motor circuit to drive the capstan; and (8) switch control for feeding the output from the sound recording device to the magnetic head after the capstan driving motor and the intermittent film feeding device driving motor have reached their normal speed.

By the abovementioned series of operations being done sequentially and regularly, the normal film feeding and recording operations can first be realized. However, in the conventional sound motion picture camera which carries out these series of operations through depression of the trigger operating means, an operator should press such trigger operating means by his finger, the force of depression required of his finger being several kilograms, or so. Therefore, maintenance of such large amount of depressing force to the trigger operating means during the photo-taking operation causes considerable labor and hardship to the operator. On account of this, the operator gets very tired of his continuous pressing of the trigger operating means during the photo-taking operation, hence there frequently occur troubles such that he unavoidably releases his finger from the trigger operating means, and so on.

In addition, number of cinematographic enthusiasts is increasing nowadays, along with which increasing number of people adopt very special cinematographic techniques. In this consequence, it has been desired that a motion picture camera having functions of performing such special cinematographic techniques would appear. Such special cinematographic techniques are, for example, fade-in and fade-out operation of picture image, fade-in and fade-out of voice alone, fade-in and fade-out of both picture image and voice, overlapping of picture images alone, self-timer operation, single frame operation, interval timer operation, and so forth. There has so far existed a motion picture camera, in which some of such special techniques can be practiced, but not a single camera has ever appeared, in which all these special techniques as abovementioned could be performed in it. The reason for this is that, if the motion picture camera is constructed with a greater combination of these individual special techniques, the constituent elements of each control device in the camera becomes complicated and, moreover, cause logical contradiction among these elements, and that when the camera is constructed ignoring these problems, not only large space for arranging these control devices becomes necessary accompanied by increase in the overall outer size of the camera, but also the number of the operating means to operate each control device increases to inevitably cause the camera operations to be cumbersome.

SUMMARY OF THE INVENTION

In view of various points of problems inherent in the heretofore known motion picture camera as mentioned in the foregoing, it is the primary object of the present invention to provide an improved motion picture camera which successfully solves such problems.

It is the secondary object of the present invention to provide a motion picture camera, in which various elements related to photo-taking operations are automatically and sequentially operated with a predetermined relationship when a single trigger operating member is actuated, and in which there is provided a digital control device to automatically and sequentially stop these various elements with a predetermined relationship when the trigger operating member is stopped.

It is the third object of the present invention to provide a motion picture camera which is capable of automatically performing, upon closure of a cover of a film loading chamber after the film is loaded therein, setting of the loop sensor to a predetermined position, setting of the film guide means, setting of the head pad to be press-contacted to the magnetic head, and setting of the pinch roller to its preparatory position with respect to the capstan which is further capable of automatically and sequentially performing, when the trigger operating means is actuated after closure of the film loading chamber, effecting of electric conduction to the exposure control device, setting of the pinch roller to its operating position where it is resiliently contacted with the capstant, setting to effect electric conduction to the capstan driving motor, setting to effect electric conduction to the intermittent film feeding device driving motor, and switch controls for feeding an output from the sound recording device to the magnetic head, and which is provided with the digital control device to control sequential and regular resetting of each means.

It is the fourth object of the present invention to provide a motion picture camera capable of performing various special cinematographic operations in simple operations.

The foregoing objects and other objects of the present invention will become more apparent from the following detailed description of the invention when read in connection with the accompanying drawing.

BRIEF DESCRIPTION OF THE DRAWINGS

FIG. 1 shows an example of a commercially available film cassette preferred for use with the cine camera according to the present invention, wherein FIG. 1A is a perspective view of a silent film cassette containing an optically recordable silent film, as seen from the direction of its loading, and FIG. 1B is a perspective view of a sound film cassette containing a sound film capable of optically recording images and magnetically recording sounds as seen from the direction of its loading;

FIG. 2A is a side view showing an outer appearance of the cine camera according to the present invention;

FIG. 2B is another side view of the camera in FIG. 2A as seen from the back thereof;

FIG. 2C is still another side view showing the interior of the film cassette chamber with the film cassette lid of FIG. 2B being opened, FIG. 2C being shown in a state of the sound film cassette $C_2$ in FIG. 1B being loaded;

FIG. 5 is a perspective view for explaining the pinch roller preset mechanism shown in FIG. 3;

FIGS. 8 to 12 illustrate various states in which the shutter blades are controlled by the shutter opening angle varying mechanism shown in FIGS. 3 and 6, in which FIG. 10 shows a state wherein the shutter is fully open, FIGS. 8 and 11 show a state wherein the shutter is closed on its half-way, and FIGS. 9 and 12 show a state wherein the shutter is fully closed;

FIGS. 13 and 14 are side elevational views for explaining the operations of the overlap operating mechanism shown in FIG. 3, in which FIG. 13 shows a state wherein the overlap photography actuating button is depressed to start fade-out photography, and FIG. 14 shows a state, wherein the overlap photography actuating button is depressed to start fade-out photography;

FIGS. 16A, 16B, 16C and 16D show individual control circuits for controlling individual mechanisms shown in FIGS. 2 to 14 which are controlled by the control circuit shown in FIG. 15, wherein FIG. 16A indicates one embodiment of the drive circuit for drive-controlling the capstan driving motor Mc, and a drive circuit for driving the electromagnetic device PMg, FIG. 16B is one embodiment showing the film motor drive circuit for drive-controlling the motor $M_F$ to actuate both film forwarding mechanism and shutter rotation drive mechanism, FIG. 16C is a circuit diagram showing one embodiment of the recording circuit, and FIG. 16D is a circuit diagram showing one embodiment of the drive circuit for driving the electromagnetic device FMg shown in FIG. 3;

FIGS. 18(a) through 18(m) are explanatory diagrams for the stop-sequence in the sequence control circuit shown in FIG. 15;

DESCRIPTION OF THE PREFERRED EMBODIMENT

Figure 3A:
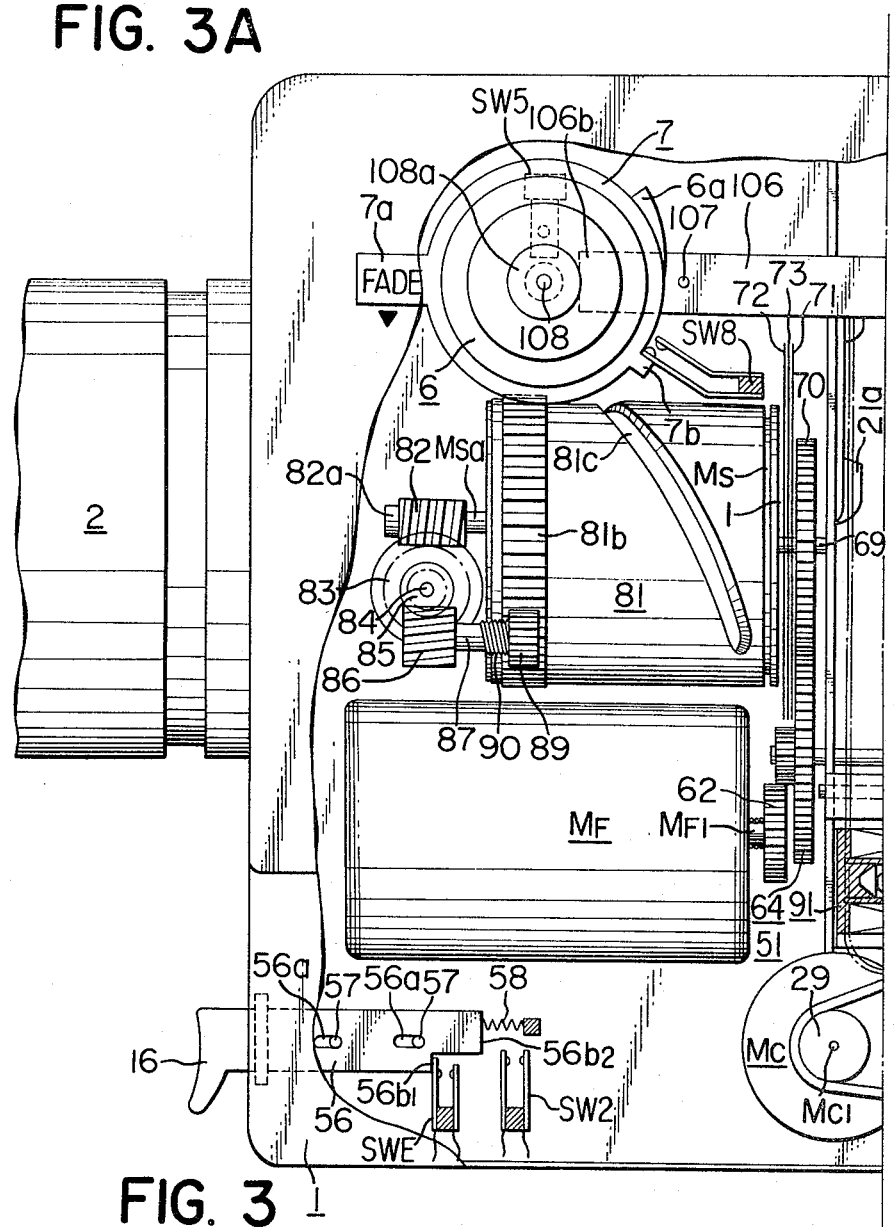
FIG. 3, composed of FIGS. 3A and 3B in combination, is a side view showing the construction of the mechanical components arranged inside the cine camera shown in FIG. 2.

Several embodiments of the cine camera according to the present invention will hereinafter be described in reference to the drawings. FIGS. 2A to 14 show the principal mechanical construction of the cine camera according to the present invention. Designated by 1 is a camera body, 1a a cassette-receiving chamber formed in the camera body 1, 2 a photographic lens structure secured to the front face of the camera body 1, and 3 an eye-cap secured to a viewfinder portion of the camera body 1. Designated by 7 is a ring-shaped fade photography operating member pivotally supported on the camera body 1. The member 7 has an operating knob 7a disposed outside the camera body 1, and a projected portion 7b for closing a normally opened switch SW8 which is secured in the interior of the camera body 1. The projected portion 7b is disposed at a position within the body 1 and capable of controlling the switch SW8. Designated by 6 is a ring-shaped, overlap photography cancel knob held within the cylinder of the fade photography operating member 7. The knob 6 has a control cam 6a inside the camera body 1 which, when the knob is turned to a position where a pointer 6a meets the mark "CANCEL" inscribed on the outer surface of the camera body and around the outer periphery of the knob 6, depresses a pin 107 studded in a sliding lever 106 for overlap photography operation to be described later to cause the sliding lever 106 to slidingly displace toward the right in FIG. 3, and cancels the overlap photography while it is being carried out. Designated by 5 is an overlap photography starting button for starting the overlap photography. This button 5 is slidable in the bore of the ring knob 6. The button 5 is secured to one end of a slidable shaft 108 slidably held at its other end by a portion 1A of the camera body 1. This other end of the slidable shaft 108 is slidably disposed within an opening 1A₁ formed in the portion 1A and constantly energized outwardly of the camera body 1 by a compression spring 109 also disposed within the opening 1A₁. The slidable shaft 108 fixedly holds thereon a disc-shaped flange 108a and has a stepped portion 108b for closing the normally open switch SW5 when the button 5 is depressed to displace the slidable shaft 108 inwardly. Denoted by 8 is a mode change-over operating ring secured to one end of a shaft 9 which is studded at its other end on a rotatable member 110 pivotally supported on the bottom wall 23 of the film-receiving chamber 1a. The shaft 9 fixedly holds thereon a disc-shaped flange 111 having a notch 111a. The ring 8 is also provided with a rotary switch mechanism 112 which is changed over in response to the rotational movement of the ring 8, and one electrical contact means 112a of this switch mechanism is secured to the inner surface of the ring 8 while the other electrical contact means 112b is secured to the camera body 1. A pointer 8a is provided on one perpheral part of the ring 8. Symbols "10⎾20⏋", "10⎾10⏋", "S", "P", "P.S", "1̄", "3̄", "1", "5̄", "20" and "60" are sequentially provided on the outer surface of the camera body 1 and around the outer periphery of the ring 8, as shown in FIG. 2(A). The pointer 8a may be adjusted to the position of any of these symbols by rotating the ring 8. Although not shown, a lock mechanism is provided on the lower surface of the ring 8. The lock mechanism is so adapted that it may lock the ring 8 against its rotation to prevent the pointer 8a from moving away from its position only when the pointer 8a on the ring 8 is at a position to meet with the symbol "P.S", and that it may not lock the ring 8 when the pointer 8a meets with any other symbol, thereby permitting its free rotation. Designated by 10 is a lock mechanism release button for unlocking the lock mechanism so as to permit the ring 8 to freely rotate. The lock mechanism can be released when the button 10 is slide down toward an arrow mark placed on the button 10.

Reference number 11 denotes a display plate having a recording level display window 11a and a source voltage display window 11b, 12 a source voltage checker button, and 13 a recording level regulation operating dial. Designated by 14 is a footage counter display section, and 15 an operating member for an eyepiece shutter (not shown) operating member. Denoted by 16 is a trigger button, and 17 a cover for selectively covering the cassette loading and unloading opening of the cassette-receiving chamber 1a. The cover 17 is secured to the camera body 1 by means of a hinge 18. The cover 17 is provided with a display window 17a for confirming, from the outside of the camera, whether a film cassette is loaded in the cassette receiving chamber, or not, or which type of film cassette C1 or C2 is loaded in the cassette-receiving chamber, and with a projection 17b formed in the inner surface thereof. Designated by 19 is a knob of lock operating means for locking the cover 17. The knob 19 is secured to a shaft 20 pivotally supported on the cover 17, and the inner side of the cover 17 is provided with a key portion 17c for engaging or disengaging a key hook 1b formed in one part of the camera body 1 and adapted to be rotated with the shaft 20 when the latter is rotated by operating the knob 19.

In the front wall 21 of the cassette receiving chamber 1a, there is a film gate plate 21a having an aperture $21a_1$ formed within the receiving chamber 1a. When the film cassette C1 or C2 shown in FIG. 1 is loaded into the cassette receiving chamber 1a, the film gate plate 21a (see FIG. 4) is covered by the exposure opening C1a of the cassette C1 or the exposure opening C2a of the cassette C2. Film F1 or F2 in the exposure opening C1a or C2a of the cassette C1 or C2 is disposed between the side walls $21a_2$ and $21a_3$ of the film gate plate 21a. Denoted by 22 is a film presence detecting piece extending through the bottom wall 23 of the cassette receiving chamber 1a into the receiving chamber 1a, one end 22a thereof being projectable from one side wall $21a_3$ of the gate plate 21a to the other side wall $21a_2$, and the other end 22b being adapted to contact bearing an electrically conductive piece 24 disposed on the back side of the bottom wall 23. The film presence detecting piece 22 is normally biased inwardly of the cassette receiving chamber 1a by a spring (not shown) and at least that portion of the other end 22b which contacts with the conductive piece 24 is formed of an electrically conductive material. This other end 22b and the conductive piece 24 together form a switch SW9. When the film cassette C1 or C2 is loaded into the cassette-receiving chamber 1a and the film F1 or F2 is urged against the surface 21a of the film gate plate, one end 22a of the detecting piece 22 is pushed away toward the bottom wall 23 by force of which the film inserted between the side walls $21a_2$ and $21a_3$ of the film gate plate 21a, whereby the detecting piece 22 is displaced to a position indicated by dot-and-dash line in FIG. 4, and the other end 22b is separated from the conductive piece 24 to open the switch SW9. Conversely, when no film cassette C1 or C2 is present in the cassette receiving chamber 1a, or, if present, when the film F1 or F2 is not loaded on the side walls $21a_2$ and $21a_3$ in a predetermined condition, or when the film F1 or F2 is damaged by some trouble to be out of its existence between the side walls $21a_2$ and $21a_3$, the detecting piece 22 is disposed at a position shown by solid line in FIG. 4, so that the end 22b of the detecting piece 22 contacts with the conductive piece 24 to close the switch SW9. Thus, the switch SW9 has a function of detecting whether the film F1 or F2 is present on the film gate plate 21a, or whether they are properly set.

The film cassette C1 shown in FIG. 1A and the film cassette C2 shown in FIG. 1B may be alternatively loaded into the film-receiving chamber 1a, and the position of FIG. 2C shows the film cassette C2 being loaded. When the film cassette C1 is loaded, it is disposed at the position indicated by dot-and-dash line. Positioning of the film cassette C1 and the film cassette C2 in the film-receiving chamber 1a is accomplished by a position controlling member 24 projected from the bottom wall 23. In other words, when the film cassette C1 is loaded in the film-receiving chamber 1a, this cassette C1 is disposed above the position controlling member 24, and when the film cassette C2 is loaded, this film cassette C2 is disposed on a state of a position ($H_2$—$H_1$) thereof escaping from the position controlling member 24 and projecting therebelow.

When inserted in the cassette-receiving chamber 1a, the film cassette C1 has an exposure opening C1a adapted to be positioned at an image recording location (a sound recording location) of the cassette-receiving chamber 1a corresponding to the gate plate 21, and the silent film F1 contained in the film cassette C1 is wound up on a take-up spool coaxial with the supply reel of the film cassette C1 through the exposure opening C1a. Also, when loaded in the cassette-receiving chamber 1a, the film cassette C2 has an exposure opening C2a adapted to be positioned at the image recording location of the film-receiving chamber 1a corresponding to the gate plate 21a, and a recording opening $C2_b$ adapted to be positioned at the sound recording location of the chamber 1a. The sound film F2 contained in the cassette C2 is wound up on a take-up spool coaxial with the supply spool in the cassette C2 through the exposure opening C2a and the sound recording opening C2b. The sound film F2 has a strip of magnetic recording material along one side edge on one surface thereof. Designated by 25 is a pull-down claw adapted to be intermittently engaged with the perforation of the film F1 or F2 existing in the exposure opening C1a or C2b of the cassette C1 or C2 alternatively loaded in the cassette-receiving chamber 1a and to transport the film F1 or F2 downstream through the gate plate 21a formed at the image recording location of the chamber 1a. This claw member 25 is operated by a known means. Denoted by 26 is a pressure pad disposed in an opposed relationship with a magnetic head 27 held by the position controlling member 24 with the film passage at the sound recording location of the chamber 1a being interposed therebetween. The pad 26 is for urging the film F2 at the sound recording opening $C2_b$ of the cassette C2 loaded in the chamber 1a against the magnetic head 27, and is normally energized toward the magnetic head 27 by a compression spring 35. Denoted by 28 is a capstan disposed at the sound recording location in the chamber 1a. The capstan 28 is supported on the camera body 1 for rotation and against axial sliding, and has a fly wheel 31 with a pulley 31a secured at the other end thereof. The capstan 28 is rotated at a substantially constant velocity by drive force of a constant speed motor Mc transmitted through an endless belt 30 extended over and between a pulley Mc1 secured to the output shaft Mc1 of the motor Mc and the pulley 31a of the flywheel 31. Designated by 32 is a pinch roller forming a film supply means for transporting the film F2 at the sound recording opening C2$_b$ of the cassette C2 loaded in the chamber 1a at a substantially constant velocity. The pinch roller 32 is disposed in an opposed relationship with the capstan 28 with the film passageway at the sound recording location of the chamber 1a being interposed therebetween. Denoted by 33 is a loop detecting member for detecting length of film between the film gate plate 21a and the magnetic head 27, the loop detecting member being in contact with the film F2 between the film gate plate 21a and the magnetic head 27. The loop detecting member 33 is pivotable about a shaft 33a supported on the camera body 1 and constantly energized in the clockwise direction by a compression spring 34. SW3 is a normally closed switch whose opening and closing is controlled by rotation of the loop detecting member 33. The switch SW3 remains closed when the loop detecting member 33 is rotationally displaced clockwisely, and is forced to open by the loop detecting member 33 when this member 33 is rotationally displaced counter-clockwisely.

In the cine camera of the present embodiment, when the cassette C2 is loaded into the cassette receiving chamber 1a, the amount of film F2 per unit time intermittently transported from the exposure opening C2a toward the recording opening C2b by the film pull-down claw 25 is approximately equal to the amount of film F2 per unit time transported at a substantially constant velocity at the sound recording opening C2b. However, length of the film between the film gate plate 21a and the magnetic head always varies. In other words, while the film means including the capstan 28 and the pinch roller 32 transports the film F2 at a constant velocity, the film feed means including the pull-down claw 25 transports the film F2 intermittently. On this account, at an initial stage, wherein the pull-down claw 25 has pulled down the film by an amount corresponding to one frame, the length of the film between the gate plate 21a and the magnetic head 27 is greater than a predetermined length of the film. Accordingly, the loop detecting member 33 in contact with the underside of the film F2 at the sound recording opening C2b of the cassette C2 is rotated counter-clockwisely by the gravity of the film F2 and reactional force of the loop portion, thereby opening the switch SW3. During a time period after the pull-down claw 25 has pulled down the film F2 by an amount corresponding to one frame until it starts the next pull-down, the film F2 between the film gate plate 21a and the magnetic head 27 is further transported to the downstream by the film feed means including the capstan 28 and the pinch roller 32. Thus, the amount of film between the film gate plate 21a and the magnetic head 27 is gradually decreased, and, accordingly, the loop detecting member 33 is rotated clockwisely to close the switch SW3 again. Thus, the switch SW3 is repetitively opened and closed by the loop detecting member 33 every time the film F2 is pulled down for one frame by the pull-down claw 25.

The camera body 1 covered with the cover 17 which closes the opening of the film-receiving chamber 1a is provided with an opening 1c at a location which, when the cover 17 is closed, corresponds to a projection 17b provided on the cover 17, and a portion of a pinch roller moving device for effecting the resilient engagement and disengagement of the pinch roller 32 with the capstan 28 is projected through the opening 1c. The pinch roller moving device is composed of an electromagnet means PMg, displacement members 35, 36, spring 37, rotatory members 38, 39, sliding member 40, tension spring 41, etc. The rotatory member 39 is rotatory about a pin 42 secured to the camera body 1, as shown in FIG. 5. One arm 39a of the rotatory member 39 is provided with a projection 39a$_1$ projectable through the opening 1c of the camera body 1, and the other arm 39b of the rotatory member 39 is provided with a cam 39b$_1$ for controlling the sliding movement of the sliding member 40. The amount of displacement of the projection 39a$_1$ in the direction, in which it is projected through the opening 1c is controlled by the engagement between the portion 39a$_2$ of the arm 39a and the edge portion of the opening 1c. The sliding member 40 is slidably mounted on a base plate 43 secured to the camera body 1 and the sliding movement thereof is controlled by a pin 43a studded on the base plate 43 and a slot 40a in the sliding member 40 engaged with the pin 43a. One end 40$_1$ of the sliding member 40 is normally engaged with the cam 39b of the rotatory member 39, and an end 40b$_1$ of a bent section 40b formed by bending a portion of the sliding member 40 is engaged with one arm 38a of the rotatory member 38 pivotable about a shaft 44 secured to the camera body 1. The spring 41 extends between a pin 43b studded on the base plate 43 and the arm 38a of the rotatory member 38. The spring 41 constantly energizes the pivotable member 38 in the counter-clockwise direction. Thus, when the cover 17 is opened, the spring 41 displaces the rotatory member 38 counter-clockwisely, the sliding member 40 upwardly, and the rotatory member 39 clockwisely, as shown in FIG. 5, and the projection 39a of the rotatory member 39 is prominently projected from the opening 1c. On the other arm 38b of the rotatory member 38, a pinch roller holding shaft 45 rotatably supported by the displacement member 35 is provided in a manner to pass through the arm 38b. The displacement member 35 and the rotatory member 38 are linked together through the shaft 45. The pinch roller 32 pivotably supported on the shaft 45. The displacement members 35 and 36 which contribute to displacement of the pinch roller 32 are rotatably supported on a shaft 46 secured to the camera body 1, and the spring 37 is disposed between the displacement members 35 and 36, the spring 37 constantly energizing the displacement member 35 for its counter-clockwise rotation, and the displacement 36 for its clockwise rotation. The displacement of the displacement members 35 and 36 in both mutually opposite directions by the spring 37 is controlled by an engaging piece 35a of the displacement member 35 which is bent to be engaged with the underside of the displacement member 36. The electromagnet means PMg comprises an electromagnetic coil PCL1, a U-shaped core 47 partly extending through the magnetic coil PCL1, a rotatory member 49 pivotally supported on a shaft 48 secured to the camera body 1, and an iron piece 51 rotatory held by a shaft 50 pivotally supported on the rotatory member 49. The rotatory member 49 is constantly energized counter-clockwisely by a tension spring 52, the amount of counter-clockwise rotational displacement of which is controlled by its contact with a pin 53 studded on the camera body 1. Designated by 54 is an adjust screw disposed at the free end of the rotatory member 49.

Figure 3:
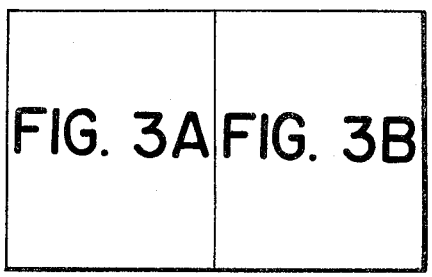
Figure 3B:
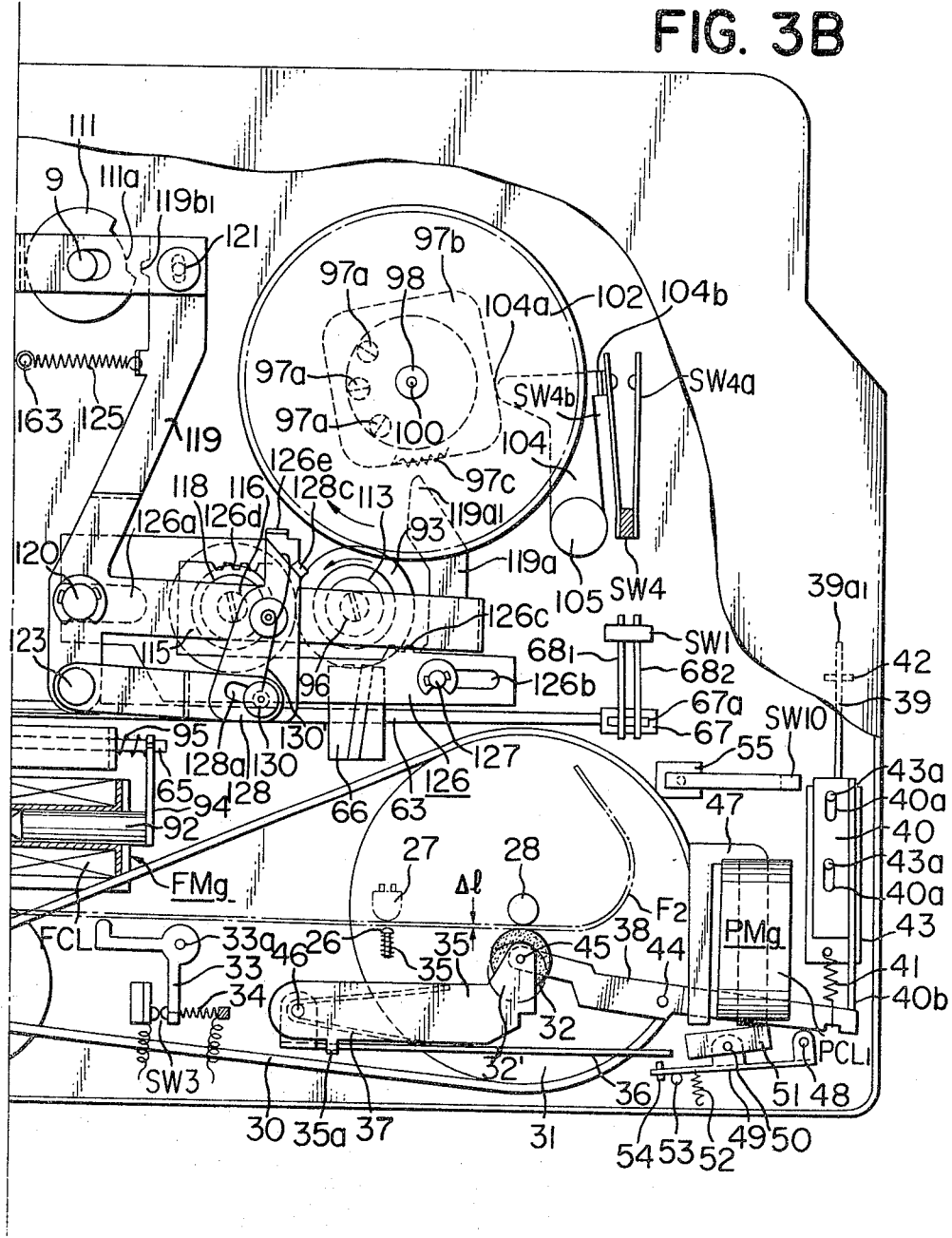
Figure 4:
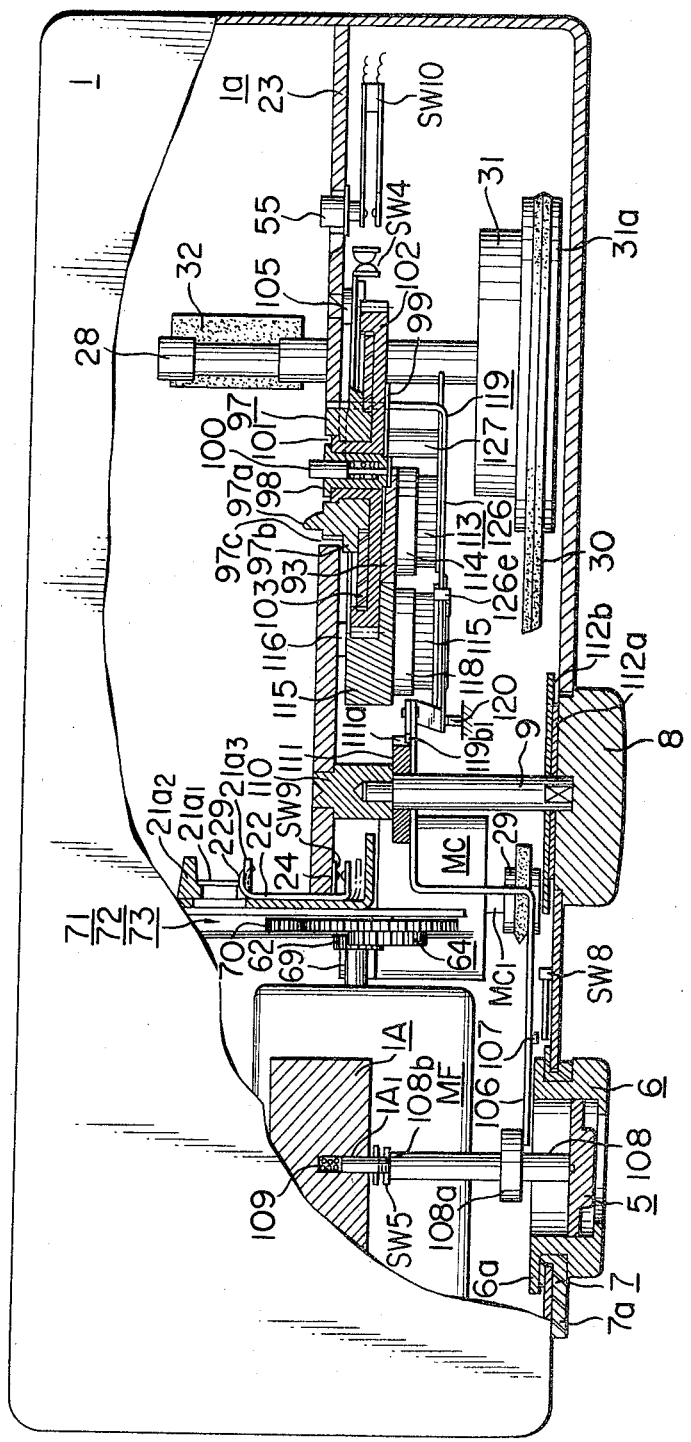
FIG. 4 is a longitudinal cross-sectional view taken along the line IV—IV in FIG. 2A but with the photographic lens structure and eye cap being omitted.

Operation of the pinch roller moving device so constructed will now be described. When the cover 17 is open, the tension of the spring 41 displaces the rotatory member 38 counter-clockwisely, the sliding member 40 upwardly and the pivotable member 39 clockwisely, as shown in FIG. 5, thereby causing the projection 39a of the rotatory member 39 to be prominently projected through the opening 1c of the camera body 1. At the same time, by the counter-clockwise rotation of the rotatory member 39, both displacement members 35 and 36 rotate clockwisely so that, as indicated by dot-and-dash line 32′, the pinch roller 32 is disposed at its rest position much spaced apart from the capstan 28. When the cover 17 is closed, the projection $39a_1$ of the rotatory member 39 projected through the opening 1c of the camera body 1 is pushed by the projection 17b of the cover 17, whereby the rotatory member 39 is pivotally displaced counter-clockwisely. When this occurs, the sliding member 40 engaged with the cam $39b_1$ of the rotatory member 39 is slidingly displaced to the side of the rotatory member 38 by the action of the cam $39b_1$. Also, by the sliding displacement of the sliding member 40, the rotatory member 38 engaged with the end $40b_1$ of the bend 40b of the sliding member 40 is pivoted clockwisely against force of the spring 41. At the same time, the displacement members 35 and 36 linked together by the rotatory member 38 and the shaft 45 are rotated counter-clockwisely to bring the pinch roller 32 to its preparatory position as shown by solid line in FIG. 3. In this state, however, the pinch roller 32 is not resiliently urged against the capstan 28. Therefore, the sound film F2 disposed between the pinch roller 32 and the capstan 28 is ready to be pulled out, if desired, from between the pinch roller 32 and the capstan 28. That is, when the front cover 17 is closed, the pinch roller 32 is brought to the preparatory position closely adjacent to the capstan 28 from the rest position much spaced apart with respect to the capstan 28. Displacement of the pinch roller from such preparatory position to an operative position, in which the pinch roller is in resilient contact with the capstan, is accomplished by the aforementioned electromagnet means PMg. More particularly, in the state of the pinch roller 32 being disposed at its preparatory position as shown in FIG. 3, when a current is supplied to the electromagnetic coil PCL1 by a means to be described later, the electromagnetic coil PCL1 is excited to magnetize the core 47. Upon magnetization of this core 47, the iron piece 51 is attracted to the core 47 and the rotatory member 49, along with the core 47, is pivotally displaced counter-clockwisely against force of the spring 52. When the rotatory member 49 is rotated clockwisely, the adjust screw 54 on the rotatory member 49 is engaged with the free end of the displacement member 36 to thereby rotate the displacement member 36 clockwisely. This clockwise rotation of the displacement member 36 is transmitted to the displacement member 37 through the spring 37 to rotate the displacement member 35 counter-clockwisely and the pivotable member 38 clockwisely against force of the spring 41. Such rotational displacement of the displacement member 35 and the rotatory member 38 brings the pinch roller 32 to its operative position, in which the pinch roller is in resilient engagement with the capstan 28. When the pinch roller 32 has been brought to the aforementioned operative position, the film F2 is firmly nipped between the pinch roller 32 and the capstan 28. The contact pressure with which the pinch roller 32 resiliently contacts the capstan 28 is provided by the charge of the spring 37, and the magnitude of this spring charge may be finely adjusted by turning the adjust screw 54 provided on the rotatory member 49 to adjust the amount of projection of the adjust screw 54 from the rotatory member 49 to the side of the displacement member 36. The return of the pinch roller 32 from its operative position to its preparatory position is accomplished by cutting off the current supply to the electromagnetic coil PCL1 of the electromagnetic means PMg. More particularly, when the current supply to the electromagnetic coil PCL1 is cut off, the electromagnetic coil PCL1 is deenergized to release the core 47 from the iron piece 51, so that the rotatory member 49 is rotationally displaced counter-clockwisely by force of the spring 52 until it contacts the pin 53. Along with this, the rotatory member 38 rotates counter-clockwisely by force of the spring 41 until it contacts the bend 40b of the sliding plate 40. At the same time, the displacement members 35 and 36 are rotationally displaced clockwisely, whereby the pinch roller 32 returns from its operative position to its preparatory position. Further, return of the pinch roller 32 from its preparatory position to its rest position is accomplished by opening the cover 17. More particularly, when the cover 17 is opened, the pressure, with which the projection 17b of the cover 17 has pressed the projection $39a_1$ of the rotatory member 39, is released, and the rotatory member 38 is subjected to the bias of the spring 41 through the rotatory member 38 and the sliding member 40, and rotated until it is controlled by the $39a_2$ of the rotatory member 39 and the edge of the opening 1c of the camera body 1. By the clockwise rotation of the rotatory member 39, the sliding place 40 is displaced toward the side of the rotatory member 39 energization of the spring 41 under the control of the cam 39b of the rotatory member 39, as shown in FIG. 5, and, at the same time, the rotatory member 38 is further rotated counter-clockwisely with a result that the capstan 32 returns to its rest position as indicated by dot-and-dash line 32′ in FIG. 3. Although not shown, the pinch roller moving device, the pad 26 and the loop detecting member 33 are mechanically associated with one another so that, when the pinch roller 32 is at its rest position, the loop detecting member 33 is brought to a position, in which it is out of engagement with the film F2, and the pad 26 is brought to a position spaced apart from the magnetic head 27. Conversely, in association with displacement of the pinch roller 32 from its rest position to its preparatory position, the loop detecting member 33 and the pad 26 are controlled so that the loop detecting member 33 is permitted to contact the film F2 and the pad 26 is urged against the magnetic head 27.

A cassette type detecting member 55 shown within the cassette-receiving chamber 1a is projected into the chamber 1a through the bottom wall 23 thereof. The energizing force, with which the detecting member 55 is projected into the chamber 1a, is provided by a contact piece of a normally open switch SW10 in contact with the other end of the detecting member 55. The location where the detecting member 55 is projected into the chamber 1a is not covered by the cassette C1 when the silent film cassette C1 is loaded in the chamber 1a, and is covered by the cassette C2 when the sound film cassette C2 is loaded in the chamber 1a. The switch SW10 is closed by the pressing force of the detecting member 55 when the cassette C2 is loaded into the chamber 1a to displace the detecting member 55 outwardly of the chamber 1a.

The aforementioned trigger button 16 is secured to a trigger plate 56 having a slot 56 engaged by a pin 57 secured to the camera body 1. By a compression spring 58, the trigger plate 56 is energized so that the trigger button 16 is always projected outwardly of the camera body, and, when the trigger button 16 is depressed by the operator's finger against the energizing force of the spring 58, the trigger plate 56 is slidingly displaced rightward in FIG. 3 by the guide of the slot 56a and the pin 57. When the trigger plate 56 is displaced rightwardly, the stepped portion $56b_1$ of the trigger plate 56 first contacts a normally open switch SWE to close this switch, and then, while maintaining the switch SWE in a closed state, the end $56b_2$ contacts a normally open switch SW2 to close the same. When the pressing force to the trigger button 16 is released, the trigger button 16 and the trigger plate 56 are slidingly returned leftwardly, in FIG. 3, by energizing force of the spring 58, when the switch SW2 is first opened, and then the switch SWE is opened. Thus, the trigger button 16, the trigger plate 56, the switches SWE and SW2, and the spring 58 together constitute a two-stage trigger device.

Figure 6A:
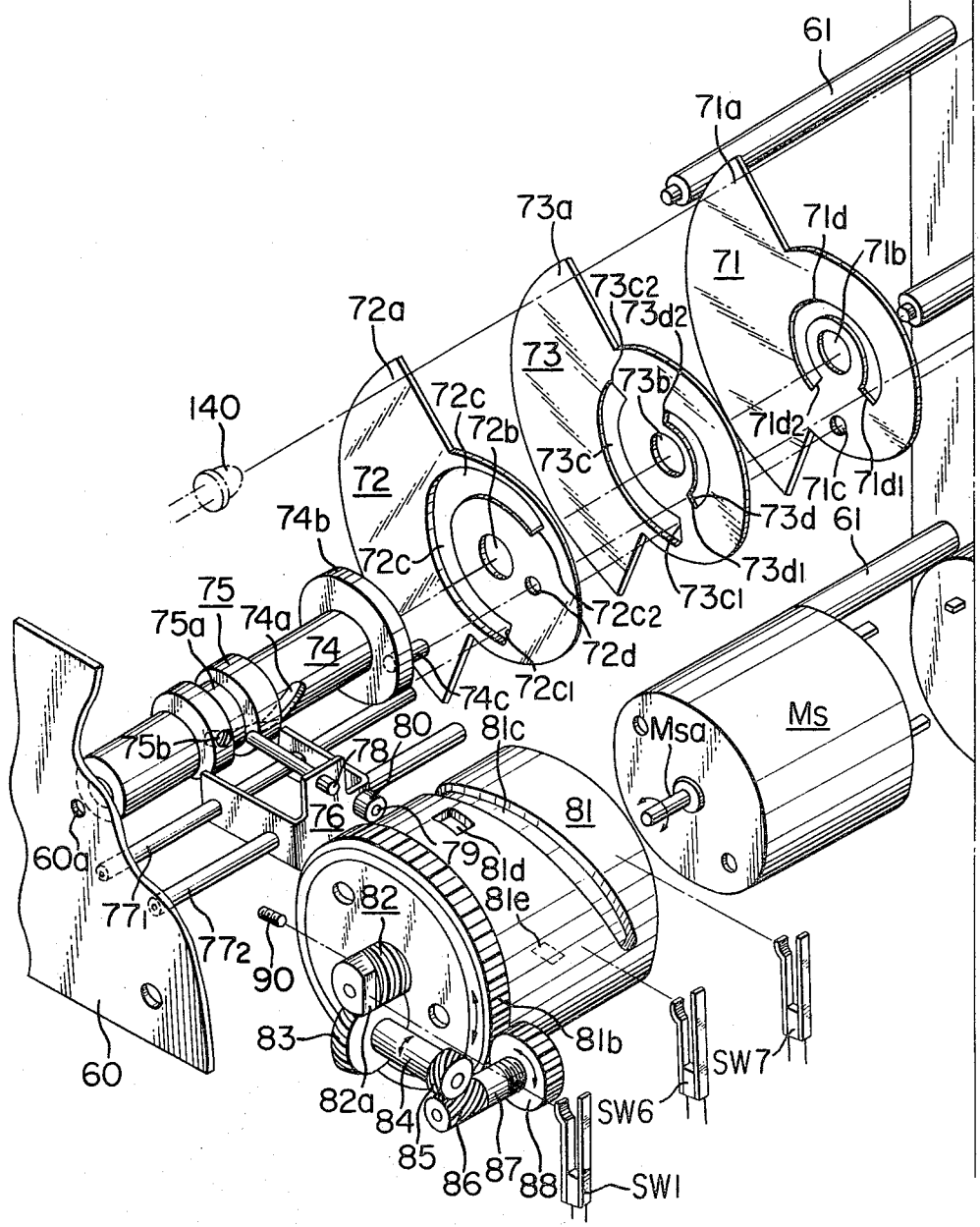
FIG. 6, composed of FIGS. 6A and 6B in combination, is an exploded view for explaining the shutter driving mechanism and the shutter opening angle varying mechanism shown in FIG. 3.
Figure 6B:
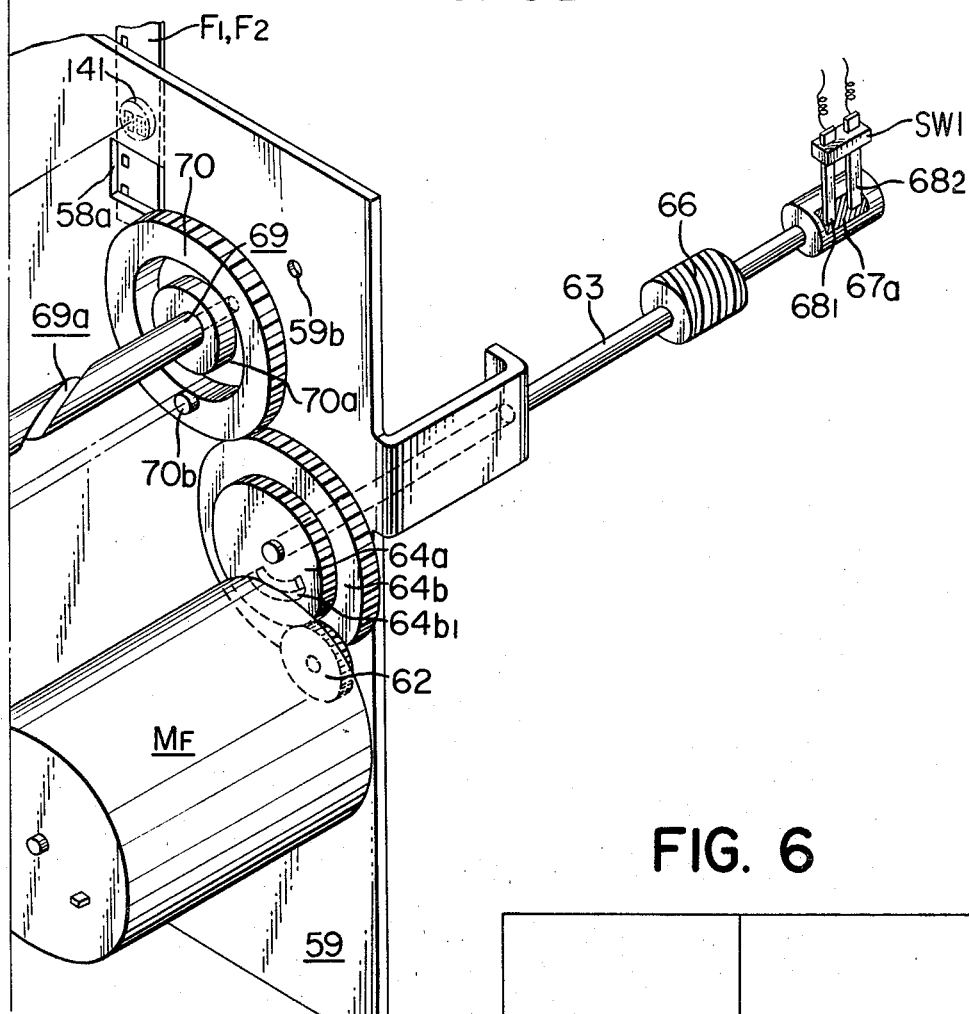
Figure 6:
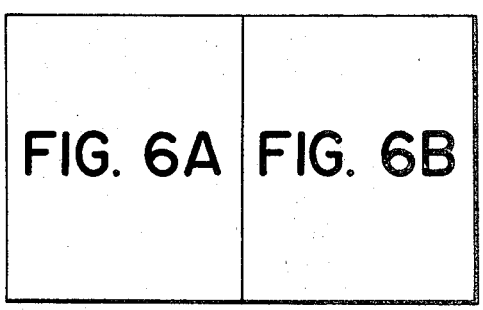
Figure 7:
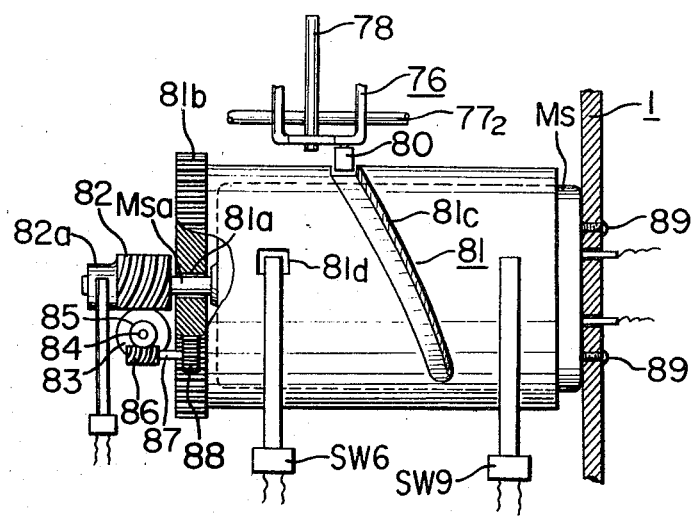
FIG. 7 is a side elevational view showing the driving section of the shutter opening angle varying mechanism shown in FIGS. 3 and 6.
Figure 8:
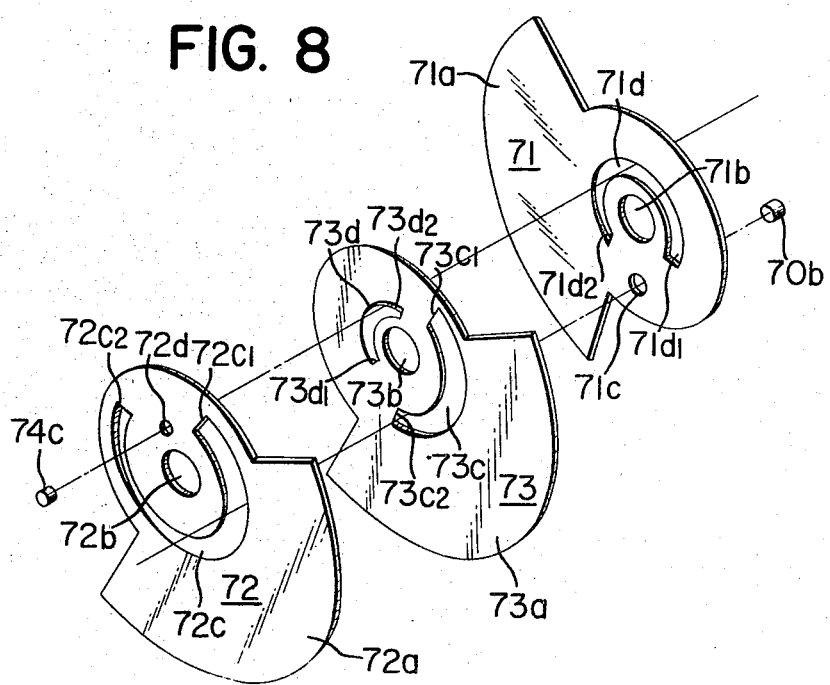
Figure 9:
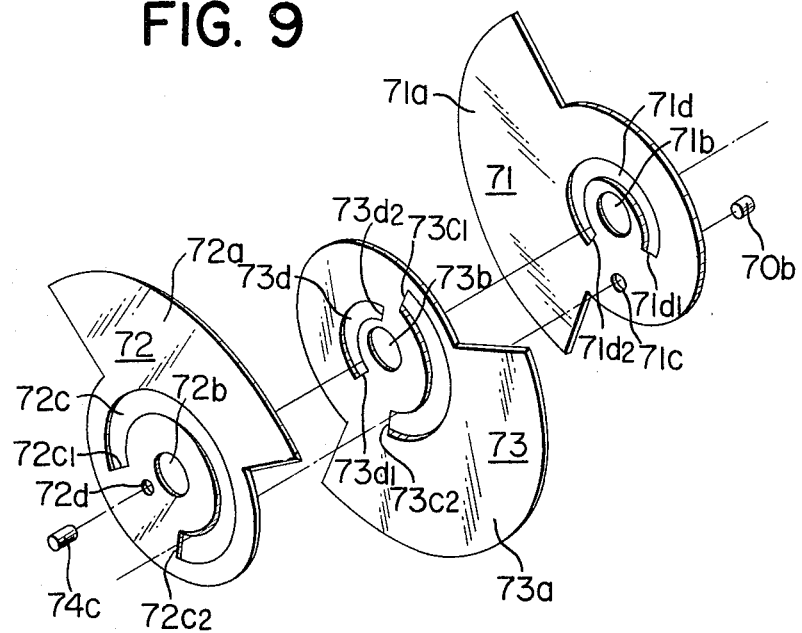
Figure 10:
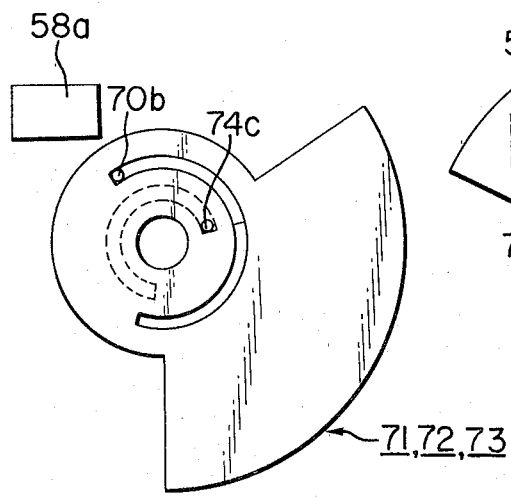
Figure 11:
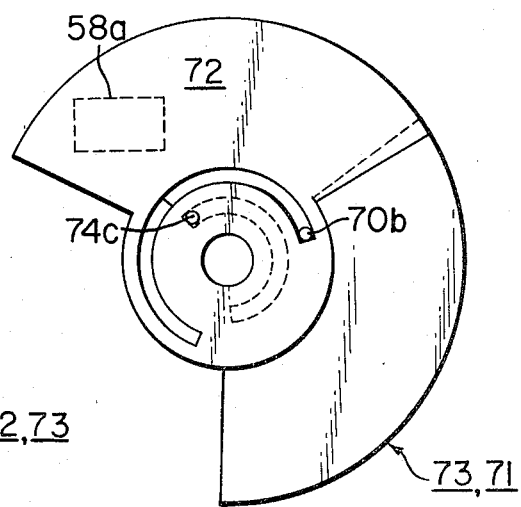
Figure 12:
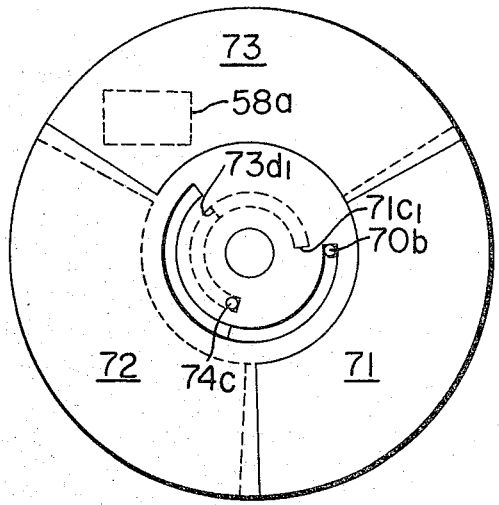

Designated by 58 is a first base plate having a portion thereof serving also as the front wall of the cassette-receiving chamber 1a. The base plate 58 is secured to the camera body 1, and has an aperture 58a at a location corresponding to the aperture 21a of the film gate plate 21. Denoted by 59 is a second base plate disposed in opposed relationship with the first base plate 58. The first base plate 58 and the second base plate 59 are secured each other with a predetermined space interval by a plurality of spacer bars 61, each being secured at one end thereof to the first base plate 58 and at the other end thereof to the second base plate 59. MF refers to a reversible motor secured to the camera body 62. The rotational output of the motor MF is used to operate a rotatory shutter to be described, a film take-up drive mechanism, an overlap mechanism, and an intermittent film feeding mechanism for driving the aforementioned pull-down claw 25. Designated by 62 is a gear operatively secured to the output shaft MF1 of the motor MF through a known slip mechanism. Denoted by 63 is a rotary shaft extending through the first base plate 59 and rotatably journalled to the base place 59. On one end of the rotary shaft 63 extending from the first base plate 59 toward the motor MF, there is secured a gear 64 comprising a first gear portion 64a and a second gear portion 64b. The gear 64 has a blocking recess 64b, formed at a portion thereof opposed to the first base plate 59, into which the tip end of a stop member 65 to be described is received for engagement therewith to restrain the gear. The first gear portion 64a of the gear 64 is always in mesh engagement with the gear 62. At the other end of the rotary shaft 63 extending from the first base plate 59 in the direction opposite to the motor MF, there are secured a worm gear 66 and a cylindrical drum 67. A conductive piece 67a is provided on one peripheral surface part of the cylindrical drum 67. Two conductive pieces $68_1$ and $68_2$ are urged against the peripheral surface of the cylindrical drum 67. These conductive pieces $68_1$ and $68_2$ are so constructed that they may be electrically connected through the conductive piece 67a when the cylindrical drum 67 rotates along with the rotary shaft 63 and the conductive piece 67a on the drum 67 comes to a position where it contacts both conductive pieces $68_1$ and $68_2$ in common. The conductive pieces $68_1$, $68_2$ and the drum 67 together constitute a switch SW1. Denoted by 69 is a main shutter shaft having its one end engaged in the aperture 59b of the first base plate 59 and its other end engaged in the aperture 60a of the second base plate 60, and rotatably supported by the first and the second base plates 59, 60. On the main shutter shaft 69, there is formed a spiral groove 69a. Denoted by 70 is a gear secured on the main shutter shaft 69. A ring-shaped groove 70a and a pin 70b projecting toward the second base plate 60 are provided on the side surface of the gear 70 which is opposed to the second base plate 60. The gear 70 is always in mesh-engagement with the second gear 64b of the gear 64. The gear 70 and the second gear 64b have substantially the same diameter and number of teeth. The rotary shaft 63 and the main shutter shaft 69, both being rotated by the rotational drive force of the motor MF, are therefore rotated at a ratio of substantially 1:1. Although not shown, the gear 70 is always in mesh-engagement with a gear for transmitting the drive force of the motor MF to the known intermittent film feeding mechanism which causes the pull-down claw 25 to transport the film F1 or F2 intermittently from one frame to another on the film gate plate 21. The intermittent film feeding mechanism is also associated so that the pull-down claw 25 transports the film F1 or F2 by one frame while the gear 70 is making one full rotation. Designated by 71, 72 and 73 are shutter blades having sector-shaped shutter portions 71a, 72a and 73a, respectively. The shutter blade 71 is used as a main shutter blade, the shutter blade 72 is used as a first auxiliary shutter blade, and the shutter blade 73 is used as a second auxiliary shutter blade. The angle of arcs of the respective shutter portions 71a, 72a and 73a of the shutter blades 71, 72 and 73, are slightly greater than 120°. The shutter blades 71, 72 and 73 are formed therein with center holes 71b, 72b and 73b. If an imaginary first circle having a radius "D" and an imaginary second circle having a radius "d" are drawn on the plane of each of the shutter blades 71, 72 and 73 with the center holes 71b, 72b and 73b as the cross-over point, an aperture 71c is formed in one circumferential part of the first circle of the main shutter blade 71, a slot 71d commensurate with the circumference of the second circle is formed around the circumference of the second circle, a slot 72c commensurate with the first circumference of the first auxiliary shutter blade 72 is formed around the circumference, an aperture 72d is formed on the circumference of the second circle, a slot 73c commensurate with the first circumference of the second auxiliary shutter blade 73 is formed around the circumference, and a slot 73d commensurate with the circumference of the second circle is formed therearound. The pin 70b on the gear 70 extends through the aperture 71c of the main shutter blade 71, the slot 73c of the second auxiliary shutter blade 73, and the slot 72c of the first auxiliary shutter blade 72. The main shutter blade 71 is in a fixed relationship with the gear 70 by the engagement between the aperture 71c and the pin 70b, while the other auxiliary shutter blades 72 and 73 are loosely fitted by the slots 72c and 73c. Designated by 74 is a cylindrical auxiliary shutter shaft concentrically disposed over the main shutter shaft 69 in a manner to surround the same. The auxiliary shutter shaft 74 is rotatable with respect to the main shutter shaft 69 but is not slidable axially. In one part of this auxiliary shutter shaft 74, there is formed a spiral groove 74a inclined in the opposite direction to the spiral groove 69a formed on the main shutter shaft 69. Also, the shaft 74 is provided with a flanged portion 74b on its one end opposite to the second base plate 60. On the surface of the flanged portion 74b which is opposed to the second base plate 60, there is provided a pin 74c extending toward the first base plate 59. The pin 74c extends into the groove 70a of the gear 70 through the aperture 72d in the first auxiliary shutter blade 72, the slot 73d in the second auxiliary shutter blade 73, and the slot 71d in the main shutter blade 71, all being disposed between the flanged portion 74b of the auxiliary shutter shaft 74 and the gear 70. Designated by 75 is a shutter opening angle adjust cylinder concentrically disposed over the auxiliary shutter shaft 74, in a manner to be slideable and rotatable with respect to the auxiliary shutter shaft 74. The outer peripheral surface of the adjusting cylinder 75 is formed with an endless groove 75a. Also, the adjusting cylinder 75 is provided with a pin 75b projectively studded inwardly of the adjusting cylinder 74. The pin 75b extends through the spiral groove 74a of the auxiliary shutter shaft 74 and is engaged with the spiral groove 69a of the main shutter shaft 69. By this pin 75b, the adjusting cylinder 75, the main shutter shaft 69 and the auxiliary shutter shaft 74 are operatively engaged for rotation together. This adjusting cylinder 75, when slid on the auxiliary shutter shaft 75 by means to be described, causes the main shutter shaft 69 and the auxiliary shutter shaft 74 to rotate in the mutually opposite directions due to engagement of the pin 75b with the spiral grooves 74a, 69a. Designated by 76 is a sliding member slidably held by a pair of guide bars $77_1$ and $77_2$ secured between the first base plate 59 and the second base plate 60. The guide bars $77_1$ and $77_2$ extend substantially parallel to the main shutter shaft 69. Denoted by 78 is a pin secured on the sliding member 76. The free end of the pin 78 is loosely engaged with the endless groove 75a of the adjusting cylinder 75. Thus, when the sliding member 76 slides along the guide bars $77_1$ and $77_2$, the pin 78 causes the adjusting cylinder 75 to be slidden together on the auxiliary shutter shaft 74, although the pin affects in no way the rotation of the adjusting cylinder 75 when the latter is rotated with the main shutter shaft 69 and the auxiliary shutter shaft 74. Denoted by 79 is a shaft extending in the opposite direction to the adjusting cylinder 75 and secured to the sliding member 76, and 80 a rotatable ring rotatably disposed on the shaft 79. Ms is a shutter opening angle regulating motor secured to the camera body 1 by means of screws 89. Denoted by 81 is a drug cup-shaped cam ring which is so formed as to fully cover the motor Ms leaving only one end face thereof, as shown in FIG. 7. In the bottom wall of the cam ring 81, there is formed a through-hole 81a, through which the output shaft Msa of the motor Ms passes. At the same time, a gear portion 81b is provided on the peripheral end surface thereof. In the peripheral surface of the cam ring 81, there are provided a cam groove 81c, in which the rotatable ring 80 is loosely fitted, a switch control recess 81d for effecting the opening of a switch SW6, and a control recess 81e for effecting the opening of a switch SW9. The cam ring 81 itself is freely rotatable with respect to the motor Ms. Designated by 82 is a worm gear fitted on the output shaft Msa of the motor Ms extending outwardly of the cam ring 81 through the hole 81a of the cam ring 81, the worm gear 82 being firmly secured to the output shaft by means of set screw 90. The worm gear 82 is provided with a switch control cam 82a for controlling ON-OFF of a switch Sw11 for each full rotation of the output shaft Msa of the motor Ms. Denoted by 83 is a worm wheel secured to a shaft 84 rotatably journalled to the camera body 1, and 85 a helical gear secured to the shaft 84. The worm wheel 83 is always in mesh-engagement with the worm gear 82. Denoted by 86 is a helical gear secured to a shaft 87 rotatably journalled to the camera body 1, and 88 a gear operatively coupled to the shaft 87 through a friction mechanism. The gear 86 is always in mesh-engagement with the gear 84, and also the gear 89 is always in mesh-engagement with the gear portion 81b of the cam ring 81. The gears 82, 83, 84, 86, 88, 81b and the rotary shafts 84 and 87 together constitute a speed reduction mechanism. The rotational output of the motor 81 may be transmitted through the speed reduction mechanism to the cam ring 81 to rotate this cam ring on the peripheral surface of the motor Ms. The mechanism so constructed as to rotate the cam ring 81 by the rotational force of the motor Ms can remarkably shorten the axial length of the shutter opening angle varying mechanism. The rotational displacement of the cam ring 81 rotated by the rotational force of the motor Ms as described above controls the angle of opening of the shutter formed by the shutter blades 71, 72 and 73. More particularly, the main shutter blade 71 is secured to the gear 70 through the pin 70b and the first auxiliary shutter blade 72 is secured to the auxiliary shutter shaft 74 through the pin 74c, but the second auxiliary shutter blade 73 is not secured to the auxiliary shutter shaft 74 nor to the main shutter shaft 69. When one of a pair of conductive pieces of the switch SW6, which is normally closed by contacting the outer periphery of the cam ring 81, is trapped in the recess 81d on the cam ring 81, as shown in FIG. 7, to thereby open the switch SW6, the sliding member 76 is displaced to its leftmost position. In this state, as shown in FIGS. 6 and 9, the pin 70b is engaged with the hole of 71c of the main shutter blade 71, and is in contact with one end $73c_1$ of the slot 73c in the second auxiliary shutter blade 73 and one end $72c_1$ of the slot 72c in the first auxiliary shutter blade 72. Also the pin 74c is engaged with the aperture 72d in the first auxiliary shutter blade 72, and is in contact with one end $73d_1$ of the slot 73d in the second auxiliary shutter blade 73 and one end $71d_1$ of the slot 71d in the main shutter blade 71. That is, in this state, the three shutter blades 71, 72 and 73 are overlapped almost completely the shutter opening angle of which is about 240°, the full open angle. As the motor Ms is rotated by a means to be described later and the cam ring 81 is rotated counterclockwisely in FIG. 6, the switch SW6 which has been in its open state due to one of the above mentioned conductive pieces being trapped in the recess 81d on the cam ring 81 is brought to a closed state due to the conductive piece escaping from the recess 81d and being urged against the peripheral surface of the cam ring 81. At the same time, the sliding member 76 is gradually displaced toward the first base plate 59 under the control of the cam groove 81c on the cam ring 81. Consequently, the adjusting cylinder 75 also slides on the auxiliary shutter shaft 74 toward the first base plate 59. When the adjusting cylinder 75 is slide-moved toward the first base plate 59, the auxiliary shutter shaft 74 starts counter-clockwise rotation in FIG. 6 with respect to the main shutter shaft 69 by engagement of the pin 75b of the adjusting cylinder 75, the spiral groove of the auxiliary shutter shaft 74 and the spiral groove 69a of te main shutter shaft 69, whereby, the first auxiliary shutter blade 72 independently rotates counter-clockwise with respect to the second auxiliary shutter blade 73 and the main shutter blade 71 to thus gradually narrow the shutter opening angle. When the auxiliary shutter shaft 74 rotates by about 120° to bring the pin 74c of the auxiliary shutter shaft 74 to a position where it contacts with the other end $73d_2$ of the slot 73d in the second auxiliary shutter blade 73 (see FIGS. 8 and 11), and the shaft is further rotated counter-clockwise, the second auxiliary shutter blade 73 is pulled on by the pin 74c and the first and the second auxiliary shutter blade 72, 73 are rotated with respect to the main shutter blade 71 to further narrow the shutter opening angle. When the auxiliary shutter shaft 74 rotates by about 240°, and the other end $72c_2$ of the slot 72c in the first auxiliary shutter blade 72 and the other end $73c_2$ of the slot 73c of the second auxiliary shutter blade 73 come to bear against the pin 70b on the gear 70, the shutter becomes fully closed as shown in FIGS. 9 and 12. In this state, the adjusting cylinder 75 is at the closest position to the first base plate 59. Along with this, one of the contacts of the switch SW7, which is normally in contact with the cam ring 81 to be in a closed state, is trapped in the recess 81c of the cam ring 81 whereby the switch SW7 is opened to produce an output signal to signify that the shutter has become fully closed, and the fade-out operation completes. In order for the fade-in operation to be performed, the motor Ms is caused to rotate reversely. More particularly, upon full closure of the shutter, the cam ring 81 is rotationally displaced to the extremity of the counter-clockwise direction and the adjusting cylinder 75 is slidingly displaced to the extremity of its direction toward the first base plate 59. In this state, when the cam ring 81 is rotated clockwisely by the reverse rotation of the motor Ms, the contact piece of the switch SW7 which has so far been trapped in the recess 81c of the cam ring 81 escapes from such recess 81c, thus closing the switch SW7 again. When the cam ring 81 is rotated clockwisely, the sliding member 76 is gradually displaced toward the second base plate 60 under the control of the cam groove 81c on the cam ring 81. Consequently, the adjusting cylinder 75 also slides on the auxiliary shutter shaft 74 toward the second base plate 60, but, when the adjusting cylinder 75 slides toward the second base plate 60, the auxiliary shutter shaft 74 is rotationally displaced clockwisely relative to the main shutter shaft 69. When the auxiliary shutter shaft 74 is rotated clockwisely the first auxiliary shutter blade 72 is gradually rotated clockwisely with respect to the second auxiliary shutter blade 73 and the main shutter blade 71, thereby widening the shutter opening angle. When the auxiliary shutter shaft 74 is returned by about 120°, the pin 74c of the auxiliary shutter shaft 74 comes to a position, in which it contacts the other end $73d_1$ of the slot 73d in the second auxiliary shutter blade 73. As the auxiliary shutter shaft 74 is further rotated clockwisely, the pin 74c pulls the second auxiliary shutter blade 73 whereby the first and second auxiliary shutter blades 72 and 73 are rotated relative to the main shutter blade 71, thus further widening the opening angle of the shutter. When the auxiliary shutter shaft 74 returns by about 240°, the main shutter blade 71, the first auxiliary shutter blade 72 and the second auxiliary shutter blade 73 perfectly overlap to assume the full open state as shown in FIGS. 6 and 10. This completes the fade-in operation.

The electromagnet device FMg, secured to the first base plate 59, is provided to stop the operation of the intermittent film feeding device, the shutter device, etc., and comprises an electromagnetic coil FCL, an iron core 91, a round iron bar 92, stopper member 65, a connector piece 94, and a spring 95. The electromagnetic coil FCL is wound in a cylindrical form, and held on the first base plate 59 through an insulator interposed therebetween. The iron bar 92 is slidably disposed within the cylindrically shaped electromagnetic coil FCL. The stopper member 65 is held on the base plate 59 at a location where it is engageable with the blocking recess 65b of the gear 64, and in a state where it is slidable substantially perpendicularly with respect to the lateral surface of the gear 64. One end of the iron bar 92 and the stopper member 65 are coupled together by the connector piece 94 so as to slide together, and are constantly energized in a direction to be away from the first base plate 59 by the spring 91. When they are displaced in the direction to be away from the first base plate 59, the stopper member 65 is not engageable with the blocking recess 64b of the gear 64. When a current is supplied to the electromagnetic coil FCL of the electromagnet device MFg to excite the coil FCL and thereby to magnetize the core 91, the iron bar 92 is attracted to the core 91, whereby the stopper member 65 is press-contacted to the lateral side of the rotating gear 64 against energized force of the spring 95. In this state, when the blocking recess 64b of the gear 64 comes to a position corresponding to the stopper member 65, this stopper member 65 is restrained in the recess 64b of the gear 64 to forcibly hinder rotation of the gear 64. That is, by this stoppage of rotation of the gear 64, not only the operation of the intermittent film feeding mechanism is stopped, but also rotation of the shutter and rotational shaft 63 is also stopped. When the current supply to the electromagnetic coil FCL is cut off, the stopper member 65 and the iron bar 92 return again to the position to be away from the first base plate 59 by the energized force of the spring 95, and assume a state to permit rotation of the gear 64.

Designated by 93 is a gear rotatably supported on a fixed shaft which, in turn, is secured to the main body 1. The gear 93 is always in mesh-engagement with the worm gear 65. Denoted by 97 is a substantially annular take-up shaft having a plurality of pawls 97a to be engaged with the take-up shaft $C1_c$ or $C2_c$ of the cassette C1 or C2 when one of these cassettes is loaded in the film-receiving chamber 1a. The take-up shaft 97 has a portion projected into the chamber 1a through the opening in the bottom wall 23 of the chamber 1a. In the outer peripheral portion disposed at the back side of the bottom wall 23, a substantially rectangular cam portion 97b and a gear portion 97c are integrally formed as shown in FIG. 3. 98 denotes a cylindrical member securely held by a base plate 99 which is secured to the camera body 1. Disposed in the cylindrical member 98 are a slidable pin 100 and a compression spring 101 which normally energizes the pin 100 inwardly of the chamber 1a. The functions of the pin 100 and spring 101 are fully described in U.S. Pat. No. 3,860,195. Briefly describing, when a known sound film cassette C2 having a releasable reverse rotation preventive mechanism is loaded, they release the anti-reverse rotation preventive mechanism, and, when a known silent film cassette C1 having a non-releaseable reverse rotation preventive mechanism is loaded, the pin 100 escapes from within the chamber 1a. Designated by 102 is a gear having a portion thereof disposed between the inner peripheral surface of the take-up shaft 97 and the outer peripheral surface of the cylindrical member 98, and rotatably supported by the cylindrical member 98. The take-up shaft 97 is rotatably mounted on the gear 102. The gear 102 is always in mesh-engagement with the gear 93 so that it may transmit driving force of the gear 102 to the take-up shaft 97 through a ring shaped friction member 103 interposed between the gear 102 and the take-up shaft 97. Numeral 104 denotes a cam follower plate pivotally supported on a shaft 105 which is secured to the bottom wall 23. The cam follower plate 104 has a cam follower portion 104a which constantly contacts the cam portion 97b on the take-up shaft 97 and an engaging portion 104b which is engaged with an electrical contact $SW_4b$, one of two electrical contacts $SW_{4a}$ and $SW_{4b}$ constituting a normally open type switch SW4. The cam follower plate 104 is so energized by the electrical contact SW4b of the switch SW4 that the cam follower portion 104a may contact the cam portion 97b of the take-up shaft 97. When the take-up shaft 97 rotates, the cam follower plate 104 rotates clockwisely in FIG. 3 at every time the top of the cam portion 92b comes to a position corresponding to the cam follower 104a of the cam follower plate 104, thereby causing the electrical contact SW4b to contact with the electrical contact SW4a. Accordingly, in the present embodiment, the switch SW4 repeats its opening-closing operation four times during one full rotation of the take-up shaft 97. The switch SW4 is used as a film feed signal. That is, when the exposure of the film F1 or F2 in the film cassette C1 or C2 loaded in the chamber 1a has been completed and the take-up shaft C1c or C2c of the film cassette $C_1$ or $C_2$ becomes no longer rotatable, the take-up shaft 97 also becomes unrotatable, whereby rotation of the gear 102 is absorbed by the friction member 103. Accordingly, when the take-up shaft 97 stops, the switch SW4 does not repeat its opening-closing operation and this signal information is applied as an input to means to be described later.

Designated by 113 is a gear rotatably supported on the shaft 96, on which the gear 93 is also rotatably supported. The gears 113 and 93 are operatively coupled through a known one-way clutch mechanism 114. The one-way clutch mechanism 114 is so constructed that it may transmit rotation of the gear 93 to the gear 113 when the gear 93 is rotated counter-clockwisely, and that it may cause slipping action between the gear 93 and the clutch mechanism 114 when the gear 93 is rotated clockwisely so as not to transmit rotation of the gear 93 to the gear 113. Denoted by 115 is a gear rotatably supported on a fixed shaft 116 which is secured to the bottom wall 23. The gear 115 is always in mesh-engagement with the gear 93. Numeral 117 designates a gear rotatably supported on the fixed shaft 116, on which the gear 115 is rotationally supported. The gears 115 and 117 are operatively coupled together through a known one-way clutch mechanism 118. The one-way clutch mechanism 118 is so constructed that it may transmit the rotation of the gear 115 to the gear 117 when the gear 115 is rotated counter-clockwisely, and that it may cause slipping action between the gear 115 and the clutch mechanism 118 when the gear 115 is rotated clockwisely so as not to transmit rotation of the gear 115 to the gear 117. 119 denotes a pivotable member pivotally supported on a shaft 120 which is secured to the camera body 1. The pivotable member 119 has a restraining arm portion 129a which is having a restraining pawl $119a_1$ engageable with the gear portion 97c of the take-up shaft 97, when the pivotable member 119 is pivoted counter-clockwisely, to thereby temporarily stop rotation of the take-up shaft 97, and which is disengageable from the gear portion 97c when the pivotable member is rotated clockwisely, a link arm portion 119b linked to one end 106a of the sliding member 106 through a pin 121, and a holding arm portion 119c for securely holding a fixed member 122 through a pin 123. The pivotable member 119 is constantly energized counter-clockwise by a tension spring 125 engaged with a pin 124 one end of which is studded in the link arm portion 119b and the other end of which is studded in the camera body 1. The linking between the link arm portion 119b of the pivotable member 119 and the sliding lever 106 is accomplished by the engagement of the pin 121 extending through the slot 106d of the sliding lever 106 and studded in the link arm portion 119b of the pivotable member 119. The link arm portion 119b is provided with an engaging portion $119b_1$ to be engaged with a notch by a cut-away 111a provided in the flange 111. The engaging portion $119b_1$ and the notch 111a of the flange 111 are respectively disposed at locations corresponding to "P" or "P.S." when the pointer 8a on the mode change-over operating ring 8 is disposed at these portions. When the overlap photography starting button 5 is not depressed, the sliding lever 106 has its one end 106b placed on the flange 108a whereby it is placed in a state of its being rightwardly displaced in FIG. 3. In this state, the pivotable member 119 is placed in a condition wherein the restraining pawl $119a_1$ of the pivotable member 119 is displaced clockwisely so as not to be engaged with the gear portion 97c. Also, in this state, the engaging portion 119b is placed at a position where it is not engaged with the notch 111a of the flange 111. In a state of the engaging portion $119b_1$ of the pivotable member 119 corresponding to the notch 111a of the flange 111, when the starting button 5 is depressed and the sliding shaft 108 is slidingly displaced inwardly of the camera against energizing force of the spring 109, the flange 108a is disengaged from the one end 106b of the sliding lever 106. The sliding lever 106 is subjected to energizing force of the spring 125 through the pivotable member 119 and is slid leftwardly in FIG. 3 in association with the counter-clockwise rotation of the pivotable member 119, being guided along the slot 106c formed in the sliding member 106 engaged with the shaft 9, whereby the engaging portion $119b_1$ of the pivotable member 119 is engaged with the notch 111a of the flange 111 and the end 106b of the sliding lever 106 contacts the peripheral surface of the sliding shaft 108 (see FIG. 12). The state, in which the sliding shaft 108 has shifted inwardly of the camera, is maintained with the upper surface of the flange 108a being press-contacted to the end 106b of the sliding lever 106, even if the starting button 5 is released. The release continues until the sliding lever 106 is again displaced rightwardly in FIG. 13, namely, until the end 106b of the sliding lever 106 is disposed outside the flange 108. The return of the sliding lever and the pivotable member 119 to the position of FIG. 3, namely, the displacement of the sliding lever 106 and the pivotable member 119 to cause the end 106b of the sliding lever 106 to be located outside the flange 108a, is usually effected in the step of the overlapping photography to be described later. If, however, it is desired to return them prior to completion of the overlapping step, it can be done by rotating the cancel knob 6 until the pointer 6a on the knob 6 comes to a position corresponding to the mark "CANCEL". Thus, when the knob 6 is rotated until the pointer 6 comes to the position corresponding to the mark "CANCEL", the control cam pointer 6 rotating with the knob 6 contacts the pin 107 on the sliding lever 106 to enable the sliding lever 106 to be displaced rightwardly against energizing force of the spring 125 until the end 106b of the slidable lever 106 is positioned outside the flange 108a. When the sliding lever 106 is displaced until the end 106a of the lever 106 is positioned outside the flange 108a, the sliding shaft 108 is returned toward the outside of the camera by force of the spring 109 and the peripheral surface of the flange 108a is again brought to a state, in which it contacts the end 106a of the sliding lever 106. In this manner, after the knob 6 is turned until the pointer 6a of the knob 6 comes to the position of the mark "CANCEL", and when the knob 6 is again returned to its initial position, the lever restores to its position of FIG. 3.

Figure 13:
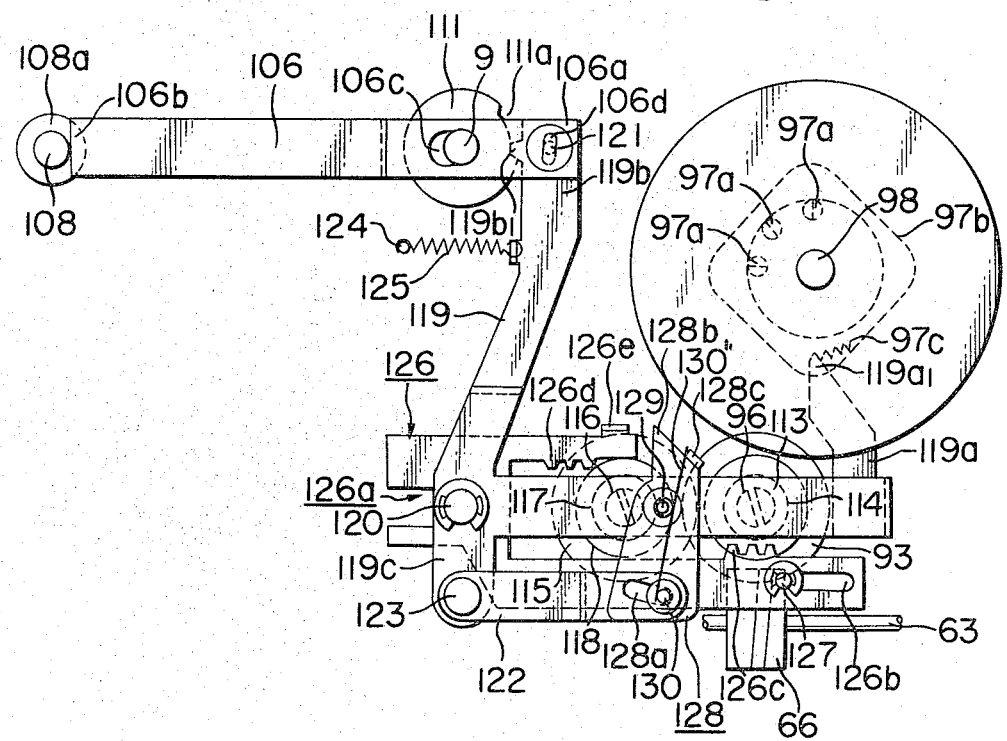
Figure 14:
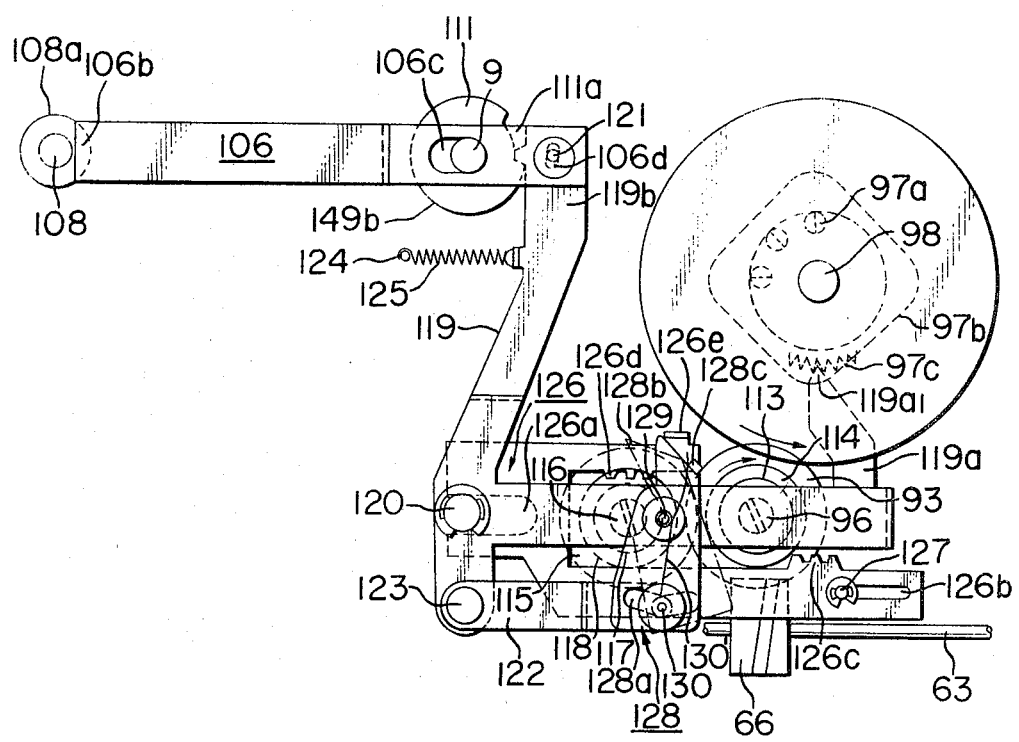

Designated by 126 is a moving member having a U-shaped portion 126a slidably engaged with the fixed shaft 120, a slot 126b, with which a fixed shaft 127 secured to the bottom wall 23 is engaged, a rack portion 126c engageable with the gear 113, a rack portion 126d engageable with the gear 117, and a bent portion 126e bent toward the pivotable member 119. In the state wherein the moving member 126 is displaced leftwardly so that the gear 113 and the rack portion 126c may be engaged with each other as shown in FIG. 13, when the gear 93 is rotated counter-clockwisely the rotation of which causes the gear 113 to also rotate counter-clockwisely by the above mentioned operation of the clutch mechanism 114, the moving member 126 moves until the gear 117 and the rack 126d are in a mesh-engagement relationship with each other in the right direction as shown in FIG. 3 by the mesh engagement of the gear 113 and the rack portion 126c, as shown, and until the gear 113 is disengaged from the rack portion 126c. In that case, the rotation of the gear 115 is not transmitted to the gear 117 on account of the above-mentioned operation of the clutch mechanism 115, even if the gear 117 comes into mesh-engagement with the rack 126d. Therefore the moving member 126 is affected in no way. Thus, in the state wherein the moving member 126 has been displaced rightwardly so that the gear 117 and the rack portion 126d are brought to mesh-engagement, when the gear 93 is rotated clockwisely, the gear 115 is rotated counter-clockwisely. This counter-clockwise rotation of the gear 115 also causes counter-clockwise rotation of the gear 117 by the above-mentioned operation of the clutch mechanism 114, and the rotation of the gear 117 leftwardly displaces the moving member 126 by the engagement of the gear 117 with the rack portion 126d. Such displacement of the moving member 126 continues until the gear 113 meshes with the rack portion 126c and the gear 117 is disengaged from the rack portion 126d. Again in this case, the engagement between the gear 113 and the rack portion 126c in no way affects the moving member 126, because rotational force of the gear 93 is not transmitted to the gear 113 by the operation of the clutch mechanism 114.

Designated by 128 is a pivotable member pivotally supported on a pin 129 studded in the restraining arm portion 119a of the pivotable member 119. The amount of pivotal movement of the pivotable member 128 is limited by the engagement between a slot 128a formed in the member 128 and a pin 130 studded in the fixed member 122. The pivotable member 128 has an engaging portion 128b to be engaged with the bent portion 126e of the moving member 126, and a spring engaging portion 128c. The pivotable member 128 is also provided with a spring 130 held by the pin 129 in such a manner that one end of the spring 130 may be engaged with the engaging portion 128c and the other end be engaged with the pin 130. The spring 130 normally energizes the pivotable member 128 to rotate counter-clockwise about the pin 129. The relationship between the pivotable member 128 and the moving member 126 is such that, when the moving member 126 is displacing rightwardly, the bent portion 126e of the moving member 126 is positioned to the right of the engaging portion 128b of the pivotable member 128, and that, when the moving member 126 is displacing leftwardly, the bent portion 126e of the moving member 126 is positioned to the left of the engaging portion 128b of the pivotable member 128. When the moving member 126 is displaced leftwardly, the bent portion 126e strikes against the engaging portion 128b, but the pivotable member 128 is permitted to rotate against the force of the spring 130 for its counter-clockwise rotation, hence the leftward displacement of the moving member 126 is facilitated by urging the bent portion 126c. Contact of the bent portion 126c to the engaging portion 128b takes place when the moving member displaces to the right from its position at the left side. In this case, however, since the clockwise rotational displacement of the pivotable member 128 is limited by the slot 126b and the pin 130, the pivotable member 128 does not rotate clockwisely so that the rightward movement of the moving member 126 is not easily carried out. Accordingly, when the moving member 126 is displaced rightwardly by the above-described operation, the bent portion 126e urges the engaging portion 128c to its clockwise rotation so that the pivotable member 119 is pivoted clockwisely about the pin 120. Thus, when the pivotable member 119 is rotated clockwisely, the engaging portion 119b₁ of the pivotable member 119 retracts out of the notch 111a of the flange 111 and in association with rotation of the pivotable member 119, the sliding lever 106 also slides rightwardly to release the engagement between the flange 108a and the end 106b of the sliding lever 106, thereby permitting the sliding shaft 108 to return to its initial position. When the moving member 126 has been completely displaced rightwardly to release the engagement between the bent portion 126c and the engaging portion 128c, the pivotable member 119 is again rotatively returned counter-clockwisely by the spring 125. In this case, however, the end 106b of the sliding lever 106 contacts the peripheral surface of the flange 108a, on account of which the pivotable member 119 is maintained in its rotational condition until the time just before the engaging portion 119b of the pivotable member 119 enters the notch 111a of the flange 111.

The mechanical construction of the cine camera according to the present invention has so far been described. In FIG. 6, the lamp 140 and the light-receiving element 141 indicated by dot-and-dash line are disposed on the opposite sides of the shutter comprising the shutter blades 71, 72 and 73. In the shown embodiment, instead of the mechanically constructed switch SW1, an electrical switch SW1' is employed. Such arrangement of the lamp 140 and the light-receiving element 114 with the above-mentioned shutter there-between provides a pulse-like signal from the light-receiving element 114 at every time the shutter passes between the lamp 140 and the element 114, and such signal replaces the signal of the switch SW1.

Figure 15B:
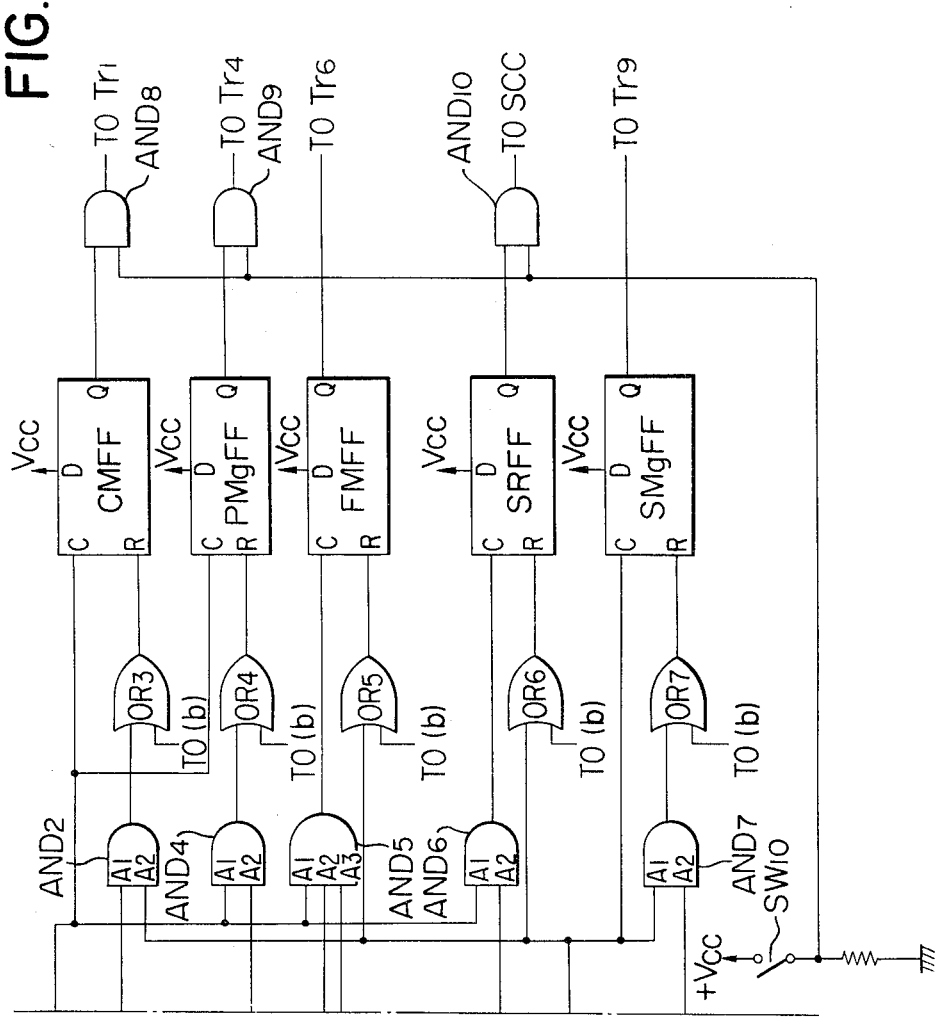
FIG. 15, composed of FIGS. 15A and 15B in combination, shows a circuit diagram of one embodiment of the sequence control circuit for the cine camera according to the present invention as illustrated in FIGS. 2A to 14.

FIG. 15 shows one embodiment of the sequence control circuit for the cine camera according to the present invention as illustrated in FIGS. 2 to 14, wherein $AST_1$ designates an AND gate having two input terminals, one of which is connected to the switch $SW_2$ shown in FIG. 3. $FF_1$ and $FF_2$ are D-type flip-flops. The $D_1$ input terminal of the flip-flop $FF_1$ is connected to the output terminal of the AND gate $AST_1$, and the $Q_1$ output terminal of $FF_1$ is connected to the $D_2$ input terminal of the flip-flop $FF_2$. The $Q_2$ output terminal of the flip-flop $FF_2$ is connected to one input terminal of an exclusive OR gate $ex_1$. The other input terminal of the gate $ex_1$ is connected to the $Q_1$ output terminal of the flip-flop $FF_1$. By so connecting the D-type flip-flop $FF_1$ and $FF_2$ and the exclusive OR gate $ex_1$, a single pulse for resetting a binary counter $CC_1$ is put out from the output terminal of the exclusive $CC_1$ is put out from the output terminal of the exclusive OR gate $ex_1$ after triggering. $OR_1$ is an OR gate having two input terminals, one of which is connected to the output terminal of the exclusive OR gate $ex_1$. The output terminal of the OR gate $OR_1$ is connected to the reset terminal R of the counter $CC_1$. AND1 is an AND gate for transmitting a clock pulse CP having a cycle of 1 millisecond generated from a clock pulse generator (not shown) to the counter $CC_1$ for executing the start sequence to be described. The input terminal A1 of the AND gate AND1 is connected to the Q1 output terminal of the flip-flop FF1 and the input terminal A3 of the AND gate AND1 is connected to the output terminal 128 of the counter CC1 through an inverter IN1. The clock pulse CP is applied to the A2 input terminal of the AND gate AND1. The output terminal of the gate AND1 is connected to the clock input terminal C of the counter CC1 through an OR gate OR2. FF3 is a D-type flip-flop for producing a stop sequence control signal output for controlling the stop sequence to be described. The D input terminal of the flip-flop FF3 is connected to the Q1 output terminal of the flip-flop FF1 through an inverter IN2, and the clock input terminal C of the flip-flop FF3 is connected to the switch SW1 as explained in reference to FIGS. 3 and 6 which is opened and closed at every time the intermittent film forwarding claw feeds the film F1 or F2 by one frame on the film gate plate 21. The reset input terminal R of the flip-flop FF3 is connected to the Q1 output terminal of the flip-flop FF1. AND2 is an AND gate constituting a gate circuit for transmitting the clock pulse CP for executing the stop sequence to the counter $CC_1$ in response to the aforementioned stop sequence control signal. The A1 input terminal of the AND gate AND2 is connected to the output terminal 64 of the counter CC1 through an inverter INk, and the A2 input terminal thereof is connected to the Q output terminal of the flip-flop FF3. The clock pulse CP is applied to the A3 input terminal of the AND gate AND2 and the output terminal thereof is connected to the input terminal of the OR gate OR2. CMFF is a D-type flip-flop for driving the capstan motor. A voltage Vcc is applied to the D input terminal of the flip-flop CMFF. The clock input terminal C of the flip-flop CMFF is connected to the Q1 output terminal of the flip-flop FF1, and the flip-flop CMFF is set by the Q1 output of the flip-flop FF1. The reset input terminal R of the flip-flop CMFF is connected to the output terminal of the AND gate AND3 through an OR gate OR3. The input terminal A1 of the AND gate AND3 is connected to the output terminal "64" of the counter CC1 and the input terminal A2 thereof is connected to the Q output terminal of the flip-flop FF3. The flip-flop CMFF is reset when the counter CC1 has counted 64 clock pulses CP during the stop sequence to thereby stop the capstan motor Mc. PmgFF is a D-type flip-flop for driving the pinch roller magnet and a voltge Vcc is applied to the D input of the flip-flop PMgFF. The clock input terminal C of the flip-flop PMgFF is connected to the Q1 output terminal of the flip-flop FF1, and the flip-flop PMgFF is set by the Q1 output during the start sequence to energize the coil PCL1 of the electromagnet means Pmg shown in FIG. 3. The reset input terminal R of the flip-flop PMgFF is connected to the output terminal of an AND gate AND4 through an OR gate OR4. The AND gate AND4 has two input terminals, one of which is connected to the output terminal "32" of the counter CC1 and the other of which is connected to the Q1 output terminal of the flip-flop FF1. The output terminal of the AND gate AND4 is connected to one input terminal of the OR gate OR4 having two input terminals. The output terminal of the OR gate OR4 is connected to the reset terminal R of the flip-flop PMgFF. The flip-flop PMgFF is designed so as to be reset when the counter CC1 has counted 32 pulses. FMFF is a flip-flop for driving the film motor voltage Vcc is applied to the D input terminal of the flip-flop FMFF. The clock input terminal C of the flip-flop FMFF is connected to the input terminal of an AND gate AND5, and the reset terminal R thereof is connected to the output terminal of an OR gate OR5. The A1 input terminal of the AND gate AND5 is connected to the A1 input terminal of the AND gate AND4, the A2 input terminal thereof is connected to the output terminal "32" of the counter CC1, and the A3 input terminal thereof is connected to the output terminal "128" of the counter CC1. One input terminal of an OR gate OR6 having two input terminals is connected to the Q output terminal of the flip-flop FF3. The flip-flop FMFF is so constructed that it may be set when the counter CC1 has counted 96 clock pulses during the start sequence to thereby drive the film drive motor MF, and that it may be reset in response to the stop sequence control signal. SRFF is a D-type flip-flop for producing a recording signal output for effecting the recording by a recording circuit to be described. A voltage Vcc is applied to the D input terminal of the flip-flop SRFF, and the clock input terminal C of the flip-flop SRFF is connected to the output terminal of an AND gate AND6, while the reset terminal R thereof is connected to the output terminal of an OR gate OR6. One input terminal A1 of the AND gate AND6 is connected to the Q1 output terminal of the flip-flop FF1 and the other input terminal A2 thereof is connected to the output terminal "128" of the counter CC1. One input terminal of the OR gate OR6 having two input terminals is connected to the Q output terminal of the flip-flop FF3. The flip-flop SRFF may be set when the counter CC1 has counted 128 clock pulses during the start sequence, and may be reset in response to the stop sequence control signal.

SMgFF is a D-type flip-flop for driving the stop magnet. A voltage Vcc is applied to the D input terminal of the flip-flop SMgFF. The clock input terminal C of the SMgFF is connected to the Q output terminal of the flip-flop FF3, and the reset terminal R thereof is connected to the output terminal of an AND gate AND7 through an OR gate OR7. One input terminal A1 of the AND gate AND7 is connected to the Q output terminal of the flip-flop FF3' while the other output terminal A2 is connected to the output terminal "32" of the counter CC1. The flip-flop SMgFF is so constructed that it may be set in response to the sequence control signal and may be reset when the counter CC1 has counted 32 clock pulses CP during the stop sequence.

AND8, AND9 and AND10 are AND gates, each having two input terminals. One input terminal of the AND gate AND8 is connected to the Q output terminal of the flip-flop CMFF, one input terminal of the AND gate AND9 is connected to the Q output of the flip-flop PMgFF, and one input terminal of the AND gate AND10 is connected to the Q output terminal of the flip-flop SRFF. The other input terminals of the AND gate AND8, AND9 and AND10 are commonly connected to the switch SW10 which is closed by displacement of the cassette type detecting member 55 when the sound film cassette C2 is loaded in the cassette-receiving chamber 1a and when the cassette type detecting member 55 is pushed by a portion of the cassette C2 and retracted from within the chamber 1a. When the switch SW10 is closed, a high-level signal is applied to each of the input terminals connected to the switch SW10. Accordingly, the Q outputs of the flip-flops CMFF, PMgFF and SRFF are applied as input to circuits to be described only when the switch SW10 is closed, namely, when the sound film cassette C2 is loaded in the chamber 1a. C1 is a capacitor C1, and R1 a resistor. These capacitor and resistor R1 together constitute a time constant circuit. The output terminal b of the time constant circuit is connected to the other input terminals of the OR gates OR1, OR3, OR4, OR5, OR6 and OR7.

The time constant circuit is so constructed that it may produce momentarily a power-up clear signal output PUC from its output terminal b when the main switch $SW_M$ operatively associated with the operation of the operating knob 4 shown in FIG. 2A is closed. EE is a known automation aperture control circuit having a metering circuit. The control circuit EE is connected to an EE switch $SW_E$ which may be closed by a first stroke of the trigger means comprising a trigger button 16 and a trigger plate 56. CT1 is a binary counter. The reset input terminal of the counter CT1 is connected to the switch $SW_E$ through an inverter TDIN1, the clock input terminal C thereof is connected to the output terminal of an AND gate TDA1, and the output terminal "512" is connected to the other input terminal of the AND gate AST1. The AND gate TDA1 has two input terminals, one of which is applied with the clock pulse CP. The other input terminal is connected to the output terminal "512" of the counter CT1 through an inverter TDIN2. The AND gate TDA1, the inverters TDIN1 and TDIN2 and the counter CT1 together constitute a timer circuit for producing a trigger signal output to other circuits after the aperture control circuit EE has become stable in operation subsequent to commencement of the triggering operation of the trigger means. The flip-flops FF1, FF2, FF3, CMFF, PMgFF, FMFF, SRFF and SMgFF are set in synchronism with the rising of the pulse, and the counter CC1 effects counting operation in synchronism with the trailing of the pulse. In the drawing, the lamp 140 and the light receiving element 141 comprising a phototransistor, both being indicated by dotted lines show an electrical switch shown in FIG. 6, and these show a modification for detecting the shutter rotation instead of the switch SW1.

FIGS. 16A to 16D are circuit diagrams controlled by the control circuit shown in FIG. 15 to separately control individual mechanisms of the cine camera shown in FIGS. 2a to 14.

FIG. 16A is a circuit diagram showing one embodiment of the drive circuit to drive-control the abovementioned motor Mc and electro-magnet device PMg. In this drawing, the circuit enclosed by a broken line A indicates a capstan drive circuit, while the circuit enclosed by another broken line B indicates a pinch roller drive circuit. Reference symbols $Tr_1$, $Tr_2$, and $Tr_3$ refer to switching transistors. The base of the transistor $Tr_1$ is connected to the output terminal of the abovementioned AND gate $AND_8$ shown in FIG. 15 through a resistor $r_1$, and the collector thereof is connected to the base of the abovementioned transistor $Tr_2$. A voltage Vcc is applied to the emitter of the abovementioned transistor $Tr_2$, and the input terminal of a speed control circuit $SCIC_1$ is connected to the collector thereof. The base of the transistor $Tr_3$ is connected with the output terminal of the speed control circuit $SCIC_1$ through a resistor $r_2$, and the collector thereof is connected with the abovementioned motor Mc. These transistors $Tr_1$, $Tr_2$ and $Tr_3$, resistors $r_1$ and $r_2$, motor Mc, and speed control circuit $SCIC_1$ constitute the abovementioned capstan motor drive circuit. Incidentally, the speed control circuit $SCIC_1$ uses an IC (integrated circuit) No. TCA955 of Siemens A.G., West Germany. $Tr_4$ and $Tr_5$ are respectively power supply switching transistors. The base of the transistor $Tr_4$ is connected with the output terminal of the abovementioned AND gate $AND_9$ shown in FIG. 15 through a resistor $r_3$, while the collector thereof is connected with the base of the transistor $Tr_5$ through a resistor $R_4$. The emitter of the transistor $Tr_5$ is applied thereto with a voltage Vcc, while the collector thereof is connected with the collector of the abovementioned transistor $Tr_2$ through a resistor $r_5$ and, at the same time, with the exciting winding $PCL_1$ of the eletromagnet device PMg shown in FIG. 3.

FIG. 16B is a circuit diagram showing one embodiment of the film motor drive circuit to control driving of the abovementioned motor $M_F$, in which reference symbols $Tr_6$, $Tr_7$ and $Tr_8$ refer to the switching transistors. The base of the transistor $Tr_6$ is connected with the output terminal Q of the flip-flop FMFF shown in FIG. 15, and the collector thereof is connected with the base of the abovementioned transistor $Tr_7$. The emitter of this transistor $Tr_7$ is applied with a voltage Vcc, and the collector thereof is connected with the input terminal of the speed control circuit $SCIC_2$. This speed control circuit $SCIC_2$ also uses the IC No. TCA955 of Siemens A.G. as is the case with the abovementioned speed control circuit $SCIC_1$. The base of the transistor $Tr_8$ is connected with the output terminal of the speed control circuit $SCIC_2$ through a resistor, and the $r_7$ collector thereof is connected with the motor $M_F$. To this speed control circuit $SCIC_2$, there is connected the switch $SW_3$ which is controlled by the loop detection member 33. When the switch $SW_3$ is turned on, the speed control circuit $SCIC_2$ controls the motor $M_F$ to a rotational speed suitable for causing the intermittent film feeding mechanism including the abovementioned intermittent film forwarding pawl 25 to drive the film $F_2$ at a speed of approximately 20 frames/min. On the other hand, when the switch SW$_3$ is turned off, the speed control circuit SCIC$_2$ controls the motor M$_F$ to a rotational speed suitable for causing the intermittent film feeding mechanism to drive the film F$_2$ at a speed of approximately 16 frames/min.

FIG. 16C shows a circuit diagram of one embodiment of the sound recording circuit SCC.

FIG. 16D is a circuit diagram showing one embodiment of the drive circuit to drive the electromagnet device FMg shown in FIG. 3. In the drawing, a reference symbol Tr$_9$ designates a transistor, the base of which is connected with the output terminal Q of the flip-flop SMgFF shown in FIG. 15 through a resistor r$_8$, and the collector of which is connected with the exciting winding FCL of the abovementioned electromagnet device FMg.

In the following, the operations of the embodiments of the control circuits shown in FIGS. 15 and 16A to 16D will be explained along with the construction of the cine-camera according to the present invention shown in FIGS. 2a through 14.

First of all, explanations will be made as to normal cinematographic operations, in which both picture and sound are simultaneously recorded on the film F$_2$ using the film cassette C$_2$ shown in FIG. 1B.

When the film cassette C$_2$ is loaded in the film cassette loading chamber 1a in the state of the cover 17 being open, the detecting member 55 projecting within the chamber 1a displaces outwardly of the chamber 1a, whereby the switch SW$_{10}$ is closed to be turned on. At the same time, the film F$_2$ exposed to the exposure opening or window C$_2$a of the film cassette C$_2$ is disposed on the film gate plate 21a, whereby the detecting piece 22 displaces downwardly in FIG. 4 and the switch SW$_9$ is opened to be turned off. In this state, since the cover 17 is opened, the magnetic head 27 and the pad 26 as well as the capstan 28 and the pinch roller 32 are widely separated, so that the film F$_2$ exposed at the sound recording opening or window C$_2$b of the film cassette C$_2$ can be loaded very easily between the magnetic head 27 and the pad 26 as well as between the capstan 28 and the pinch roller 32.

Figure 17:
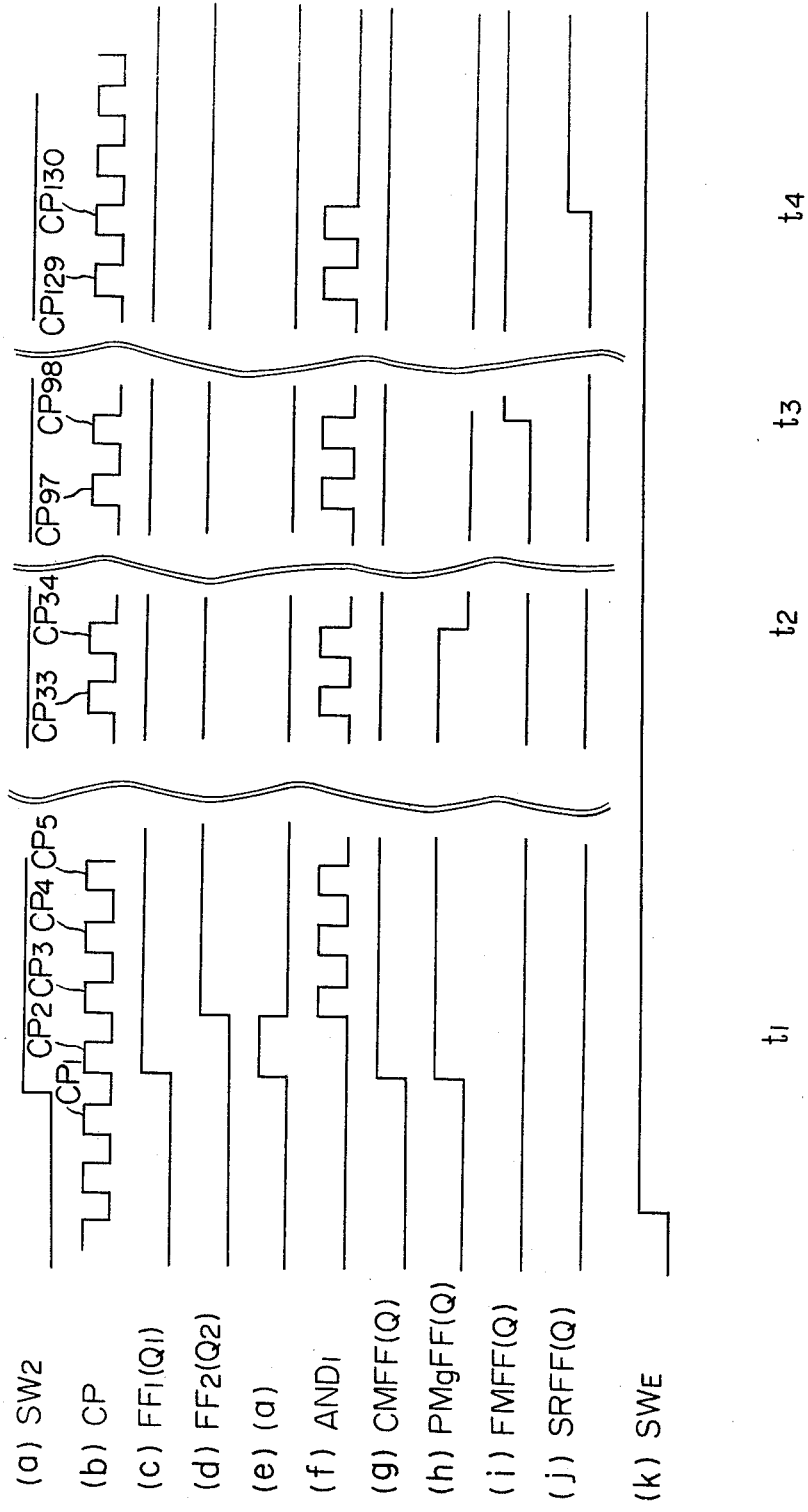
FIGS. 17(a) through 17(k) are explanatory diagrams for the start-sequence operations in the sequence control circuit shown in FIG. 15.

Thus, after the cassette C$_2$ is loaded at a predetermined position in the loading chamber 1$_a$, when the cover 17 is closed, the projection 39a of the abovementioned rotatory member 39, which projects from the abovementioned port 1c of the camera main body 1, is pushed by the projected part 17b of the cover 17, whereby the rotatory member 39 is rotated and the pinch roller 32 shifts from its rest position shown by dot-and-dash line to its preparatory position shown by solid line in FIG. 3, as already mentioned. After the sound-recording film cassette C$_2$ is loaded in the cassette loading chamber 1a and the cover 17 of the cassette loading chamber 1a is closed, when the main switch SW$_M$ is closed, a voltage Vcc is applied to one of the input terminals of each of the AND gates AND$_3$ to AND$_{10}$. At the same time, this voltage Vcc is further applied to a time constant circuit consisting of a capacitor C$_1$ and a resistor R$_1$, whereupon a high level signal is generated at the output terminal (b) of the time constant circuit for a time instant to be determined by a time constant of this constant circuit. This high level signal is applied to the reset input terminal R of the counter CC$_1$ through the OR gate OR$_1$, whereby the counter CC$_1$ is reset. Further, this high level signal from the output terminal (b) of the time constant circuit is transmitted to the reset input terminal R of each of the flip-flops CMFF, PMgFF, FMFF, SRFF and SMgFF through the OR gates OR$_3$ to OR$_7$, whereby these flip-flops are reset. In this state, when the trigger button 16 is depressed to displace the trigger member 56, the EE switch SW$_E$ is depressed by the staged section 56b$_1$ of the trigger member 56 at the first stroke of the trigger member 56 to be closed, whereby the automatic aperture control circuit EE of a known type consisting of light measuring circuit, etc. becomes operative, and the aperture is controlled on the basis of brightness of the object. Also, by the closure of the switch SW$_E$, the counter CT$_1$ is released from its set condition to count the clock pulse input introduced thereinto through the AND gate TDA$_1$. Owing to this, when the pulse CP is counted for 512 pulses after the closure of the switch SW$_E$, a high level signal is produced from the output terminal 512 of the counter CT$_1$ after lapse of 512 mm sec., and is transmitted to one of the input terminals of the AND gate AST$_1$. On account of this, when the abovementioned switch SW$_E$ becomes closed, and the trigger member 56 is depressed, the switch SW$_2$ is closed as shown in FIG. 8A at the second stroke of the trigger member 56, by the closure of which the high level signal that is the trigger signal is not output from the AND gate AST$_1$ unless 512 mm sec. lapses from closure of the switch SW$_E$, even when the high level signal is applied to the other input terminal of the AND gate AST$_1$. In other words, the cine camera according to the present invention is so constructed that no trigger signal may be transmitted to the input terminal D$_1$ of the D-type flip-flop FF$_1$ until the operating conditions of the aperture control circuit is brought to its stabilized condition after the switch SW$_E$ is turned on. Consequently, a high level signal as the trigger is produced as an output from the output terminal of the AND gate AST$_1$ after the aperture control circuit is brought to its stabilized operative condition. On account of this, the high level signal is applied to the input terminal D of the flip-flop FF$_1$, and the output terminal Q$_1$ of the flip-flop FF$_1$ produces the high level signal output as shown in FIG. 17(c) in synchronism with rising of the clock pulse CP$_2$ in FIG. 17(b). Since the high level signal from the output terminal Q$_1$ of the flip-flop FF$_1$ is applied to the clock input terminal C of each of the flip-flops CMFF and PMgFF, they are set to produce the high level signal output from their output terminals Q, and the signal is transmitted to one of the input terminals of each of the AND gates AND$_8$ and AND$_9$. At this time, the other input terminal of each of the AND gates AND$_8$ and AND$_9$ is applied with the high level signal as mentioned above, the outputs from the flip-flops CMFF and PMgFF are transmitted to the bases of the transistors Tr$_1$ and Tr$_4$ shown in FIG. 16A. On account of this, the transistors Tr$_1$ and Tr$_4$ are turned on, the speed control circuit SCIC$_1$ for the capstan motor is brought to a power supply condition, the transistor Tr$_3$ is controlled by the output from the speed control circuit SCIC$_1$, and the capstan drive motor Mc rotates. Simultaneously, the transistors Tr$_4$ and Tr$_5$ are turned on by the output from the flip-flop PMgFF, and the magnet coil PCL in the elctromagnet device PMg is brought to its excited state. When the magnet coil PCL is excited, the iron piece 51 of the electromagnet device PMg is attracted to the iron core 47, whereby the iron piece 51 and the rotatory member 49 rotate clockwise with the pin 48 as the pivot, and the displacement member 35 is displaced to the abovementioned operating position through the abovementioned displacement member 36. As a result, the capstan 28 and the pinch roller 32 are resiliently engaged each other with the film $F_2$ being held between them. When the capstan 28 rotationally driven by the motor Mc is brought to the elastic engagement with the pinch roller 32, constant and continuous feeding of the film $F_2$ commences. As stated above, after the motor Mc for driving the capstan and the electromagnet device PMg are controlled in synchronism with the clock pulse $CP_2$, when the clock pulse $CP_3$ is applied to the clock input terminal C of the flip-flop $FF_2$, the flip-flop is set in synchronism with rising of the clock pulse $CP_3$, and the output from the output terminal Q thereof produces a high level signal output as shown in FIG. 17(d). On account of this, the output terminals $Q_1$ and $Q_2$ of the flip-flops $FF_1$ and $FF_2$, and the exclusive OR gate $ex_1$ connected to the input terminals of the flip-flops produce a single pulse as shown in FIG. 17(e), whereby the single pulse is transmitted to the reset input terminal R of the counter $CC_1$ through the OR gate $OR_1$ to again reset the counter $CC_1$. Accordingly, the output of the terminal "128" of the counter $CC_1$ assumes the low level, and the high level signal is transmitted to the input terminal $A_3$ of the AND gate $AND_1$ through the inverter $IN_1$. Also, since the output $Q_1$ of the flip-flop $FF_1$ is applied to the input terminal $A_1$ of the AND gate $AND_1$, and the output at this time assumes the high level as shown in FIG. 17(c), the AND gate $AND_1$ is opened after lapse of a time $t_1$ as shown in FIG. 17(f), the pulse after the clock pulse $CP_3$ is transmitted to the clock input terminal C of the counter $CC_1$ through the AND gate $AND_1$ and OR gate $OR_2$, and the counter $CC_1$ thus commences the binary count operation. In this manner, when the counter $CC_1$ commences its counting operation and 32 pulses are counted by this counter $CC_1$, the output from the output terminal 32 of the counter $CC_1$ produces the high level signal output at the time instant $t_2$ when the clock pulse output $CP_{34}$ is produced, whereby the high level signal is transmitted to the input terminal $A_2$ of the AND gate $AND_4$. On the other hand, since the input terminal $A_1$ of the AND gate is connected with the output terminal $Q_1$ of the flip-flop $FF_1$, the high level signal is applied thereto, as a matter of course, and, at the time instant $t_2$, the high level signal is transmitted to the reset input terminal R of the flip-flop PMgFF through the OR gate $OR_4$, and the flip-flop is reset at the time instant $t_2$ as shown in FIG. 17(b). As the result, the transistors $Tr_4$ and $Tr_5$ in FIG. 16A are turned off, and the electric supply path which has so far been carrying out the electric supply to the magnet coil PCL through the transistor $Tr_5$ is interrupted, although small substaining current continues to flow through the magnet coil PCL, since the transistor $Tr_2$ maintains its "on" state. On account of this, the displacement member 35 can be continuously held at the operating position where the pinch roller 32 and the capstan 28 are elastically engaged. As stated above, since the cycle of the clock pulse is 1 mm sec., and the flip-flop PMgFF is continuously set during the counting of 32 clock pulses, a large current flows through the magnet coil PCL during a period of about 32 mm sec., and a small current flows thereafter. The reason for causing large electric current to flow through the magnet coil PCL at the initial stage of driving of the magnet coil PCL and small current to flow therethrough subsequently is that the magnet coil PCL requires, at the initial stage of its driving, a strong face of attraction, but does not require so strong a force of attraction thereafter. In so doing therefore, waste in the power consumption can be avoided. Thus, after the flip-flop PMgFF is reset by the clock pulse $CP_{34}$, the counting operations by the counter $CC_1$ further proceed, and, at the time instant when 96 clock pulses have been counted in the counter $CC_1$, i.e., at the time instant $t_3$ when the clock pulse output $CP_{98}$ is produced, the output terminals 32 and 64 of the counter $CC_1$ produce the high level signals, whereby these high level signals are transmitted to the input terminals $A_2$ and $A_3$ of the AND gate $AND_5$. Also the high level signal from the flip-flop $FF_1$ has been applied to the input terminal $A_1$ of the AND gate $AND_5$. As the result, the flip-flop FMFF is set at the time instant $t_3$, and the high level signal output is produced from the output terminal Q. Consequently, the transistors $Tr_6$ and $Tr_7$ in FIG. 16B are turned on, and electric supply to the speed control circuit $SCIC_2$ commences, whereupon the transistor $Tr_8$ is controlled by the speed control circuit $SCIC_2$ to be turned on, and the film driving motor $M_F$ starts its forward rotation to commence the film forwarding operation. In this manner, the film driving motor $M_F$ reaches its driving condition after the counter $CC_1$ has counted 96 clock pulses, i.e., after the capstan driving motor Mc starts its rotation. On account of this, even when the film $F_2$ in the film cassette $C_2$ loaded in the film cassette loading chamber 1a is in a slackened state for several frames at its loading, as the capstan driving motor Mc alone rotates during the period of approximately 96 mm sec., the constant film forwarding operation always commences from a state where this slackened condition has been removed, whereby the undesirable jamming phenomenon of the film, which is liable to occur when the film forwarding operation is done in the state of the film being slackened for several frames at the time of the cinematographic operation, can be avoided. Thus, after the film forwardly operation starts, when the counting operation by the counter $CC_1$ further proceeds and the counter has counted 128 clock pulses, a high level signal output is produced from the output terminal 128 of the counter $CC_1$ at the time instant $t_4$ when the clock pulse $CP_{130}$ is generated, and the high level signal is transmitted to the input terminal $A_2$ of the AND gate $AND_6$. In this case, as the high level signal from the flip-flop $FF_1$ is applied to the other input terminal $A_1$ of the AND gate $AND_6$, the flip-flop SRFF is set at the time instant $t_4$, a high level signal output is produced from the output terminal Q, and the abovementioned sound recording signal is generated. Since the output terminal Q of the flip-flop SRFF is connected to one of the input terminals of the AND gate $AND_{10}$, and the high level signal as mentioned above is applied to the other input terminal thereof, the sound recording signal is transmitted to the sound recording circuit in FIG. 16C through the AND gate $AND_{10}$, causes electric current to flow in the magnet head 27, and starts the sound recording operation. In this manner, by commencing the sound recording operation after counting of 128 pulses since the counting operations by the counter $CC_1$ starts, i.e., after 32 mm sec. since the film driving motor 102 starts its rotation, the voice can be recorded on a magnetic band coated on the film $F_2$ when the film forwarding operation has reached its stabilized condition after start of the film forwarding operation. Thus, as soon as the sound recording operation starts by the pulse $CP_{130}$, the high level signal from the output terminal 128 of the counter $CC_1$ is transmitted as the low level signal to the input terminal $A_3$ of the AND gate $AND_1$ through the inverter $IN_1$, whereby the counting operations by the counter $CC_1$ stops. As the result, the start-sequence operation at the start of the cinematographic operation terminates, and the simultaneous sound recording and cinematographic operations of the voice and picture are continued so long as the trigger button 16 is maintained under depression. In the course of the cinematographic operation being conducted by the abovementioned manner, if the photographer leaves his finger off the trigger button 16 to release depression of the trigger member 151a, the switch $SW_2$ is turned off as shown in FIG. 18(a), and the output of the AND gate $AST_1$ assumes a low level. On account of this, the low level signal is applied to the input terminal $D_1$ of the flip-flop $FF_1$, and a signal from the output terminal $Q_1$ of the flip-flop $FF_1$ also assumes the low level at the time instant $t_1$ as shown in FIG. 18(c) in synchronism with the pulse $CP_1'$ in FIG. 18(b), the low level signal is transmitted to the input terminal $D_1$ of the flip-flop $FF_2$, and the flip-flop $FF_2$ produces in synchronism with the pulse $CP_2$, the low level signal output from the output terminal $Q_2$ thereof at the time instant $t_2$ as shown in FIG. 18(d). Also, the low level output from the flip-flop $FF_1$ at the time instant $t_1$ results in application of a high level signal at the time instant $t_1$ through the inverter $IN_2$ to the input terminal D of the flip-flop $FF_3$. Owing to this, a rising pulse is transmitted to the clock terminal C of the flip-flop $FF_3$ when the switch $SW_1$, on-off control of which is done by rotation of the shutter, changes from "on" to "off" state. At this time instant $t_3$, the flip-flop $FF_3$ produces the high level signal output, i.e., the abovementioned stop-sequence control signal, from the output terminal Q thereof as shown in FIG. 18(h). This stop-sequence control signal is transmitted to the reset input terminal R of the flip-flops FMFF and SRFF through the OR gates $OR_5$ and $OR_6$, whereby the flip-flops are reset at the time instant $t_3$ as shown in FIGS. 18(j) and 18(k), the transistor $Tr_6$ in FIG. 16B is turned off at this time instant $t_3$ to stop electric supply to the speed control circuit $SCIC_2$, the transistor $Tr_8$ is turned off to shut the abovementioned electric supply path to stop the electric supply to the film forwarding motor $M_F$, and the film forwarding operation by the intermittent film feeding device including the motor $M_F$ is stopped. At the same time, by resetting of the flip-flop SRFF, the sound recording signal in the sound recording circuit SCC in FIG. 16C is extinguished, hence the sound recording operation at the time instant $t_3$ is terminated. Moreover, since the stop-sequence control signal is applied to the clock input terminal C of the flip-flop SMgFF, the flip-flop is set as shown in FIG. 18(l) at the time instant $t_3$, and the transistor $Tr_9$ in FIG. 16D is turned on, whereby the stopper magnet coil FCL of the electromagnet device FMg is excited. When this stopper magnet coil FCL is excited, the iron rod 92 is attracted and displaced in the direction closer to the gear 64. By this displacement of the iron rod 92, the stopper member 65 is slidingly displaced to the side of the prohibiting recess 64b of the gear 64 against force of the spring 95, whereby the stopper member 65 is engaged with the recess 64b to stop the gear 64 at a predetermined position. The reason for thus producing the stop-sequence control signal as the output when the switch $SW_1$ changes its state from "on" to "off" is because the switch $SW_1$ is so constructed that it may change from its "on" state to "off" state, when the shutter comprising three shutter blades 71, 72 and 73 shifts from a phase where the shutter opens the aperture 58a to another phase where the shutter closes the aperture. Thus, by exciting the magnet coil FCL in this state, the shutter can be stopped by the stopper member 65 at a position where the shutter has closed the aperture 58a. Further, the abovementioned stop-sequence control signal has been transmitted to the input terminal $A_2$ of the AND gate $AND_2$, the input terminal $A_1$ of the AND gate is connected with the output terminal 64 of the counter $CC_1$ through the inverter $IN_2$, and the counter is reset by the single pulse generated at the time instant $t_1$ as shown in FIG. 18(e). Therefore, from the output terminal 64 of the counter $CC_1$, the low level signal output is produced at the time instant $t_3$, a high level signal is applied to the input terminal $A_1$ of the AND gate $AND_2$ at the time instant $t_3$, and this AND gate is open as shown in FIG. 18(i) after the time instant $t_3$, whereby the counter $CC_1$ commences the counting operation from the time instant $t_3$. In this way, as soon as the electric supply to the film forwarding motor $M_F$ is stopped at the time instant $t_3$ and the stopper magnet coil FCL is excited, the binary counting operation is started by the counter $CC_1$. Thereafter, at the time instant $t_4$ when the 32 clock pulses have been counted, i.e., after lapse of 32 mm sec. from commencement of the counting operation, the output terminal 32 of the counter $CC_1$ produces a high level output signal, and this signal is transmitted to the input terminal $A_2$ of the AND gate $AND_7$. Also, at this time, since the stop-sequence control signal from the flip-flop $FF_3$ is applied to the other input terminal $A_1$ of the AND gate $AND_7$, the signal from the output terminal 32 of the counter $CC_1$ is transmitted to the reset input terminal R of the flip-flop SMgFF through the AND gate $AND_7$ and the OR gate $OR_7$, whereby the flip-flop SMgFF is reset at the time instant $t_4$. Accordingly, the transistor $Tr_9$ in FIG. 16D is turned off at the time instant $t_4$, and the stopper magnet coil FCL is brought to a non-excited state. When the stopper magnet coil FCL becomes non-excited, the attracting force of the stopper magnet coil FCL which has so far attracted the iron rod 92 to the side of the gear 64 diminishes, on account of which the stopper member 65 slips out of the engagement groove recess 64b of the gear 64 by the energized force of the spring 95. Thus, after the stopper member 65 slips out of the recess 64b of the gear 64, the counting operation by the counter $CC_1$ further proceeds, and, at the time instant $t_3$, when the clock pulse is counted for 32 pulses, the high level signal output is produced from the output terminal 64 of the counter 54, and the signal is transmitted to the input terminal $A_1$ of the AND gate $AND_3$. Since the other input terminal $A_2$ of the AND gate $AND_3$ is applied with the stop-sequence control signal from the abovementioned flip-flop $FF_3$, the high level signal from the output terminal 64 of the counter $CC_1$ is transmitted to the reset input terminal of the flip-flop CMFF through the AND gate $AND_3$ and the OR gate $OR_3$, whereby the flip-flop CMFF is reset at the time instant $t_5$ as shown in FIG. 18(m). In this consequence, the transistors $Tr_1$ and $Tr_2$ of FIG. 16A are turned off, electric supply to the speed control circuit $SCIC_1$ is stopped, the transistor $Tr_3$ is turned off, and the capstan driving motor Mc stops rotation. Turning-off of the transistor $Tr_2$ completely shuts the electric supply path to the pinch roller magnet coil PCL, hence the pinch roller magnet coil PCL is brought to a non-excited state, whereby the displacement member 35 returns to the abovementioned preparatory position, and the pinch roller 32 restores to its position shown by a solid line in FIG. 3. Further, since the high level signal from the output terminal 64 of the counter $CC_1$ is transmitted to the input terminal $A_1$ of the AND gate $AND_2$ as the low level signal through the inverter $IN_K$, the AND gate $AND_2$ becomes closed at the time instant t to inhibit the counting operation of the counter $CC_1$, and terminates the stop-sequence operations, whereby the cinematographic operation is ended. Incidentally, in the course of the above-described stop-sequence operation, if the film forwarding motor $M_F$ is stopped at the time instant $t_3$, after which the counter $CC_1$ counts 64 clock pulses, i.e., after lapse of 64 mm sec. since the film driving motor $M_F$ stops rotation, and then the capstan driving motor Mc is stopped, it becomes possible to feed the film slackened for several frames at the time of stoppage of the film driving motor $M_F$ by the rotation of the capstan driving motor Mc, and to restore the film in the film cassette to a normal state without causing slackening at the termination of the cinematographic operation. In the above-described manner, the sequence control to carry out the simultaneous sound recording and picture-taking operations by the use of the sound recording film cassette $C_2$ can be achieved. Thus, when the film $F_2$, on which the picture and voice have been recorded, is exhausted, and the cover 17 of the cassette loading chamber 1a is opened for taking out the recorded sound film cassette $C_2$ therefrom, the rotatory member 39 is shifted upward as shown in FIGS. 3 and 5 in association with opening of the cover 17, and, at the same time, the displacement member 35 shifts to its rest position, whereby the capstan 28 and the pinch roller 32 as well as the magnetic head 27 and the pad 26 are respectively separated widely to facilitate taking out of the film cassette $C_2$.

In the following, explanations will be given as to the sequence control for the silent cinematographic operations, in which the photo-taking operation is conducted by the use of the silent film cassette $C_1$ accommodating therein the silent film $F_1$ capable of recording picture image alone as shown in FIG. 1A. While this silent cinematography is also controlled in the same manner as the sequence control operations for the simultaneous sound recording and picture-taking, there is such a difference that, since the film cassette $C_1$ to be loaded in the chamber 1a is of the silent type, the film cassette $C_1$ loaded in the chamber 1a does not push the detection member 55, hence it remains to be projected in the chamber 1a by the spring force of the contact piece of the switch $SW_{10}$ with the result that the switch $SW_3$ is in the open condition. In more detail, since the switch $SW_3$ is constantly maintained in its open state, and the AND gates $AND_8$ to $AND_{10}$ do not transmit the outputs from the flip-flops CMFF, SRFF, and PMgFF to the drive circuit for the capstan driving motor, the drive circuit for the pinch roller magnet, and the sound recording circuit, even when the main switch $SW_M$ is closed to set these flip-flops, these circuits are maintained in their non-operative state, while the film forwarding motor $M_F$ and the stopper magnet coil FCL alone are sequence-controlled by the afore-mentioned timings. That is, is this case, even if the trigger button 16 is depressed and the switch $SW_2$ is closed by the trigger member 56, as no electric conduction is effected to the pinch roller magnet driving circuit and the sound recording circuit, the displacement member 35 remains to be disposed at the abovementioned preparatory position, and the magnetic head 27 and the capstan driving motor Mc are always rendered non-conductive. For the other parts, the abovementioned sequence control is applied to attain the silent cinematography.

As stated in the foregoing, since the simultaneous recording motion picture camera according to the present invention which is realized by the embodiments shown in FIGS. 2A to 18, inclusive of the film feeding control device, the exposure control device to control the aperture, and the sound recording device to record voice on the film, is further provided with the centralized electronic control device to accurately and sequentially execute a series of cinematographic operations such that the abovementioned exposure control device is first actuated by commencement of the trigger actuation, the film feeding control device is then actuated after the operation of the exposure control device has become stabilized, and the sound recording device commences voice recording on the film after the film feeding control device has become stabilized. On account of such unique construction, various undesirable troubles to occur in exposure, film feeding, and sound recording at the start of the cinematographic operations can be perfectly and effectively prevented.

Figure 19A:
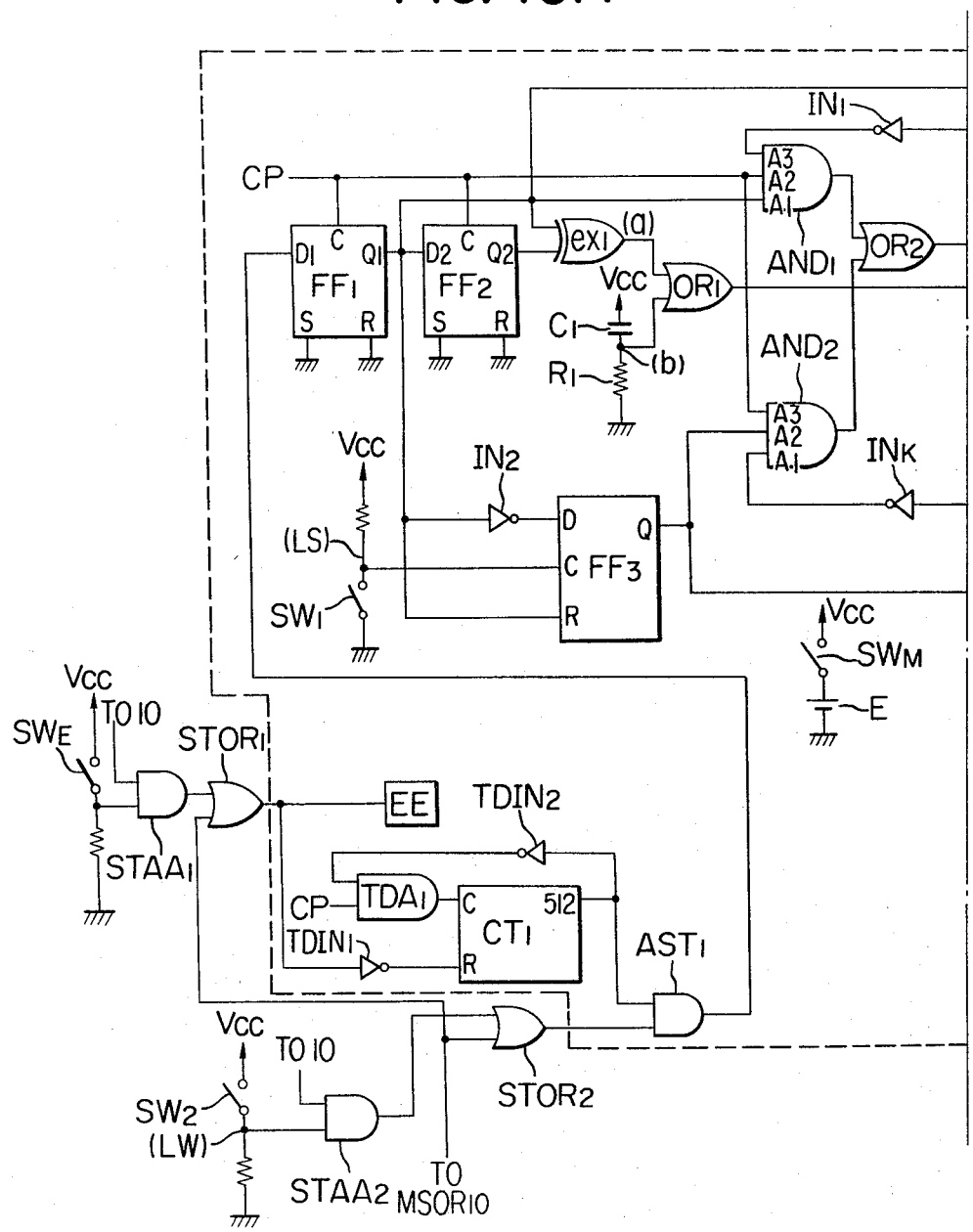
FIG. 19, composed of FIGS. 19A and 19B in combination is a circuit diagram showing another embodiment of the sequence control circuit for the cine camera according to the present invention as illustrated in FIGS. 2A to 14.
Figure 19B:
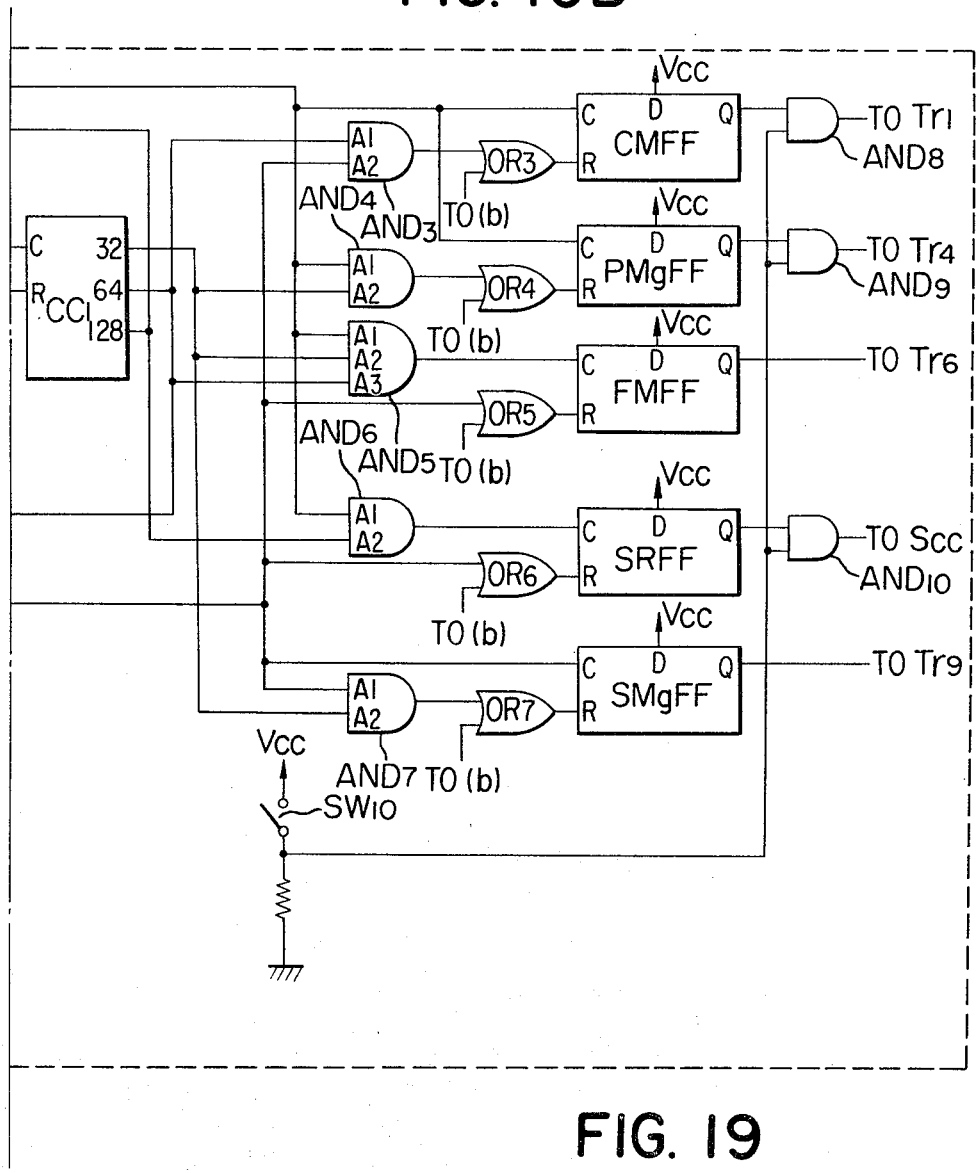
Figure 19:
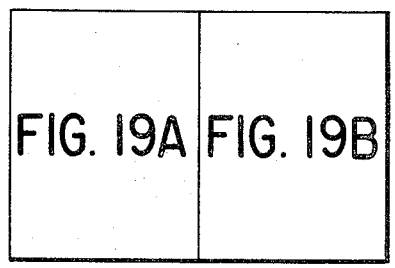
Figure 20A:
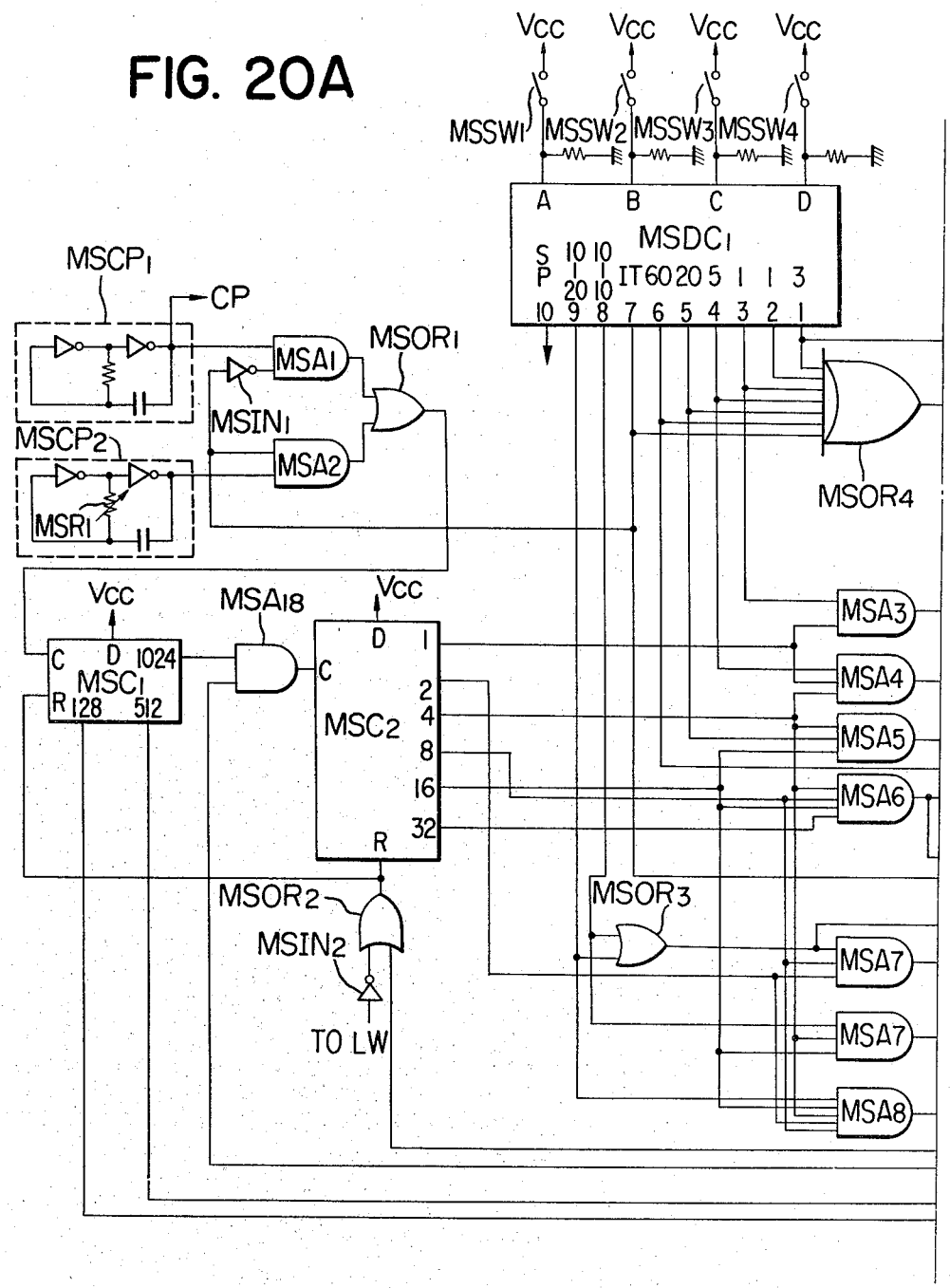
FIG. 20, composed of FIGS. 20A and 20B in combination, shows a photographic mode control circuit to be used with the sequence control circuit shown in FIG. 19.
Figure 21:
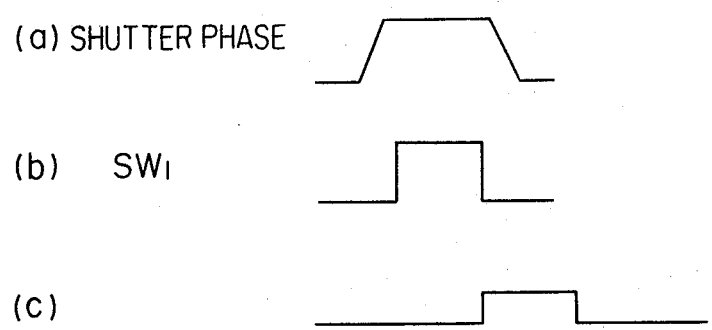
FIGS. 21(a), 21(b) and 21(c) are explanatory diagrams showing a relationship among the shutter opening angle, the condition of the switch to detect the shutter phase, and the excited condition of the excitation coil FCL in the electromagnetic device FMg, when the camera shown in FIGS. 2A to 14 is controlled by the control circuits shown in FIGS. 19 and 20.

FIGS. 19 to 22 illustrate the second embodiment of the cine camera control device, according to the present invention as shown in FIGS. 2A through 14. FIG. 19 indicates a sequence control circuit constituting the second embodiment of the present invention, in which the circuit construction enclosed by a dot line is the same as that shown in FIG. 15, the detailed explanations for which have been made for the first embodiment, hence detailed description of this circuit construction will be dispensed with. The differences of this second embodiment from that shown in FIG. 15 are that AND gate $STAA_1$ and OR gate $STOR_1$ are provided between the EE switch $SW_E$ and the automatic aperture control circuit EE, and that AND gate $STAA_2$ and OR gate $STOR_2$ are provided between the switch $SW_2$ to be controlled by displacement of the trigger plate 56 by depression of the trigger button 16 and the AND gate $AST_1$. FIG. 20 illustrates a photographic mode control circuit constituting the control circuit for the cine camera according to the present invention along with the sequence control circuit shown in FIG. 17, wherein reference symbols $MSSW_1$ to $MSSW_4$ designate mode setting switches, the on-off state of which is determined by the photographic mode change-over dial 8 shown in FIG. 2A. The relationship between the photographic mode change-over dial 8 and the mode setting switches $MSSW_1$ to $MSSW_4$ is such that, by causing an indicator needle 8a provided on the photographic mode change-over dial 8 to point to various symbols "10$\boxed{20}$", "$\boxed{1}$", "$\boxed{3}$", "1", "10$\boxed{10}$", "PS", "5", "20", "60", "IT" on the camera main body 1 and around the dial 8, the mode changeover switches $MSSW_1$ to $MSSW_4$ may be controlled as shown in the following Table of Codes.

| POSITION OF INDICATOR NEEDLE 147A | Table of Codes STATES OF MODE SETTING SWITCHES | | | |
|---|---|---|---|---|
| | $MSSW_1$ | $MSSW_2$ | $MSSW_3$ | $MSSW_4$ |
| 10 $\boxed{20}$ | 1 | 0 | 0 | 1 |
| 10 $\boxed{10}$ | 0 | 0 | 0 | 1 |
| PS | 0 | 1 | 0 | 1 |
| $\boxed{1}$ | 0 | 1 | 0 | 0 |

Table of Codes

| POSITION OF INDICATOR NEEDLE 147A | STATES OF MODE SETTING SWITCHES | | | |
|---|---|---|---|---|
| | MSSW$_1$ | MSSW$_2$ | MSSW$_3$ | MSSW$_4$ |
| | 1 | 0 | 0 | 0 |
| ③ | | | | |
| 1 | 1 | 1 | 0 | 0 |
| 5 | 0 | 0 | 1 | 0 |
| 20 | 1 | 0 | 1 | 0 |
| 60 | 0 | 1 | 1 | 0 |
| IT | 1 | 1 | 1 | 0 |

In the above Table of Codes, the condition 1 of the mode setting switch denotes "on", and the condition 0 denotes "off". As will be seen from the above Table, the photographic mode control circuit is so constructed that (1) when the indicator needle 8a of the photographic mode change-over dial 8 is pointed to the symbol "10 20" on the main body 1 of the camera, the switches MSSW$_1$ and MSSW$_4$ are turned on, in which condition the photographic mode control circuit to be described later starts to work, and 10 seconds of waiting time is provided between depression of the trigger button 16 and the commencement of the cinematographic operation, and, after lapse of this 10-second waiting time, a self-timer photographic mode can be automatically performed for 20 seconds; (2) when the indicator needle 8a is pointed to the symbol "10 10", the switch MSSW$_4$ alone is turned on, and, after lapse of 10-second waiting time, the self-timer photographic mode can be automatically done for 10 seconds; (3) when the indicator needle 8a is pointed to the symbol "PS", the switches MSSW$_2$ and MSSW$_4$ are turned on, and the normal photographic mode to be directly controlled during depression of the trigger button 16, and an overlapping photographic mode, if the overlapping photographic mode operating button 5 is depressed during this normal photographic mode, are automatically performed; (4) when the indicator needle 8a is pointed to the symbol "①", the switch MSSW$_2$ is turned on, and, when the indicator needle is coincided with the symbol "③", the switch MSSW$_1$ is turned on, in which case, when the indicator needle 8a of the mode change-over dial 8 is pointed to the symbol "①", a single frame photographing is automatically performed, and, when the indicator needle 8a is pointed to the symbol "③", three-frame photographing can be done automatically; subsequently, (5) when the indicator needle 8a is pointed to the symbol "1", the switches MSSW$_1$ and MSSW$_2$ are turned on, when the indicator needle is pointed to the symbol "5", the switch MSSW$_3$ is turned on, when the indicator needle is pointed to the symbol "20", the switches MSSW$_1$ and MSSW$_3$ are turned on, and, when the indicator needle is pointed to the symbol "60", the switches MSSW$_2$ and MSSW$_3$ are turned on, as the result of which there is performed an interval photographing such that a single frame photographing is carried out for every one second at the symbol "1", a single frame photographing is carried out for every five seconds at the symbol "5", a single frame photographing is carried out for every 20 seconds, and a single frame photographing is carried out at every 60 seconds; (6) when the indicator needle 8a is pointed to the symbol "IT", the switches MSSW$_1$, MSSW$_2$, and MSSW$_3$ are turned on, in which condition, when the dial (not shown) with the indicator needle 8a thereof pointing to the symbol "IT" is operated to vary a resistance value of the variable resistor MSR$_1$, a desired interval photographing in an arbitrary cycle within a range of from 1 second to 60 seconds can be carried out.

Reference symbol MSDC$_1$ designates a decode which detects the states of the abovementioned switches MSSW$_1$ to MSSW$_4$, and produces a high level signal output from a predetermined output terminal. MSOR$_4$ refers to an OR gate, the input terminal of which is connected with the output terminals 1 to 7 of the decoder MSDC$_1$. MSA$_{13}$ designates an AND gate, one of the input terminals of which is connected with the switch SW$_2$ shown in FIGS. 3 and 19, and the other input terminal of which is connected with the output terminal of the OR gate MSOR$_4$. The output terminal of this AND gate MSA$_{13}$ is connected with the clock input terminal C of the D-type flip-flop MSFF$_4$. The OR gate MSOR$_4$ and the AND gate MSA$_{13}$ constitute a signal forming circuit to set the flip-flop MSFF$_4$ and to commence the start sequence operation upon the trigger operation, in case the single frame, three-frame, and interval timer photographic modes are selected. MSIN$_3$ refers to an inverter, and MSA$_{11}$ designates an AND gate, one of the input terminals of which is connected with the inverter MSIN$_3$, and the other input terminal of which is connected with the output terminal Q of the flip-flop FMFF. The output terminal of the AND gate MSA$_{11}$ is connected with the reset input terminal R of the flip-flop MSFF$_4$ through the OR gate MSOR$_5$. Both inverter MSIN$_3$ and AND gate MSA$_{11}$ constitute a signal forming circuit to promptly execute the stop sequence after commencement of photographing. MSNAND$_1$ designates a NAND gate, one of the input terminals of which is connected with the switch SW$_2$, and the other input terminal of which is connected with the output terminal "1" of the decoder MSDC$_1$. The output terminal of the NAND gate MSNAND$_1$ is connected with the reset input terminal R of the binary counter MSC$_3$. The clock input terminal C of the counter MSC$_3$ is connected with the switch SW$_1$ to count the frame number of the film. MSA$_{12}$ refers to an AND gate, the input terminal of which is connected with the output terminals "1" and "2" of the counter MSC$_3$. This AND gate MSA$_{12}$ is so constructed that it may produce a high level signal output to reset the flip-flop MSFF$_4$ through the OR gate MSOR$_5$ when the counted value of the counter MSC$_3$ becomes 3. These NAND gate MSNAND$_1$, the counter MSC$_3$ and the AND gate MSA$_{12}$ constitute a control circuit to reset the flip-flop MSFF$_4$ in the course of the three-frame photographing so as to execute the stop sequence. MSCP$_1$ refers to a clock pulse oscillator to form a clock pulse CP having a frequency of 1 mm sec. as mentioned in the foregoing, the output terminal of which is connected with one of the input terminals of the AND gate MSA$_1$. The other input terminal of this AND gate MSA$_1$ is connected with the output terminal 7 of the decoder MSDC$_1$ through the inverter MSIN$_1$. This AND gate MSA$_1$ functions to transmit the clock pulse CP to the clock input terminal of the binary counter MSC$_1$ through the OR gate MSOR$_1$, in the case of a photographic mode other than the time-variable interval photographic mode. The counter MSC$_1$ functions as a dividing counter, the output terminal "1024" of which is connected with one of the input terminals of the AND gate MSA$_{18}$. This counter MSC$_1$ forms a pulse at every time the clock pulse CP is pulse-counted at the output terminal 1024, i.e., with one-second cycle. MSC$_2$ refers to a binary counter, the clock input terminal C of which is connected with the output terminal of the AND gate MSA$_{18}$. The output terminals "1", "4", "8", "16", and "32" of this counter are connected with predetermined input terminals of the AND gates MSA$_3$ to MSA$_6$, respectively. This counter MSC$_2$ is so constructed that it may produce a high level output signal from the gate MSA$_3$ when the counted value of the counter MSC$_2$ becomes 1 at the one-second cycle interval photographic mode; from the gate MSA$_4$ when the counted value thereof becomes 5 at the five-second cycle interval timer photographic mode; from the gate MSA$_5$ when the counted value thereof becomes 20 at the 20-second cycle interval timer photographic mode; and from the gate MSA$_6$ when the counted value thereof becomes 60 at the 60-second cycle interval time photographic mode, respectively. MSA$_9$ refers to an AND gate, one of the input terminals of which is connected with the output terminal 6 of the decoder MSDC$_1$, and the other input terminal of which is connected with the output terminal of the AND gate MSA$_6$. MSA$_{10}$ designates an AND gate, one of the input terminals of which is connected with the output terminal 7 of the decoder MSDC$_1$, and the other input terminal of which is connected with the output terminal of the AND gate MSA$_6$. This AND gate MSA$_{10}$ is so constructed that it may produce a high level output signal from the output terminal thereof when the counter MSC$_2$ has counted 60 pulses at the time-variable interval timer photographic mode. MSOR$_6$ refers to an OR gate, the input terminal of which is connected with the output terminals of the AND gates MSA$_3$, MSA$_4$, MSA$_5$, MSA$_9$ and MSA$_{10}$. The output terminal of this OR gate MSOR$_6$ is connected with one of the input terminals of an AND gate MSA$_{14}$ having two input terminals. The other input terminal of this AND gate MSA$_{14}$ is applied with the abovementioned clock pulse CP. This OR gate MSOR$_6$ is so constructed that it may produce a high level output signal after a pausing time in the interval timer photographic mode, and transmits this high level signal to the clock input terminal C of the flip-flop MSFF$_3$. The reset input terminal R of the flip-flop MSFF$_3$ is connected with the output terminal of the OR gate MSOR$_5$, and is so constructed that it may be promptly reset after commencement of the photographing. The flip-flop MSFF$_3$, AND gates MSA$_3$ to MSA$_6$, MSA$_9$, MSA$_{10}$ and MSA$_{14}$, and OR gate MSOR$_6$ constitute the gate circuit to set the flip-flop MSFF after termination of the pausing time in the interval timer photographic mode, and to execute the start sequence. MSA$_{15}$ designates an AND gate, one of the input terminals of which is connected with the output terminal of the abovementioned OR gate MSOR$_6$, and the other input terminal of which is connected with the output terminal of the abovementioned clock pulse oscillator MSCP$_1$ through the inverter MSIN$_6$. The AND gate MSA$_{15}$ produces high level signal output at every interval time, transmits this high level signal to the reset input terminals R of the counter MSC$_2$ and MSC$_1$ through the OR gate MSOR$_2$ to thereby reset the counter MSC$_2$. MSOR$_3$ refers to an OR gate, the input terminal of which is connected with the output terminals 8 and 9 of the abovementioned decoder MSDC$_1$, and the output terminal of which is connected with the input terminal D of the flip-flop MSFF$_1$. This OR gate MSOR$_3$ has a function to set the flip-flop MSFF$_1$ at the time of the self-timer photographic mode. MSA$_7$ designates an AND gate, the input terminal of which is connected with the output terminals 2 and 8 of the counter MSC$_2$ and the output terminal of the OR gate MSOR$_3$. This AND gate MSA$_7$ is so constructed that it may produce a high level signal after a photographic waiting time until commencement of the self-timer photographic mode. The output terminal of the AND gate MSA$_7$ is connected with the reset terminal R of the flip-flop MSFF$_1$ through the OR gate MSOR$_8$. As stated above, since the flip-flop MSFF$_1$ is so constructed that it may be set during the photographic waiting time up to commencement of the photographic operation at the time of the self-timer photographic mode, the high level signal is also applied to one of the input terminals of the AND gate MSA$_{16}$ during this waiting time. The other input terminal of this AND gate MSA$_{16}$ is connected with the output terminal 512 of the counter MSC$_1$ so as to transmit a single pulse to a light emitting diode MSLED$_1$ as an action light through the OR gate MSOR$_{11}$ at every 0.5 second, or, 512 mm sec. MSA$'_7$ refers to an AND gate, the input terminal of which is connected with the output terminal 8 of the decoder MSDC$_1$ and the output terminals 16 and 4 of the counter MSC2. The output terminal of this AND gate is connected with the reset input terminal R of the flip-flop MSFF$_2$ through the OR gate MSOR$_7$. The clock input terminal C of the flip-flop MSFF$_2$ is connected with output terminal of the abovementioned AND gate MSA$_7$, and the output terminal Q thereof is connected with the OR gate MSOR$_{10}$ to execute the start and stop sequences at the time of the self-timer photographic mode by the output therefrom. The flip-flop MSFF$_2$ is so constructed that it may be set at the commencement of the self-timer photographic mode, and reset at the termination thereof. MSA$_8$ is an AND gate, the input terminal of which is connected with the output terminal 9 of the decoder MSD$_1$ and the output terminals 2, 4, 8, and 16 of the counter MSC$_2$. The output terminal of the AND gate MSA$_8$ is connected with the reset input terminal R of the flip-flop MSFF$_2$ so as to produce an output signal for the termination of the photographic operation at the time of the self-timer photographic mode of 10-second-waiting-20-second-photographing. MSIN$_5$ is an inverter, the input terminal of which is connected with the output terminal of the OR gate MSOR$_7$, and the output terminal of which is connected with the input terminal of the AND gate MSA$_{18}$. This inverter MSIN$_5$ is for stopping the counting operation by the counter MSC$_2$ with the AND gate MSA$_{18}$ being turned off at the termination of the self-timer photography. MSA$_{17}$ refers to an AND gate, one of the input terminals of which is connected with the output terminal 128 of the counter MSC$_1$, and the other input terminal of which is connected with the output terminal Q of the flip-flop FMFF shown in FIG. 19. The output terminal of the AND gate MSA$_{17}$ is connected with the abovementioned light emitting diode MSLED$_1$ through the OR gate MSOR$_{11}$. The AND gate MSA$_{17}$ is for producing an output pulse to flash the light emitting diode MSLED$_1$ at a cycle of 128 mm sec. during the photographic operation. MSCP$_2$ designates a clock pulse oscillator, the oscillating frequency of which is determined by the variable resistor MSR$_1$ which is so constructed that its resistance value may vary in a range of from 1 KHz to 60 KHz in association with an adjustment dial (not shown) provided at the outer part of the camera. MSA$_2$ designates an AND gate, one of the input terminals of which is connected with the output terminal 7 of the abovementioned decoder MSDC$_1$, and the other input terminal of which is connected with the output terminal of the pulse oscillator MSCP$_2$. This AND gate MSA$_2$ has a function of transmitting the pulse from the pulse oscillator MSCP$_2$ to the counter MSC$_1$ through the OR gate MSOR$_1$ at the time of the time-variable interval timer photographic mode. MSOR$_{10}$ refers to an OR gate, the input terminal of which is connected with the output terminals of the flip-flops MSFF$_2$, MSFF$_3$ and MSFF$_4$, and the output terminal of which is connected with the input terminals of the OR gate STOR$_1$ and STOR$_2$ in FIG. 19. This OR gate is for transmitting the start and stop signals to the sequence control circuit of FIG. 19 at the time of the special photographic mode. In FIG. 20, each of the flip-flops is set in synchronism with the rising of the clock pulse, and each of the counters is to count the trailing of the clock pulse.

The capstan motor driving circuit, the pinch roller magnet driving circuit, the film motor driving circuit, the sound recording circuit, and the stop magnet driving circuit to be used for the second embodiment are the same as the circuits shown in FIGS. 16A, 16B, 16C, and 16D, hence detailed explanations thereof will be dispensed with.

In the following, operations of the control circuits shown in FIGS. 19 and 20, when they are adapted in the cine camera as shown in FIGS. 2A through 14 which is capable of performing the simultaneous sound-recording and picture-taking operations will be explained. At first, the normal photographic mode, in which voice and picture are simultaneously recorded by using the sound recording film cassette C$_2$ accommodating therein the sound film capable of recording both picture and voice will be described. In the case of the normal photographic mode, the indicator needle 8a of the photographic mode change-over dial 8 is pointed to the symbol "PS" indicated on the main body of the camera 1, whereby the switches MSSW$_2$ and MSSW$_4$ are brought to their "on" state. Further, in a state of the cover 17 of the film cassette loading chamber 1a being opened, and no sound recording film cassette C$_2$ being loaded in the chamber 1a, the detecting member 55 projects into the film cassette loading chamber 1a by the spring force of the contact piece of the switch SW$_{10}$, and the switch is in the closed state. Moreover, the rotatory member 39 is shifted in the counter-clockwise direction in FIG. 5, whereby the displacement members 35 and 38 are at the respective rest positions. In this state, the capstan 28 and the pinch roller 32 as well as the magnetic head 27 and the pad 26 are widely separated to facilitate loading of the sound recording film cassette C$_2$ in the cassette loading chamber 1a. Subsequently, when the cover 17 of the cassette loading chamber 1a is closed after the sound recording film cassette C$_2$ has been loaded in the chamber 1a, the detecting member 55 is depressed by the film cassette C$_2$ to close the switch SW$_{10}$, and, at the same time, the rotatory member 39 is rotated in the clockwise direction, whereby the displacement members 35 and 38 also move to the abovementioned preparatory position shown by the dot-and-dash line in FIG. 3. In this state, the magnetic head 27 and the pad 26 are mutually resiliently engaged, while the capstan 28 and the pinch roller 32 are in a slightly separated state.

When the sound recording film cassette C$_2$ is loaded in the film cassette loading chamber 1a, the cover 17 for the cassette loading chamber 1a is closed, and further the main switch SW$_M$ is closed, a voltage Vcc is applied to one of the input terminals of each of the AND gates AND$_6$ to AND$_{10}$. At the same time, the voltage Vcc is applied to the time constant circuit consisting of the capacitor C$_1$ and the resistor R$_1$, whereupon a high level output signal is generated at the output terminal (b) of the time constant circuit during a time period to be determined by the time constant of the time constant circuit, whereby the high level signal is applied to the reset input terminal R of the counter CC$_1$ through the OR gate OR$_1$, and the counter CC$_1$ is reset. The high level signal from the output terminal (b) of the time constant circuit is transmitted to the reset input terminal R of each of the flip-flops CMFF, PMgFF, FMFF, SRFF and SMgFF through each of the OR gates OR$_3$ to OR$_7$, whereby the flip-flops are reset. In this state, when the trigger button 16 is depressed, the EE switch SW$_E$ is turned on at the first stroke of the trigger plate 56 which is displaced in response to the trigger button 16, and the high level signal is transmitted to one of the input terminals of the AND gate STAA$_1$. On the other hand, since the other input terminal of the AND gate STAA$_1$ is connected with the output terminal 10 of the decoder MSDC$_1$ shown in FIG. 20, and the switches MSSW$_2$ and MSSW$_4$ are turned on, as already mentioned in the foregoing, the output terminal 10 of the decoder MSDC$_1$ produces the high level output signal, hence the AND gate STAA$_1$ produces the high level output signal. In this consequence, the high level signal is applied to the aperture control circuit EE through the OR gate STOR$_1$ to bring this aperture control circuit EE to its operative state, and the aperture is adjusted in accordance with brightness of an object. Further, a low level signal is applied to the reset input terminal R of the counter CT$_1$ through the inverter TDIN$_1$ by turning-on of the switch SW$_E$, whereby the reset condition of the counter CT$_1$ is released, and the counter CT$_1$ is released, and the counter CT$_1$ commences counting of input clock pulses through the AND gate TDA$_1$. On account of this, when the counter counts the clock pulse CP for 152 pulses after the switch SW$_E$ is turned on, same as in the aforedescribed first embodiment, i.e., after 152 mm sec., the high level signal output is produced from the output terminal 512 of the counter CT$_1$, and then transmitted to one of the input terminals of the AND gate AST$_1$. When the trigger plate 56 is further depressed by the trigger button 16, the switch SW$_2$ is turned on, a high level output signal is produced from the AND gate STAA$_2$, and is transmitted to the other input terminal of the AND gate AST$_1$ through the OR gate STOR$_2$. On account of this, the high level signal output is produced from the AND gate AST$_1$ after the aperture control circuit EE is stabilized upon termination of the release operation, and the high level signal is applied to the input terminal D$_1$ of the flip-flop FF$_1$, as is the case with the first embodiment. Thus, when the high level signal is applied to the input terminal D$_1$ of the flip-flop FF$_1$, the same start sequence operation same as that in the first embodiment is executed to commence the cinematographic operation, and the sound recording is also done simultaneously. For terminating the photographic operation, the trigger button 16 is released from its depressed state, whereby the switch SW$_2$ is turned off, and the output from the AND gate STAA$_2$ assumes the low level. As a result, the high level signal output from the AND gate AST$_1$ is also changed to the low level signal which is applied to the input terminal D$_1$ of the flip-flop FF$_1$, whereby the stop sequence operation as detailed in the abovementioned first embodiment is executed, and the photographic operation terminates.

In the above-described normal photographic process, the output terminals 1 to 9 of the decoder $MSDC_1$ in FIG. 20 produce the low level signal outputs, hence the AND gates $MSA_3$ to $MSA_{10}$ are turned off. On account of this the AND gate $MSA_{15}$ is also turned off, and the AND gates $MSA_3$ to $MSA_{10}$ produce the low level signal outputs in this state, so that the low level signal is continuously applied to one of the input terminals of the OR gate $MSOR_2$. Further, since the other input terminal of the OR gate $MSOR_2$ is connected with the switch $SW_2$ of FIG. 19 through the inverter $MSIN_2$, the low level signal continues to be applied to this input so far as the switch $SW_2$ is in "on" state with the consequence that this low level signal also continues to be produced as an output from the output terminal of the OR gate $MSOR_2$ so far as the switch $SW_2$ is in "on" state. Accordingly, the counter $MSC_1$ is released of its reset state from the time when the switch $SW_2$ is turned on until it becomes turned off, and the counter $MSC_1$ performs the counting operation during this period. Moreover, as the photographic mode in this case is the normal photographic mode, the output terminal 7 of the decoder $MSDC_1$ produces a low level signal output, whereby the AND gate $MSA_2$ is turned on, while the AND gate $MSA_1$ is turned on. Furthermore, since the clock pulse CP of 1 mm sec. is applied as an input to the counter $MSC_1$ from the pulse oscillator $MSCP_1$, an output pulse is produced from the output terminal 128 of the counter at every 128 mm sec. during a period of from turning-on of the switch $SW_2$ to its turning-off, and this pulse is transmitted to one of the input terminals of the AND gate $MSA_{17}$. Also, since the other input terminal of the AND gate $MSA_{17}$ is connected with the output terminal Q of the flip-flop FMFF in FIG. 19, the pulse of the 128 mm sec. cycle is transmitted to the action light $MSLED_1$ through the OR gate $MSOR_{11}$ during the period of the flip-flop FMFF being set, thereby lighting on and off the light emitting diode $MSLED_1$ with the 128 mm sec. cycle. On the other hand, since the film motor Mf is being driven during a period of the flip-flop FMFF being in a set condition, the action light $MSLED_1$ lights on and off during the execution of the photographic operation with the 128 mm sec. cycle to indicate "in operation."

In the following, explanations will be made as to the silent cinematographic operations, in which a silent film cassette $C_1$ accommodating therein a silent film $F_1$ capable of recording only picture image, but not capable of recording voice.

This silent cinematographic operation is also controlled in the same manner as the sequence control operations for the simultaneous sound recording and picture taking mode as already described in the foregoing. In the case of this silent cinematographic operation, as the film cassette to be loaded in the film loading chamber 1a of the camera main body 1 is the silent film cassette $C_1$, the film cassette loaded in the chamber 1a does not depress the detecting member 67, but it remains projected within the cassette loading chamber 1a by the spring force of the contact piece of the switch $SW_{10}$, hence the switch is in its open state. In other words, the switch $SW_{10}$ is constantly maintained in its open state, and the AND gates $AND_6$ to $AND_{10}$ do not transmit the outputs from the flip-flops CMFF, PMgFF and SRFF to the capstan driving motor drive circuit, the pinch roller magnet drive circuit and the sound recording circuit shown in FIGS. 16A and 16C, even when the main switch $SW_M$ is closed to set these flip-flops, so that each of these circuits is maintained in its non-operative state, and the film forwarding motor $M_F$ and the stopper magnet coil FCL alone are sequence-controlled with the timings as already explained with respect to the first embodiment. In more detail, since, in this case, no electric conduction is effected to the pinch roller magnet driving circuit and the sound recording circuit, even when the switch $SW_2$ is closed by the trigger member 56 responding to the trigger button 16, when it is depressed, the displacement members 35 and 38 remain at the preparatory positions, and the magnetic head 27 and the capstan driving motor Mc are constantly rendered non-conductive. The other points are exactly the same as the abovementioned sequence control operations, and the silence photographic operation is attained.

In the following, the single-frame photographic mode will be explained. In performing the single-frame photographing, the indicator needle 8a of the photographic mode change-over dial 8 is pointed to the symbol "$\boxed{1}$" on the camera main body 1, whereby the mode setting switch $MSSW_2$ is turned on. In this state, when the main switch $SW_M$ shown in FIG. 19 is turned on, a high level signal output is produced from the output terminal 2 of the decoder $MSDC_1$, and is applied to one of the input terminals of the AND gate $MSA_{13}$ through the OR gate $MSOR_4$. Thereafter, the trigger button 16 is depressed to turn on the switch $SW_E$ in FIG. 19 at the first stroke of the trigger plate 56 which displaces in response to this trigger button 16, and to turn on the switch $SW_2$ at the second stroke thereof. As a result, while the high level signal is applied to one of the input terminals of the AND gates $STAA_1$ and $STAA_2$, a low level signal output is produced from the output terminal 10 of the decoder $MSDC_1$ in FIG. 20 in view of the single frame photographic mode, hence these AND gates do not produce the high level signal output. Accordingly, the abovementioned start sequence operation is not executed depending on the output from the AND gates as is the case with the normal photographic mode. However, since one of the input terminals of the abovementioned AND gate $MSA_{13}$ in FIG. 20 is connected with the switch $SW_2$, the high level signal output is produced at the time instant when the switch $SW_2$ is turned on, and the rising pulse is transmitted to the clock input terminal of the flip-flop MSFF. On account of this, the high level signal output is produced from the output terminal Q of the flip-flop $MSFF_4$, and is transmitted to the OR gates $STOR_1$ and $STOR_2$ in FIG. 19 through the OR gate $MSDR_{10}$. In this consequence, as already explained in the normal photographic mode of the first embodiment, the high level signal is transmitted to the input terminal $D_1$ of the flip-flop $FF_1$ after 512 mm sec., since the aperture control circuit EE has been put into operation to execute the start sequence, and the flip-flop FMFF is set by the start sequence operation to drive the film driving motor $M_F$, thereby starting the shutter rotation. Further, since the output terminal Q of the flip-flop FMFF is connected with one of the input terminal of the AND gate $MSA_{11}$ in FIG. 20, and one of the input terminal of the AND gate $MSA_{11}$ is connected with the output terminal 1 of the decoder $MSDC_1$ through the inverter $MSIN_3$, this AND gate produces the high level signal output when the flip-flop FMFF is set. Consequently, the high level signal is transmitted to the reset input terminal R of the flip-flop $MSFF_4$ through the OR gate $MSOR_5$ to reset the same. As the result, as soon as the film driving motor $M_F$ starts rotation, the flip-flop MSFF$_4$ is immediately reset, and the high level signal which has been transmitted to the OR gate MSOR$_{10}$ is extinguished. Although the other input terminal of the OR gate MSOR$_{10}$ is connected with the output terminals Q of the flip-flops MSFF$_3$ and MSFF$_2$, a low level signal output is produced from the output terminals other than the output terminal 2 of the decoder MSDC$_1$ in view of the single frame photographic mode, hence the AND gates MSA$_3$ to MSA$_5$, MSA$_9$, MSA$_7$ and MSA$_{14}$ produce the low level outputs, and the OR gate MSOR$_{10}$ responds to the output Q alone of the flip-flop MSFF$_4$ at the single frame photographic mode. Therefore, when the flip-flop MSFF$_4$ is reset, the high level signal which has been transmitted to the OR gates STOR$_1$ and STOR$_2$ in FIG. 19 through the OR gate MSOR$_{10}$ is extinguished, and the low level signal is transmitted to one of the input terminals of the OR gates STOR$_1$ and STOR$_2$. Furthermore, the other input terminal of each of the OR gates STOR$_1$ and STOR$_2$ is connected with each of the AND gates STAA$_1$ and STAA$_2$, and these AND gates produce the low level signal outputs as mentioned in the foregoing, the output from the OR gate STOR$_2$ is also at the low level, and the AND gate AST$_1$ also produces a low level signal output. On account of this, the low level signal is applied to the input terminal of the flip-flop FF$_1$ immediately after driving of the film motor M$_F$, and the stop sequence operation is executed thereby. In this consequence, when the switch SW$_1$ is changed over from "on" to "off" after the film driving motor M$_F$ is driven, the flim motor M$_F$ stops immediately before one revolution of the shutter and the magnet coil SMg is excited, so that the shutter is maintained at a position where the aperture 58$a$ is totally closed as mentioned above at the termination of the single frame photographing, thereby completing the photographic mode. When the single frame photographing is terminated, as the output terminal Q of the flip-flop FMFF in FIG. 19 is at the low level, the AND gate MSA$_{11}$ in FIG. 20 produces a low level signal output. And, at the termination of the single frame photographing, as the resetting of the flip-flop MSFF$_4$ has been released, the switch SW$_2$ is turned on again by depression of the trigger button 16 and the high level signal output is produced again from the AND gate MSA$_{13}$, whereby the flip-flop MSFF$_4$ is again set to resume the abovementioned single frame photographic operation. In other words, at every depression of the trigger button 16, the single frame photographing is executed.

Figure 22:
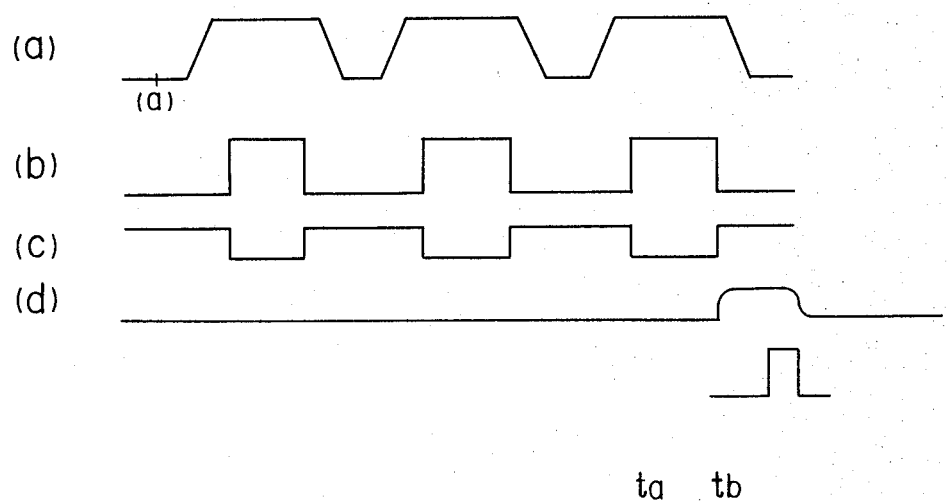
FIGS. 22(a) to 22(d) are explanatory diagrams showing a relationship among the shutter, the shutter phase switch, and the excited conditions of the excitation coil FCL in the electromagnetic device FMg, when the camera shown in FIGS. 2A to 14 is set to a single frame photographic mode, wherein the photo-taking operation is automatically stopped when the single frame is photographed by a single trigger operation, by the control circuits shown in FIGS. 19 and 20.

In the following, three-frame photographic mode will be explained. In carrying out the three-frame photographing, the indicator needle 8$a$ of the photographic mode change-over dial 8 is pointed to the symbol "$\boxed{3}$" on the camera main body 1, whereby the switch MSSw$_1$ in FIG. 20 is turned on. Thereafter, by turning the main switch SW$_M$ on, a high level signal output is produced from the output terminal 1 of the decoder MSDC$_1$, and the high level signal is applied to one of the input terminals of the AND gate MSA$_{13}$. In this consequence, the flip-flop MSFF$_4$ is set by depression of the trigger button 16 in the same manner as in the single frame photographic mode, then the start sequence is executed same as in the single frame photographic mode, the film driving motor M$_F$ is driven, and the shutter begins its rotation. Also, when the film driving motor M$_F$ commences its rotation in the same manner as in the abovementioned single frame photographic mode, the flip-flop FMFF is set. However, since the photographic mode is the three-frame photographic mode, the high level signal output is produced from the output terminal 1 of the decoder MSDC$_1$, so that the other input terminal of the AND gate MSA$_{11}$ is applied with the low level signal through the inverter MSIN$_3$. Accordingly, the flip-flop MSFF$_4$ is not reset immediately after the film motor M$_F$ is driven as in the case of the single frame photographing, nor is executed the stop sequence, but the photographic operation continues to be done even after termination of the single frame photographing. Also, since the NAND gate MSNAND$_1$ produces a low level signal output from the time when the switch SW$_2$ is turned on, the counter MSC$_3$ is brought to a state capable of performing the counting operation from the time when the switch SW$_2$ is turned on. At the same time, since the input terminal C of the counter is connected with the switch SW$_1$ in FIG. 19, it counts the number of times of the trailing pulses generated at every time the shutter performs one rotation. On account of this, a high level signal output is produced from the output terminals 1 and 2 of the counter MSC$_3$ when it counts the trailing pulse in FIG. 22($c$) generated at the time instant ta when the switch SW$_1$ is changed from "on" state to "off" state for three times as shown in FIG. 22B, whereby the AND gate MSA$_{12}$ produces a high level signal output. On account of this, the high level signal from the AND gate MSA$_{12}$ is transmitted to the reset input terminal R of the flip-flop MSFF$_4$ through the OR gate MSOR$_5$ to reset the same. As the result, the stop-sequence is executed same as in the abovementioned single frame photographic mode, and, the film driving motor M$_F$ stops in synchronism with the rising pulse generated at the time instant tb in FIG. 22($c$), as is the case with the single frame photographic mode, the shutter is maintained with its aperture in full open state, and the photographic operation terminates. That is, at the time instant t in FIG. 22, as soon as the film driving motor M$_F$ is stopped, the electro-magnet device FMg is actuated to terminate the photographic operation, so that the shutter rotates three times as shown in FIG. 22($a$) and the photographic operation terminates when the three-frame photographic operation has ended with the consequence that the continuous three-frame photographic operation is carried out. When the three-frame photographic mode is again executed, the trigger button 16 is once released by depression and is again engaged by depression as in the case of the single frame photographic mode, whereby the three-frame photographic mode is again executed.

In the following, explanations will be given as to a 1-second interval timer photographic mode.

In performing the 1-second interval timer photographic mode, the indicator needle 8$a$ of the photographic mode change-over dial 8 is pointed to the symbol "1" on the main body 1 of the camera, whereby the switches MSSW$_1$ and MSSW$_2$ are turned on. Thereafter, the main switch SW$_M$ is turned on, and a high level signal output is produced from the output terminal 3 of the decoder MSDC$_1$ in FIG. 20. Next, when the trigger button 16 is depressed, the start and stop sequences are executed in the exactly same manner as in the abovementioned single frame photographic mode, whereby the single frame photographic operation is performed, and the shutter maintains its full closed state in the single frame photographic operation having been done. In view of the 1-second mode interval timer photographic mode, a low level signal output is produced from the output terminals 8 and 9 of the decoder MSDC$_1$, hence the AND gates MSA$_7$, MSA$'_7$ and MSA$_8$ also produce the low level signal output. Moreover, when the switch SW$_2$ is turned on, the output from the inverter MSIN$_4$ is at the low level, so that the OR gate MSOR$_7$ produces the low level signal as far as the trigger button 16 is depressed, and this low level signal is applied to one of the input terminals of the AND gate MSA$_{18}$ through the inverter MSIN$_5$ as the high level signal. Also, since the counter MSC$_1$ counts the clock pulse CP for the clock pulse oscillator MSCP$_1$, as stated in the foregoing, after the switch SW$_2$ is turned on, the counter MSC$_1$ produces an output pulse at every time it counts 1024 pulses, i.e., with one second cycle. On account of this, an output pulse of one second cycle is produced from the output terminal of the AND gate MSA$_{18}$ after the trigger operation, and is transmitted to the clock input terminal C of the counter MSC$_2$. Since the reset input terminal R of the counter MSC$_2$ is connected with the OR gate MSOR$_2$, and one of the input terminals of the OR gate is connected with the switch SW$_2$ through the inverter MSIN$_2$, a high level signal output is produced until the switch SW$_2$ is turned on, whereby the counter MSC$_2$ is maintained in its reset condition prior to the triggering. Accordingly, prior to the trigger operation, the low level signal outputs are produced from the entire output terminals of the counter MSC$_2$, hence the AND gates MSA$_3$ to MSA$_{10}$ are turned off, whereby the low level signal is also produced from the OR gate MSOR$_6$. Accordingly, the AND gate MSA$_{15}$ also produces the low level signal output prior to the trigger operation. Therefore, when the switch SW$_2$ is turned on by depression of the trigger button 16, the output from the inverter MSIN$_2$ assumes the low level, hence the output from the OR gate MSOR$_2$ also assumes the low level, and the reset condition of the counter MSC$_2$ is released thereby. Accordingly, the counter MSC$_2$ performs counting of the one-second cycle pulse, which is the output from the AND gate MSA$_{18}$ as well as the input to the input terminal C of the counter, from the time instant when the switch SW$_2$ is turned on by depression of the trigger button 16. In this way, when the counted value becomes 1, i.e., when one second lapses since the switch SW$_2$ is turned on, a high level signal output is produced from the output terminal 1 of the counter MSC$_2$, the high level signal of which is transmitted to one of the input terminals of AND gate MSA$_3$. On the other hand, since the other input terminal of the AND gate MSA$_3$ is connected with the output terminal 3 of the decoder MSDC$_1$ and the signal from the output terminal 3 is at the high level, as mentioned in the foregoing, the AND gate MSA$_3$ produces a high level signal output in response to the signal from the output terminal 1 of the counter MSC$_2$. On account of this, the high level signal is transmitted to one of the input terminals of each of the AND gates MSA$_{14}$ and MSA$_{15}$ through the OR gate MSOR$_6$. As the result of this, the AND gate MSA$_{14}$ transmits the clock pulse CP to the flip-flop MSFF$_3$ to set the same. Now, as the single frame photographic operation has been terminated simultaneously with the trigger operation, as already mentioned in the foregoing, the flip-flop MSFF$_4$ is reset as already explained in the single frame photographic mode, and the AND gate MSA$_7$ produces a low level signal output, the flip-flop MSFF$_2$ is not in the set condtion, and the OR gate MSOR$_{10}$ produces a high level signal output in response to the high level signal alone from the output terminal Q of the flip-flop MSFF$_3$ with the consequence that the start sequence is executed again after lapse of 1 second from depression of the trigger button 16 same as the abovementioned one frame photographic mode, whereby the film driving motor M$_F$ is rotated to start the photographic operation. When the photographic operation starts, since the AND gate MSA$_{11}$ produces a high level signal output as already explained with respect to the single frame photographic mode, the flip-flop MSFF$_3$ is reset immediately after it has been set, whereby the stop-sequence is executed as mentioned in the foregoing, and the photographic operation is terminated after the single frame photographic operation in exactly the same manner as in the abovementioned single frame photographic mode. Moreover, a high level signal output is produced from the output terminal 1 of the counter MSC$_2$ as mentioned above, and from the OR gate MSOR$_6$ as well, whereby the AND gate MST$_{15}$ produces the high level signal output which is then transmitted to the reset input terminal of the counters MSC$_1$ and MSC$_2$ through the OR gate MSOR$_2$ to thereby reset the counter. As a result, the high level signal from the OR gate MSOR$_6$ is extinguished, and the hgh level signal from the AND gate MSA$_{15}$ changes to a low level signal, hence the counters MSC$_1$ and MSC$_2$ again commence the counting operations, and, after 1 second lapses again since the single frame photographic operation has been done, the counters set the flip-flop MSFF$_3$ to execute the abovementioned single frame photographic mode, and, at the same time, reset the counters MSC$_1$ and MSC$_2$, after which the counting operation starts again immediately. In this way, the 1-second interval timer photographic mode is conducted by performing the single frame photographic mode with one second cycle.

Next, a five-second interval timer photographic mode will be explained. This photographic mode can be controlled in exactly the same manner as in the abovedescribed 1-second interval timer potographic mode, the details of which are dispensed with. In this photographic mode, since the five-second interval timer mode is selected by the mode change-over dial 8, the switch MSSW$_5$ is turned on. On account of this, a high level signal output is produced from the output terminal 4 of the decoder MSDC$_1$, hence the counter MSC$_2$ counts the abovementioned 1-second cycle pulse for 5 pulses, and, when the high level signal output is produced from the output terminals 1 and 4, i.e., for every five-second cycle, the high level signal output is produced from the AND gate MSA$_4$ to thereby set the flip-flop MSFF$_3$ to carry out the single frame photographing in the same manner as in the abovementioned 1-second interval timer photographic mode, and, at the same time, to instantaneously reset the counters MSC$_1$ and MSC$_2$ to commence the counting operation, whereby the single frame photographing is done at every 5-second cycle and the 5-second interval timer photographing is thus executed.

In the following, 20-second interval timer photographic mode will be explained.

This photographic mode is controlled by the exactly same operations as that of the abovementioned 1-second and 5-second interval timer photographic modes. However, in this photographic mode, since the 20-second interval timer photographic mode is selected by the mode change-over dial 8, the switches MSSW$_1$ and MSSW$_3$ are turned on, and the high level signal output is produced from the output terminal 5 of the decoder MSDC$_1$, so that, when the counter MSC$_2$ has counted the abovementioned 1-second cycle pulse for 20 pulses, i.e., when the high level signal output is produced from the AND gate $MSA_5$ for 20-second cycle, the flip-flop $MSFF_3$ is set at the 20-second cycle by this high level signal, thereby carrying out the abovementioned single frame photographic operation with the 20-second cycle.

In the case of 60-second interval timer photographic mode, the exactly same operations are followed. That is, the high level signal output is produced from the AND gates $MSA_4$ and $MSA_9$ at every time the counter $MSC_2$ counts 60 pulses to set the flip-flop $MSFF_3$ at the 60-second cycle, thereby carrying out the abovementioned single frame photographing.

In the following, a variable interval timer photographic mode will be explained.

This variable interval timer photographic mode is also carried out in the same control as those of the aforedescribed interval timer photographic modes with the exception that a pulse of a predetermined cycle is used in place of the 1-second clock pulse. In more detail, in this photographic mode, the indicator needle $8a$ of the mode change-over dial 8 is first pointed to the symbol "IT" provided on the main body 1 of the camera, whereby the switches $MSSW_1$ to $MSSW_3$ are turned on. By performing the trigger operation in this state, the AND gate $MSA_{15}$ produces a high level signal output in the same manner as in the abovementioned interval timer photographic modes to set the flip-flop $MSFF_4$, whereby the abovementioned single frame photographic mode operation is executed, and the single frame photographing is carried out. That is, by setting of the flip-flop $MSFF_4$, the start sequence is performed as in the abovementioned single frame photographic mode, and the film driving motor $M_F$ is rotated, whereupon the AND gate $MSA_{11}$ produces the high level signal output to promptly reset the flip-flop $MSFF_4$ and to perform the start sequence, after which the stop sequence is immediately done to thereby carry out the single frame photographing. On the other hand, since the switches $MSSW_1$ to $MSSW_3$ are turned on, the high level signal output is produced from the output terminal 7 of the decoder $MSDC_1$, and the signal is applied to one of the input terminals of the AND gate $MSA_{10}$. Also, since the other input terminal of the AND gate is connected with the output terminal of the AND gate $MSA_6$, the AND gate $MSA_{10}$ produces the high level signal output, when the high level signal output is produced from the AND gate $MSA_6$. Further, since the input terminal of the AND gate $MSA_6$ is connected with the output terminals 4, 8, 16, and 32 of the decoder $MSC_2$, the AND gate $MSA_{10}$ produces the high level signal output at every time the counter $MSC_2$ counts the 60 input pulses, transmits the high level signal to the clock input terminal C of the flip-flop $MSFF_3$ through the OR gate $MSOR_6$ and the AND gate $MSA_{14}$, and set the flip-flop $MSFF_3$ thereby. On account of this, at every time the counter $MSC_2$ counts the 60 pulses, the flip-flop $MSFF_3$ is set to execute the start sequence, and, thereafter, the flip-flop is promptly reset by the signal from the AND gate $MSA_{11}$ to perform the single frame photographing as is the case with the aforedescribed interval timer photographic modes, whereby the 60-second interval timer photographing is performed during the interval when the counter $MSC_2$ counts 60 pulses. As described above, the time-variable interval timer photographic mode is performed by the same operations as in the aforedescribed various interval timer photographic modes. However, in this photographic mode, since the high level signal output is produced from the output terminal 7 of the decoder $MSDC_1$, the high level signal is transmitted to one of the input terminals of the AND gate $MSA_1$ as the low level signal through the inverter $MSIN_1$ to turn off the AND gate $MSA_1$. At the same time, since the high level signal is transmitted to the AND gate $MSA_2$, the AND gate $MSA_2$ is in the open state in this particular photographic mode. Accordingly, a pulse from the pulse oscillator $MSCP_2$ is introduced as an input to the counter $MSC_1$ in place of the pulse CP of 1 mm sec. cycle from the clock pulse oscillator $MSCP_1$, as is the case with the abovementioned interval timer photographic modes. In this consequence, at every time 1024 pulses from the pulse oscillator $MSCP_2$ are counted, the counter $MSC_1$ generates one pulse which is introduced into the counter $MSC_2$. As the result, the time until the counter $MSC_2$ finishes counting 60 pulses will be $60 \times 1024 \times CP'$ (CP' denotes the oscillation cycle of the pulse oscillator $MSCP_2$), hence the interval timer photographic cycle of the mode is also $60 \times 1024 \times CP'$. On the other hand, the cycle of the pulse oscillator $MSCP_2$ is so constructed that it may be decided by the variable resistor $MSR_1$ associated with a time setting dial (not shown). Since the cycle of this pulse oscillator $MSCP_2$ is 1/60 to 1 mm sec., the photographic cycle of this photographic mode ranges from 1 to 60 seconds, within which range the variable interval timer photographing of an arbitrary time period can be performed.

Next, explanations will be given as to "$10\sqrt{10}$" second selftimer photographic mode. This photographic mode is to perform the continuous photographing for 10 seconds after 10 seconds of waiting time from the trigger operation.

First of all, indicator needle $8a$ of the mode change-over dial 8 is pointed to the symbol "$10\sqrt{10}$" on the main body 1 of the camera, whereby the switch $MSSW_4$ in FIG. 20 is turned on. In this state, when the main switch SWM is turned on and the trigger operation is performed, the switch $SW_E$ in FIG. 19 is turned on at the first stroke of the trigger plate 56. In this consequence, a high level signal is transmitted to one of the input terminals of the AND gate $STAA_1$. However, since the decoder $MSDC_1$ produces from its output terminal 8 alone the high level signal output, the EE circuit is maintained in a non-operative state. Thereafter, the depressing operation of the trigger button 16 is further performed to turn on the switch $SW_2$ at the second stroke of the trigger 56. On account of this, the high level signal is transmitted to one of the input terminals of the AND gate $MSA_{13}$ in FIG. 20, although, since the high level signal output is produced from the output terminal 8 of the decoder $MSDC_1$ as mentioned above, the AND gate $MSA_{13}$ is turned off and the low level signal output is produced therefrom, the flip-flop $MSFF_4$ is not set as in the aforedescribed various photographic modes, hence no start sequence is executed by the output from the flip-flop $MSFF_4$. Also, at this time, since the AND gates $MSA_3$ to $MSA_5$, $MSA_9$ and $MSA_{10}$ are respectively connected with the output terminals 3 to 7 of the decoder $MSDC_1$, these gates also continue to produce the low level signal outputs, hence the AND gates $MSA_{14}$ and $MSA_{15}$ continue to produce the low level signal outputs in this particular photographic mode. As the result, the flip-flop $MSFF_3$, in this photographic mode, continues to produce the low level signal output from its output signal Q. Further, at the time of the trigger operation, as the flip-flop $MSFF_2$ produces the low level signal output, the output from the OR gate $MSOR_{10}$ continues to produce the low level signal without any change due to the trigger operation, hence the start sequence is not executed by the trigger operation. Thus, by the trigger operation, the photographic operation is not started, but the waiting time for the self-timer operation is executed. On the other hand, when the switch $SW_2$ is turned on by the trigger operation, the output from the inverter $MSIN_2$ assumes the low level, and, at the same time, the AND gate $MSA_{15}$ produces the low level output as mentioned above with the consequence that the reset condition of the counter $MSC_1$ and $MSC_2$ are released in synchronism with the trigger operation, whereby the counter $MSC_1$ starts counting the pulse CP of the 1 mm sec. cycle to be introduced thereinto from the pulse oscillator $MSCP_1$ through the AND gate $MSA_1$ and the OR gate $MSOR_1$. As a result in synchronism with the trigger operation, the pulse of the 1-second cycle is transmitted to the counter $MSC_2$ through the AND gate $MSA_{10}$, as mentioned above, and the counter $MSC_2$ starts the counting operation. In this manner, when the counter $MSC_2$ counts ten pulses since it has commenced the counting operation, the output terminals 2 and 8 thereof produce high level signal outputs which are then transmitted to one of the input terminals of the AND gate $MSA_7$. Further, since the other input terminal of the AND gate $MSA_7$ is connected with the input terminal 8 of the decoder $MSDC_1$ through the OR gate $MSOR_7$, the gate $MSA_7$ produces the high level signal output when the counter $MSC_2$ has counted ten pulses, i.e. 10 seconds after the trigger operation, thereby setting the flip-flop $MSFF_2$ and producing the high level signal output from the output terminal Q of the flip-flop $MSFF_2$. As a result, the high level signal output is produced from the OR gate $MSOR_{10}$ and is transmitted to the circuit through the OR gate $STOR_1$ in FIG. 19 to render the EE circuit operative. On the other hand, the high level signal is transmitted to one of the input terminals of the AND gate $AST_1$ through the OR gate $STOR_2$, and further to the input terminal $D_1$ of the flip-flop $FF_1$ after 512 mm sec., as mentioned above. As the consequence, the abovementioned start sequence is executed after ten seconds from the trigger operation, and the photographic operation starts. Thus, after the start sequence is executed and the photographic operation is started, when the counting operation by the counter $MSC_2$ is further proceeded and the counter $MSC_2$ further counts ten pulses, i.e., after lapse of another 10 seconds from start of the photographic operation, the output terminals 4 and 16 of the counter $MSC_2$ produce the high level signal outputs, on account of which the AND gate MSA 7' produces the high level signal output to reset the flip-flop $MSFF_2$. In this consequence, a low level signal is applied to the input terminal $D_1$ of the flip-flop $FF_1$ in FIG. 19, the abovementioned stop sequence is executed, and the photographic operation is terminated. In other words, after ten seconds of waiting time, the self-timer photographic operation is executed for ten seconds. Moreover, since the high level signal output from the AND gate $MSA_7'$ at the termination of the photographic operation is transmitted to the AND gate $MSA_{18}$ as the low level signal through the OR gate $MSOR_7$ and the inverter $MSIN_5$, the counting operation by the counter $MSC_2$ terminates at the completion of the photographic operation, whereby the circuit shown in FIG. 20 maintains its condition of termination of the photographic operation, since it does not transmit the control signal to the sequence control circuit in FIG. 19 after completion of the photographic operation.

Incidentally, in the above-described self-timer photographic mode, since the flip-flop $MSFF_1$ is set synchronously with the trigger operation and reset by the output from the AND gate $MSA_7$, the set condition is maintained from the trigger operation to commencement of the photographic operation, i.e., during the photographic waiting time. In the meantime, since the AND gate $MSA_{16}$ is in the open state during this waiting time, and the light emitting diode $MSLED_1$ lights on and off at a cycle of approximately 0.5 second during the photographic waiting time so as to permit passage of the pulse from the output terminal 12 of the counter $MSC_1$ and to transmit this pulse thereto, hence the light emitting diode lights on and off by a pulse of approximately 0.1 second cycle from the AND gate $MSA_{17}$, it indicates the self-timer waiting time and the photographic time as well.

In the following, explanations will be given as to the self-timer photographic mode, wherein the indicator needle 8a of the mode change-over dial 8 is pointed to the symbol "10 $\boxed{20}$" on the main body 1 of the camera. This photographic mode is to perform continuous photographing for 20 seconds after ten seconds of waiting time. Since the operations for this photographic mode is controlled in the same manner as the self-timer photographic mode, wherein the indicator needle 8a of the mode change-over dial 8 is pointed to the symbol "10 $\boxed{10}$", detailed explanations will be dispensed with. In this particular photographic mode, however, since the mode change-over dial is pointed to the symbol "10 $\boxed{20}$", the switches $MSSW_1$ and $MSSW_4$ are turned on, and the high level signal output is produced from the output terminal 9 of the decoder $MSDC_1$, and, when the counted value of the counter $MSC_2$ becomes 30 after the 10-second waiting time, i.e., when the high level signal output is produced from the output terminals 2, 4, 8, and 16 of the counter $MSC_2$ after lapse of 20 seconds from start of the photographic operation, the high level signal output is produced from the AND gate $MSA_8$ to reset the flip-flop $MSFF_2$, to execute the stop sequence, and to terminate the photographic operation.

What is claimed is:

1. A cine camera having a plurality of camera elements including at least film feeding means and sound recording means, and in which said camera elements are operatively controlled in different operational sequences at the start of the photographic operations and at termination of photographic operations, said cine camera comprising:

(a) manually operated trigger means;
(b) a start signal forming circuit to form a start signal by means of an operation of said trigger means;
(c) a stop signal forming circuit to form a stop signal by release operation of said trigger means;
(d) a counter circuit which starts a counting operation in response to said start signal and stop signal;
(e) counter setting means to set the counter circuit in a predetermined state in response to said start signal and stop signal;
(f) a start gate circuit including a plurality of gate means, each gate means being connected to a predetermined output terminal of said counter circuit and generating an output with a timing corresponding to a counted content in said counter circuit, and each camera element being operated in response to the output from predetermined gate means and in a sequence necessary for starting photographic operations sequentially by said start gate circuit at the start of photographic operations; and (g) a stop gate circuit including a plurality of gate means, said each gate means being connected to a predetermined output terminal of said counter circuit and generating an output with a timing corresponding to the counted content of said counter circuit, and said each camera element being rendered inoperative in response to an output from predetermined gate means and in a sequence necessary for terminating photographic operations by said stop gate circuit at termination of the photographic operations, said start gate circuit being rendered operative in response to said start signal, and said stop gate circuit being rendered operative in response to said stop signal.

2. A sound cine camera, comprising;
(a) manually operated trigger means;
(b) a counter circuit which starts to count pulses by means of operation of said trigger means;
(c) first detecting means for detecting the content of said counter circuit, said first detecting means producing an output when said counter counts a predetermined number of pulses;
(d) a film motor which becomes operative in response to said output from said first detecting means;
(e) a second detecting means for detecting the content of said counter circuit, said second detecting means generating an output when said counter circuit further counts a predetermined number of pulses after said first detecting means has generated an output; and
(f) a sound recording circuit to perform sound recording operation in response to an output from said second detecting means.

3. A camera having a sound recording circuit, comprising:
(a) manually operated trigger means;
(b) a counter circuit which starts to count pulses by means of operation of said trigger means;
(c) first detecting means for detecting the content of said counter circuit, said first detecting means producing an output when said counter counts a predetermined number of pulses;
(d) a capstan motor for driving a film at a constant speed, said motor being rendered operative by operation of said trigger means;
(e) a film motor which becomes operative in response to said output from said first detecting means;
(f) second detecting means for detecting the content of said counter circuit, said second detecting means generating an output when said counter circuit further counts a predetermined number of pulses after said first detecting means has generated an output; and
(g) a second recording circuit to perform sound recording operation in response to an output from said second detecting means.

4. A sound cine camera, comprising:
(a) manually operated trigger means;
(b) a start signal forming circuit to form a start signal by means of operation of said trigger means;
(c) a stop signal forming circuit to form a stop signal by release operation of said trigger means;
(d) a counter circuit which starts counting operation in response to said start and stop signals;
(e) a capstan motor for driving a film at a constant speed, said motor being operated in response to said start signal;
(f) first detecting means for detecting the content of said counter circuit, said first detecting means being operative in response to said start signal and producing an output when said counter circuit counts a predetermined number of pulses;
(g) a film motor which becomes operative in response to said output from said first detecting means, and becomes non-operative in response to said stop signal;
(h) second detecting means for detecting the content of said counter circuit, said means being operative in response to a start signal and generating an output when said counter circuit further counts a predetermined number of pulses after said first detecting means has generated an output;
(i) a sound recording circuit to perform sound recording operation in response to an output from said second detecting means, said circuit being rendered inoperative in response to said stop signal; and
(j) third detecting means for detecting the content of said counter circuit, said third detecting means being rendered operative in response to said stop signal and generating an output when said counter circuit counts a predetermined number of pulses after said counter circuit has started the counting operation in response to the stop signal, and said capstan motor being rendered inoperative in response to an output from said third detecting means.

5. A camera having an interval timer circuit, comprising:
(a) a counter circuit for counting pulses with a predetermined frequency, said counter circuit having a plurality of output terminals and generating an output from a predetermined output terminal on the basis of a counter value;
(b) selection means for selecting any output terminal in said counter circuit;
(c) reset means to reset said counter circuit in response to outputs from the output terminals as selected by said selection means, said counter circuit being in an initial state and repetitively performing the counting operation at every time they are reset and generating outputs from the output terminals as selected by said selection means at every predetermined period;
(d) a film motor;
(e) a signal forming circuit to form a drive signal for driving said film motor in response to an output from the output terminal as selected by said selection means;
(f) a drive circuit to drive said film motor in response to said drive signal;
(g) detecting means which detects a position of the camera shutter to its aperture, and produces a detection signal output when the camera shutter shifts from its aperture open phase to its closed phase; and
(h) stop signal forming circuit to form a stop signal in response to said drive signal and detection signal when both are produced as outputs, said drive circuit stopping drive of said film motor in response to the stop signal.

6. A cine camera as set forth in claim 5, wherein said detecting switch means detects a phase of the camera shutter, and shifts from a first state to a second state when the shutter moves from an aperture open phase to an aperture closed phase, and said drive circuit is rendered inoperative due to said switch means shifting from the first state to the second state.

7. A cine camera having an interval timer circuit, comprising:
(a) a counter circuit to produce an output pulse at every time it counts a predetermined number of pulses;
(b) a film motor;
(c) a film motor drive circuit to drive said film motor in response to a pulse from said counter circuit; and
(d) shutter phase detecting means to generate a detection signal when the camera shutter shifts from an aperture open phase to an aperture closed phase, said drive circuit being rendered inoperative in response to the detection signal from said detecting means to stop said film motor.

8. A cine camera having an interval timer circuit, comprising:
(a) a counter circuit to produce an output pulse at every time it counts a predetermined number of pulses;
(b) a film motor;
(c) a signal forming circuit to form a drive signal for driving said film motor in response to the pulse from said counter circuit;
(d) a drive circuit to drive said film motor in response to said drive signal;
(e) detecting means which detects a position of the camera shutter to its aperture, and produces a detection signal output when the camera shutter shifts from its aperture open phase to its closed phase; and
(f) a stop signal forming circuit to form a stop signal in response to said drive signal and detection signal when both are produced as outputs, said drive circuit stopping drive of said film motor in response to the stop signal.

9. A cine camera having a self-timer circuit, comprising:
(a) manually operated trigger means;
(b) a counter circuit to start the counting operation of a pulse train of a predetermined definite period by the operation of said trigger means;
(c) first detecting means which detects a counted value in said counter circuit, and produces an output when the counted value reaches a predetermined first value;
(d) a film motor which operates in response to an output from said first detecting means; and
(e) second detecting means which produces an output when said counter circuit further counts a predetermined number of pulses after its counted value reaches said first value, and its counted value reaches a predetermined second value, said film motor being rendered inoperative in response to an output from said second detecting means.

10. A camera having a self-timer circuit, comprising:
(a) pulse generating circuit to generate clock pulses;
(b) a first counter circuit for counting said clock pulses, said counter circuit having a first output terminal for producing pulses with a certain determined frequency and second output terminal for producing pulses with a certain determined frequency different from said frequency of pulses from the first output terminal;
(c) a timer circuit including a counter for performing a counting operation by shutter release operation;
(d) a detecting circuit for detecting the count value of said counter of said timer circuit, said detecting circuit producing a first signal when the counted value reaches a predetermined first value and producing a second signal when said counter further counts a predetermined number of pulses after the counted value thereof reaches said first value, and its counted value reaches a predetermined second value;
(e) a motor for driving an image recording member which operates in response to said first signal and is rendered inoperative in response to said second signal;
(f) a display circuit to perform on-off operation for the display in synchronism with an input pulse; and
(g) transmission circuit which, by release operation, transmits a pulse from said first output terminal to said display circuit and transmits a pulse from said second output terminal to said display circuit in response to said first signal.

11. A camera comprising:
(a) a first switch;
(b) an exposure control circuit including a light measuring circuit, said exposure control circuit controlling an exposure factor dependent upon an output from a light measuring circuit, and being rendered operative when said first switch is operated;
(c) a second switch for initiating photographic operations;
(d) a counter for counting pulses, said counter producing an output signal when a predetermined number of pulses are counted and being rendered operative when said first switch is operated;
(e) a photographic operation control circuit including a film motor; and
(f) a signal forming circuit which is operated by said second switch and produces an output signal when an output signal is being produced from said counter, said photographic operation control circuit being rendered operative for driving said film motor in response to the signal from said signal forming circuit.

12. A camera as set forth in claim 11, wherein said exposure control circuit includes an aperture control circuit for controlling the exposure aperture dependent on the output from said light measuring circuit.

13. A camera, comprising:
(a) manually operated trigger means;
(b) a first switch which varies from its first state to its second state by a first stroke action of said trigger means;
(c) a second switch which varies from its first state to its second state by a second stroke action of said trigger means;
(d) exposure aperture control circuit including a light measuring circuit, said control circuit controlling the exposure aperture dependent upon a output from light measuring circuit, and said exposure aperture control circuit being rendered operative when said first switch assumes the second state;
(e) a counter for counting clock pulses, said counter producing an output signal when said counter counts a predetermined number of pulses and being rendered operative when said first switch assumes the second state;

(f) photographic operation control circuit including a film motor; and (g) signal forming circuit to produce an output signal when said second switch assumes its second state and an output signal is produced from said counter, said photographic operation control circuit being rendered operative for driving said film motor in response to said signal from said signal forming circuit.

14. A camera with sound recording function having a plurality of camera elements, comprising:

(a) manually operated trigger means;

(b) a start signal forming circuit to form a start signal by means of operation of said trigger means;

(c) a stop signal forming circuit to form a stop signal by release operation of said trigger means; and (d) a control circuit including a counter which starts counting operation in response to said start signal and stop signal, setting means to set the counter in a predetermined certain state in response to said start and stop signals, and a logic circuit connected to said counter, said logic circuit having a plurality of output terminals, each camera element being coupled with a predetermined output terminal, and said logic circuit producing an output signal to operate said camera element from a predetermined output terminal in a series of sequences based on a counted value of the counter in response to said start signal and producing an output signal to render said camera element inoperative from a predetermined output terminal in a series of sequences different from those sequences when responding to said start signal based on a counted value of said counter in response to said stop signal.

15. A sound motion picture camera comprising:

(a) manually operated trigger means for starting photographic operations;

(b) a film motor which becomes operative at the start of photographic operations;

(c) a counter circuit which starts counting of pulses by means of operation of said trigger means; and (d) sound recording circuit which becomes operative when said counter circuit counts a predetermined number of pulses, whereby said sound recording circuit starts a sound recording operation after a predetermined time to be regulated by a counted value of said counter subsequent to operation of said film motor.

16. A camera comprising:

(a) manually operated trigger means;

(b) an exposure control circuit including a light measuring circuit, said control circuit controlling an exposure factor dependent on an output of a light measuring circuit, said exposure control circuit being rendered operative when said trigger means is operated;

(c) a counter for counting pulses, said counter producing an output signal when a predetermined number of pulses are counted, and being rendered operative when said trigger means is operated; and (d) a photographic operation control circuit including a motor for driving an image recording member and operative in response to an output signal from the counter.

17. A motion picture camera comprising:

(a) manually operated trigger means:

(b) a counter circuit which starts counting of pulses by means of operation of said trigger means;

(c) a film motor;

(d) a film motor control circuit connected to said counter circuit, said control circuit drives said film motor when said counter circuit counts a predetermined number of pulses; and (e) a sound recording circuit connected to said counter circuit operative when a predetermined number of pulses are counted from the moment said film motor is driven.

18. A sound motion picture camera comprising:

(a) manually operated trigger means;

(b) a counter circuit which starts counting of pulses by means of operation of said trigger means, said counter circuit having a first output terminal for producing a signal when the content of said counter circuit assumes a first value and a second output terminal for producing a signal when the content of said counter circuit assumes a second value;

(c) a film motor;

(d) a film motor driving circuit connected to said first output terminal and drives said film motor in response to said signal from said first output terminal;

(e) a sound recording circuit connected to said second output terminal, said circuit being rendered operative in response to the signal from said second output terminal;

(f) cartridge detecting means to produce an output signal when a sound film cartridge is loaded; and (g) transmitting means to transmit a signal from the second output terminal to said sound recording circuit in response to the signal from said detecting means.

19. A motion picture camera comprising:

(a) manually operated trigger means;

(b) an aperture;

(c) shutter means to periodically control said aperture for its open and closure;

(d) a film motor to drive said shutter, said motor being rendered operative by the action of said trigger means;

(e) shutter phase detecting means which generates a detection signal when said shutter shifts from its aperture open phase to its aperture closed phase;

(f) a stop signal forming circuit to form a stop signal in response to said detection signal when the operation of said trigger means is released, said film motor being rendered inoperative in response to the stop signal;

(g) a counter to start the counting operation in response to said stop signal;

(h) hindering means provided in a movable manner at a position to hinder excessive rotation of said shutter; and (i) a drive circuit which causes said hindering means to move to said hindering position and maintains it at said position, said drive circuit being rendered operative in response to a stop signal and rendered inoperative when said counter has counted a predetermined number of pulses.

* * * * *

UNITED STATES PATENT AND TRADEMARK OFFICE
CERTIFICATE OF CORRECTION

PATENT NO. : 4,331,395

DATED : May 25, 1982

INVENTOR(S) : NORITSUGU HIRATA, ET AL.

It is certified that error appears in the above-identified patent and that said Letters Patent is hereby corrected as shown below:

Column 2, line 11, "condition" should read --conduction--;
         line 62, "condition" should read --conduction--.

Column 3, line 1, "press-contract" should read --press-contact--.

Column 12, line 34, "38" should read --39--.

Column 15, line 31, "75" should read --74--.

Column 16, line 4, "Sw11" should read --SW11--.

Column 18, line 15, "65b" should read --64b--.

Column 27, line 45, "$1_a$" should read --1a--.

Column 29, line 68, "face" should read --force--.

Column 43, line 55, "$MSSw_1$" should read --$MSSW_1$--.

Column 45, line 65, "condtion" should read --condition--.

UNITED STATES PATENT AND TRADEMARK OFFICE
CERTIFICATE OF CORRECTION

PATENT NO. : 4,331,395

DATED : May 25, 1982

INVENTOR(S) : NORITSUGU HIRATA, ET AL.

It is certified that error appears in the above-identified patent and that said Letters Patent is hereby corrected as shown below:

Column 46, line 23, "hgh" should read --high--;
line 38, "potographic" should read --photographic--.

Column 50, line 51, delete "the" (second occurrence); after "at" (second occurrence) add --the--.

Signed and Sealed this

Twelfth Day of April 1983

[SEAL]

Attest:

GERALD J. MOSSINGHOFF

Attesting Officer    Commissioner of Patents and Trademarks